US006837916B2

(12) United States Patent
Kawakami et al.

(10) Patent No.: US 6,837,916 B2
(45) Date of Patent: Jan. 4, 2005

(54) SMELTING REDUCTION METHOD

(75) Inventors: Masahiro Kawakami, Fukuyama (JP);
Terutoshi Sawada, Yokohama (JP);
Takeshi Sekiguchi, Yokohama (JP);
Masayuki Watanabe, Yokohama (JP);
Katsuhiro Iwasaki, Yokohama (JP);
Shinichi Isozaki, Yokohama (JP);
Junichi Fukumi, Tokyo (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/974,511

(22) Filed: Oct. 10, 2001

(65) Prior Publication Data

US 2002/0112567 A1 Aug. 22, 2002

Related U.S. Application Data

(62) Division of application No. 09/598,605, filed on Jun. 21, 2000, now abandoned, which is a continuation of application No. PCT/JP98/05852, filed on Dec. 24, 1998.

(30) Foreign Application Priority Data

| Dec. 26, 1997 | (JP) | ............................................. 9-368429 |
| Dec. 26, 1997 | (JP) | ............................................. 9-368430 |
| Dec. 26, 1997 | (JP) | ............................................. 9-368431 |
| Jan. 30, 1998 | (JP) | ......................................... 10-019997 |
| Apr. 28, 1998 | (JP) | ......................................... 10-119714 |
| Apr. 28, 1998 | (JP) | ......................................... 10-119715 |

(51) Int. Cl.[7] .............................................. C21B 13/14

(52) U.S. Cl. ............................. 75/380; 75/385; 75/475; 75/484; 75/500

(58) Field of Search .......................... 75/475, 380, 385, 75/484, 500

(56) References Cited

U.S. PATENT DOCUMENTS

| 4,295,882 | A | | 10/1981 | Arima et al. | |
| 4,701,214 | A | * | 10/1987 | Kaneko et al. | ................ 75/481 |
| 4,842,642 | A | | 6/1989 | Bowman | |
| 5,567,224 | A | * | 10/1996 | Kundrat | ........................ 75/414 |
| 5,730,775 | A | * | 3/1998 | Meissner et al. | ............. 75/436 |
| 5,938,815 | A | * | 8/1999 | Satchell, Jr. | ................. 75/500 |
| 6,171,364 | B1 | * | 1/2001 | Sarma et al. | .................. 75/382 |

FOREIGN PATENT DOCUMENTS

| JP | 49-93209 | 9/1974 |
| JP | 56-115670 | 9/1981 |
| JP | 1-147012 | 6/1989 |
| JP | 1-152211 | 6/1989 |
| JP | 2-73911 | 3/1990 |
| JP | 2-232312 | 9/1990 |
| JP | 4-83815 | 3/1992 |
| JP | 6-271919 | 9/1994 |

(List continued on next page.)

OTHER PUBLICATIONS

Report of National Research Institute of Metals, Science and Technology Agency, vol. 8, pp. 83–99 (1987).

(List continued on next page.)

Primary Examiner—Melvyn Andrews
(74) Attorney, Agent, or Firm—Frishauf, Holtz, Goodman & Chick, P.C.

(57) ABSTRACT

A smelting reduction method comprising (a) charging a carbonaceous material and an ore into a reacting furnace to directly contact the carbonaceous material and the ore; (b) reducing the ore until at least a part of the ore is metallized, the resultant reduced ore containing at least a part of metallized metal being produced; (c) charging the carbonaceous material and the ore containing at least a part of the metallized metal from step (b) into a smelting furnace having a metal bath; and (d) blowing a gas containing 20% or more of oxygen into the metal bath in the smelting furnace to produce molten iron.

15 Claims, 24 Drawing Sheets

FOREIGN PATENT DOCUMENTS

| | | |
|---|---|---|
| JP | 7-316618 | 12/1995 |
| JP | 9-143525 | 6/1997 |
| JP | 9-217105 | 8/1997 |
| JP | 9-227919 | 9/1997 |
| JP | 9-256009 | 9/1997 |
| WO | 96/08328 | 3/1996 |

OTHER PUBLICATIONS

Amit Ganguly and Ken J. Reid, "Carbon Utilization in Direct Smelting Systems", *Steel Research, 63*, 281–290 (1992).

"Recent tendencies of new iron sources", ("Recent Trends of New Iron Production Process") by Iron Making Process Forum of the Iron and Steel Institute of Japan, pp. 42 to 51 (Sep. 1996).

"Studies on iron making technique of directly using coal" ("Direct Iron Ore melting Reduction Process") by The Japan Iron and Steel Federation (Jun. 1996).

"The $165^{th}$ and $166^{th}$ Nishiyama Commemoraive lecture", pp. 149 to 175 (Sep. and Oct. 1997).

"The $165^{th}$ and $166^{th}$ Nishiyama Commemorative Lecture", pp. 117 to 147 (Sep. and Oct. 1997).

Rene Munnix, Jean Borlee, Didier Steyls and Mario Economopoulos, "Comet—A New Coal Based Process for the Production of DRI", *MPT International*, pp. 50 to 61, Feb. 1997.

"Current Advances in Material and Processes", Report of the ISIJ Meeting, The Iron and Steel Institute of Japan, CAMP-ISIJ vol. 10, (Sep. 1997), pp. 723 to 726.

* cited by examiner

SMELTING REDUCTION METHOD

This application is a Divisional Application of application Ser. No. 09/598,605 filed Jun. 21, 2000, now abandoned which is a Continuation Application of International Application PCT/JP98/05852 filed Dec. 24, 1998 (not published in English).

FIELD OF THE INVENTION

The present invention relates to a refining method of molten iron and a smelting reduction method for manufacturing molten iron.

BACKGROUND OF THE INVENTION

In molten iron produced by a smelting reduction method of iron bath type, a carbon level is more often low as 4 wt % or less, and in this case, a melting point is high. In general, the carbon level is 3 to 4 wt %. Hereinafter, the molten iron produced by the smelting reduction method of iron bath type will be called as "smelted and reduced molten iron". Namely, the melting points of molten iron in general blast furnaces are assumed to be around 1150° C., and if the carbon content is different by 1 wt %, the melting point is different by around 70 to 100° C., and therefore carbon content as in the smelted and reduced molten iron is at a level of 3 wt %, and the melting point is around 1300° C. Metal or slag in the molten iron where the carbon level is low easily adhere troughs or ladles in treatments of molten iron, and such situations make the treatment of molten iron very difficult.

Sulfur level in the smelted and reduced molten iron is 0.3 to 0.4 wt %, which is around 10 times of sulfur in the furnace molten iron. Therefore in desulfurization outside furnace generally applied to the furnace molten iron, it is difficult to decrease the sulfur level below 0.01 wt % directing to steel making processes for producing ordinary thin sheets in view of treating efficiency and cost. In the direct iron ore smelted and reduced molten iron, Si is below 0.1 wt %, and often less than 0.01 wt %, and a heat allowance margin in a post-process is lower that that of the furnace molten iron.

In such conventional desulfurization treatments outside furnace, it is necessary to install facilities to be exclusively used for carrying out the desulfurization treatment on the way of feeding the molten iron to a converter yard, inevitably increasing the cost of equipment. Further, since a freeboard of a container must be made large for practicing the desulfurization treatment, a feeding container of the molten iron is accordingly large sized, and the costs for refractory to be used thereto are increased, and at the same time the cost of equipment is high. In addition, when carrying out the desulfurization treatment outside furnace, the temperature of the molten iron is lowered so that the heat allowance margin in a converter is decreased and scrap amount able to be consumed in the converter is dropped.

There have conventionally been developed and studied several techniques as process of producing molten irons not following the furnace process.

"Recent tendencies of new iron sources" by Iron Making Process Forum of The Iron and Steel Institute of Japan(Sep. 29, 1996), pages 42 to 51, and "Studies on iron making technique of directly using coal" by THE JAPAN IRON AND STEEL FEDERATION (June 1996) (called both as "Prior Art 1" hereafter) disclose alias "DIOS Process" (Direct Iron Ore Smelting reduction Process). The DIOS Process preheats fine iron ores to 700 to 800° C. in a fluidized bed prereduction furnace and reduces the fine iron ores until around 20% of the pre-heating reduction rate in a pre-reduction furnace, then charges the pre-reduced ores into the smelting reduction furnace, and blows oxygen gas into the smelting reduction furnace with coal as carbonaceous material and heat source. The smelting reduction furnace is of the iron bath type, and ordinary coal may be used as the carbonaceous material. This process may be continuously operated.

In this process, a fluidized bed furnace is used as the preduction furnace, not taking a problem of permeability as seen in a shaft furnace but having a merit of using so-called sinter feed of ore grain size being below around 8 mm as an iron ore grain diameter. However, since an only waste gas from the smelting reduction furnace of a post combustion type is used as a reducing material, an accomplished pre-reduction in the fluidized bed furnace cannot exceeds 33% thermodynamically. In the fluidized bed furnace, a net unit of coal is 700 kg/t or higher, the net unit of oxygen is around 500 $Nm^3/t$ or more, and sensible heat and latent heat of generated gas are 1 to 2 Gcal/t. An oxygen plant or a gas treatment and energy conversion plant for establishing a process under such conditions are very large sized scales, and it is one of problems that taken is the high cost for incidental facilities around equivalent to the cost of facility of the smelting reduction furnace itself (Problem 1).

The DIOS Process is very superior in that the degree of freedom of raw materials and fuels is large, but since the cost of facility is tremendous as the Problem 1, it was difficult to actually utilize brown coal, sub-bituminous coal of low quality and limonite or iron ore hydroxide as ore of low quality.

Aiming at improvement of the above mentioned problems in the DIOS Process and, for example, decreasing the net unit of coal or the net unit of oxygen and heightening productivity, if increasing a post combustion ratio in the smelting reduction furnace and using the furnace wall of refractory as in the ordinary smelting furnace, the life of a furnace is from several tens to several hundreds hours. Therefore, a water cooling structure must be adopted for the furnace wall. If a water cooling panel is used to the furnace wall as a measure thereto, coal of high volatile content being 30 wt % or more is used, $H_2$ and $H_2O$ of 20 vol % or more in total are contained in generated gas, and the post combustion ratio is heightened nearly up to 40% as in the Prior Art 2, heat load of the furnace wall is increased to 300 $Mcal/m^2h$ or more, and as heat loss from the furnace is increased and cooling water is much necessary for maintaining the water cooling structure, it has been assumed it unreal to more increase the post combustion ratio (Problem 2). If coal of low volatile content is used, an allowable post combustion ratio is 40 to 50%, and if it is at a level of coke, no problem occurs about the post combustion of 60 to 80%.

On the other hand, alias "ROMEL Process" is introduced at page 149 of "The 165th and 166th Nishiyama Commemorative Lecture" 1997 (called as "Prior Art 2" hereafter). In the ROMELT Process, the preduction furnace is not installed, and as operations are carried out by the only smelting reduction furnace under an atmospheric pressure, it is unnecessary to dry coal and ores, and in these regards, this process is superior to the DIOS Process. However, since the net unit of coal is at least 1250 kg/t. the net unit of oxygen is at least 1000 $Nm^3/t$ and sensible heat and latent heat are large from several G to 10 Gcal/t, tremendous oxygen production and energy conversion facilities are required (Problem 1).

In the Prior Art 2, if the post combustion is increased, it could be expected to decrease the net unit of coal, but the heat load of the furnace wall is increased as the Prior Art 1 and the productivity is limited to around 1 t/h/m² (cross sectional area of the furnace) (Problem 2).

Alias FASTME Process and INMETCO Process are introduced at page 117 of "The 165th and 166th Nishiyama Commemorative Lecture" 1997 (called as "Prior Art 3" hereafter). The Prior Art 3 is introduced as a DRI (Directly Reduced Iron) production technique of coal base, not natural gas, which pelletizes coal powder and fine iron ore, and reduces until generation of metallic iron in a rotary hearth furnace. Further, MPT International (1997), pp50–61, introduces a technique which directly produces DRI in the rotary hearth furnace, not pelletizing fine iron ore and coal (called as "Prior Art 4" hereafter).

However, in the smelting process of the Prior Arts 3 or 4, since S content contained around 0.5 to 0.6% in coal is partially removed, [S] concentration remains at least around 0.1% in products DRI. Therefore, when DRI is used as a molten raw material in a steel making furnace directly producing steel as an electric furnace, a big problem arises that a desulfurization treatment of the molten steel is very expensive (Problem 3). 100% of the using amount of iron source in the steel making furnace cannot be directly reduced, and the iron source is supplied only partially for steel production (Problem 4). CAMP-ISIJ (1997), 723, introduces a technology of pre-reducing ores with volatile content separated from coal (called as "Prior Art 5" hereafter). As this report carries out an analysis ignoring combustion heat burning C till CO, the balance of heat material is not conformed. The ore reduction ratio is not so high as around 40%. Due to this unconformity, a comparison when using coal and char in the smelting reduction furnace is not properly made.

The above mentioned problems are summarized as follows.

Problem 1 [with respect to the Prior Arts 1 and 2]: Since the sensible heat and latent heat are very large in the generated gas in the smelting process, an immense oxygen production facility and the energy conversion facility are necessary, and the cost of equipment is high expensive.

Problem 2 [with respect to the Prior Arts 1 and 2]: Since a small sized oxygen production facility and energy conversion facility are made enough, if the post combustion is heightened, the heat load in the wall of the smelting furnace is considerably increased and accordingly the heat loss from the furnace is increased. The cooling water is much required for maintaining the water cooling structure and the process is unreal.

Problem 3 [with respect to the Prior Arts 3 and 4]: When DRI (direct reduction iron) is used as a molten raw material, the cost for desulfurization is very high.

Problem 4 [with respect to the Prior Arts 3 and 4]: In the cost, the iron source is supplied only partially for steel production in DRI.

Problems to be solved in the smelting reduction process extend over wide ranges, and when the smelting reduction process is introduced in many steel works, namely, mini-mills other than so-called consistent makers of from molten iron to steel products having facilities from furnaces until rolling mills, such smelting reduction process of the low cost of equipment is required which decreases the consumption amount of oxygen necessary for smelting and reducing iron ores and the generation amount of gas therefrom, and economical in the cost of facilities. Further, seeing the smelting reduction process in view of environmental harmony, an amount of generating carbon dioxide gas is almost equal to that of the blast furnace process, or as the case may be, anxiety might arise that the generation amount thereof will be high. Even if it can be curtailed, the rate is around 5% at the utmost than the molten iron by the blast furnace. That is, as far as coal is used as a main reducing material or fuel in the smelting reduction process, it cannot be expected to largely curtail the generation amount of carbon dioxide.

The iron making facility having the blast furnace is installed with a sintering machine and a coke oven, and the sintered ore and coke produced respectively in the sintering machine and the coke oven are charged into the blast furnace for producing molten iron. In the smelting process by the blast furnace (the blast furnace process), sintered ores of small grain size cannot be employed for maintaining permeability within the furnace. Therefore, the sintered ores produced by the sintering machine are sieved, and those of small grain size are re-sintered as returned ores. The production yield of the sintered ore is generally limited to around 85%. Coke of small grain size cannot be used in the blast furnace for the same reason. The coke produced in the coke furnace is sieved, and powder coke of small grain size is used for producing sintered ores.

On the other hand, in the molten iron producing process using the smelting reduction furnace of iron bath type (the smelting reduction process or iron bath type), a pre-treatment as the blast furnace process is not necessary for ores or carbonaceous materials, and ores and coal can be used per se as raw materials. But since ores or coal are charged into the furnace where the operation is carried out under a closed condition, when powder ores or powder coal are used, a previously drying process and a facility therefor are required in order that ores or coal are not adhered in the charging route.

DISCLOSURE OF THE INVENTION

It is an object of the present invention to offer a refining method for refining carbon non-saturated molten iron efficiently and economically and a smelting reduction method of the cheap cost of equipment.

To attain the object, firstly, the present invention provides a method for refining carbon non-saturated molten iron, comprising the steps of:

charging molten iron separated from slag into a molten iron refining container;

carrying out a desulfurizing treatment by supplying a desulfurizing agent to the molten iron in the molten iron refining container and agitating the molten iron;

heating the molten iron before or after the desulfurizing treatment; and decarburizing the desulfurized molten iron in a decarburizing furnace.

In the above mentioned carbon non saturated molten iron, preferably C is 4 wt % or lower.

The step of heating the molten iron is preferably to heat the molten iron by an arc heating as gas bubbling by blowing an inert gas into the molten iron. In the molten iron heating step, the carbonization may be carried out as heating the molten iron. When heating and carburizing, it is desirable that the inert gas is blown into the molten iron to effect bubbling in the molten iron, oxygen is blown onto the bath of the molten iron so as to heat the molten iron, and the carbonaceous material is injected into the molten iron to provide the carbonization. Instead of blowing oxygen onto the molten iron bath, it is sufficient to blow oxygen into the molten iron. It is preferable to supply the desulfurizing agent and a deoxidizing agent to the molten iron to effect the agitation for carrying out the desulfurization.

Secondly, the present invention provides a method for refining carbon non-saturated molten iron, comprising the steps of:

charging molten iron separated from slag into a molten iron refining container;

carrying out a desulfurizing treatment by supplying a desulfurizing agent to the molten iron in the molten iron refining container and agitating the molten iron;

carburizing the molten iron before or after the desulfurizing treatment; and decarburizing the desulfurized molten iron in a decarburizing furnace.

In the above step of carburizing molten iron, the heating may be carried out as carburizing the molten iron. When heating and carburizing, it is desirable that the inert gas is blown into the molten iron to effect bubbling in the molten iron, oxygen is blown onto the bath-of the molten iron so as to heat the molten iron, and the carbonaceous material is injected into the molten iron to provide the carbonization. Instead of blowing oxygen onto the molten iron bath, it is sufficient to blow oxygen into the molten iron. It is preferable to supply the desulfurizing agent and a deoxidizing agent to the molten iron to effect the agitation for carrying out the desulfurization.

In the above mentioned carbon non saturated molten iron, preferably C is 4 wt % or lower.

Thirdly, the present invention provides a method for refining a carbon non-saturated molten iron, comprising the steps of:

carrying out a desulfurization treatment in at least a one first reacting container of converter type; and carrying out a decarburization treatment in a second reacting container of converter type.

The desulfurization treatment is preferably performed by adding the desulfurizing agent to the molten iron and blowing an agitating gas of 0.05 $Nm^3$/min or more per ton of the molten iron. In the desulfurization, it is desirable to feed oxygen of 2.5 $Nm^3$/min or less per ton of the molten iron, and further, it is sufficient to supply the desulfurizing agent to the molten iron together with the carbonaceous material. The molten iron is charged into the molten iron refining container together with a solid iron source, oxygen is fed, the carbonaceous material is supplied, and after the solid iron source is dissolved, the desulfurization is performed.

Fourthly, the present invention provides a smelting reduction method for producing a molten iron, comprising the steps of:

(a) charging carbonaceous material and ores into a reacting furnace having a function of directly contacting the carbonaceous material and the ores;

(b) reducing the ores until at least one part of the ores is metallized, the ores containing at least one part of metallized metal being produced;

(c) charging the carbonaceous material from the reducing step (b) and the ores containing at least one part of metallized metal into a smelting furnace of metal bath type; and (d) blowing a gas containing oxygen 20% or more into the smelting furnace of metal bath for producing molten iron.

The smelting reduction process may have a step of charging the carbonaceous material and pre-reduced ores. It is desirable that the carbonaceous material to be charged into the reacting furnace has stoichiometrically an amount sufficient for reducing and metallizing all amount of the ores charged in the reacting furnace. The reacting furnace is desirably a rotary kiln type or rotary hearth type.

Fifthly, the present invention provides a smelting reduction method, comprising the steps of:

(a) charging carbonaceous material and ores into a reacting furnace having a function of directly contacting the carbonaceous material and the ores;

(b) partially reducing the ores in the reacting furnace, and de-volatilizing a volatile content of the carbonaceous material until less than 20%, (c) charging the de-volatilized carbonaceous material from the step (b) and partially reduced ores into the smelting furnace of metal bath type; and (d) blowing a gas containing oxygen 20% or more into the smelting furnace of metal bath type for producing molten iron.

Sixthly, the present invention provide a smelting reduction method, comprising the steps of:

preparing carbonaceous material at least part of which is de-volatilized;

charging the carbonaceous material and ores into the smelting furnace of metal bath type; and blowing a gas containing oxygen 20% or more into the smelting furnace of metal bath type for producing molten iron.

The ore is preferably pre-heated or pre-reduced.

Seventhly, the present invention provide a smelting reduction method, comprising the steps of:

charging raw materials containing at least one selected from a group composed of metallic oxide and metallic hydroxide and flux materials into a smelting reduction furnace;

supplying, as fuels and reducing agents, at least one selected from a group composed of coal and coke and at least one selected from a group composed of oil coke and waste plastic into the smelting reduction furnace; and heating and melting the raw materials and the flux materials by heat burning the fuels and the reducing materials with an oxygen containing gas.

Eighthly, the present invention provides an improvement of the iron making method using a blast furnace and a smelting reduction furnace of iron bath type.

In the iron making process installed with the blast furnace, the smelting reduction furnace of iron bath type and the sintering machine, the sintered ores of large size produced by the sintering machine are supplied into the blast furnace and those of small size are supplied into the smelting reduction furnace of iron bath type.

In the iron making process installed with the blast furnace and the smelting reduction furnace of iron bath type, iron making coke of large size is supplied into the blast furnace and coke of small size is supplied into the smelting reduction furnace of iron bath type.

BEST MODE FOR PRACTICING THE INVENTION

Embodiment 1

The refining process of Embodiment 1 aims at low carbon molten iron of the C level being 4 wt % or lower. Of such low carbon molten iron, the present refining process may be satisfactorily applied to refining of molten iron of relatively high S level (ordinarily, S: 0.2 wt % or higher). In general, as representatives of low carbon molten iron or low carbon and high S molten iron, there are enumerated such direct iron ore smelted reduced molten iron, or direct iron ore smelted reduced molten iron where solid iron sources as scraps are partially dissolved, so-called new iron source (iron source produced by using reducing materials of high S as coal), but not limited thereto. In particular, in case of long handling time from the molten iron making furnace to the steel making furnace, the present process is useful, as far as requiring the desulfurization, irrespective of high carbon molten iron.

Embodiment 1 is the refining process of low carbon molten iron after separated from slag of poured molten iron as well as slag of molten iron, and comprises a step of adding a desulfurizing agent to the molten iron in the molten iron refining container and if required a deoxidizing agent so as to agitate and desulfurize the molten iron, a step of heating and/or carburizing the molten iron in the molten iron refining container or the other molten iron refining container before or after the desulfurization, and a step of decarburizing the molten iron passed through these steps.

Figure 1A:
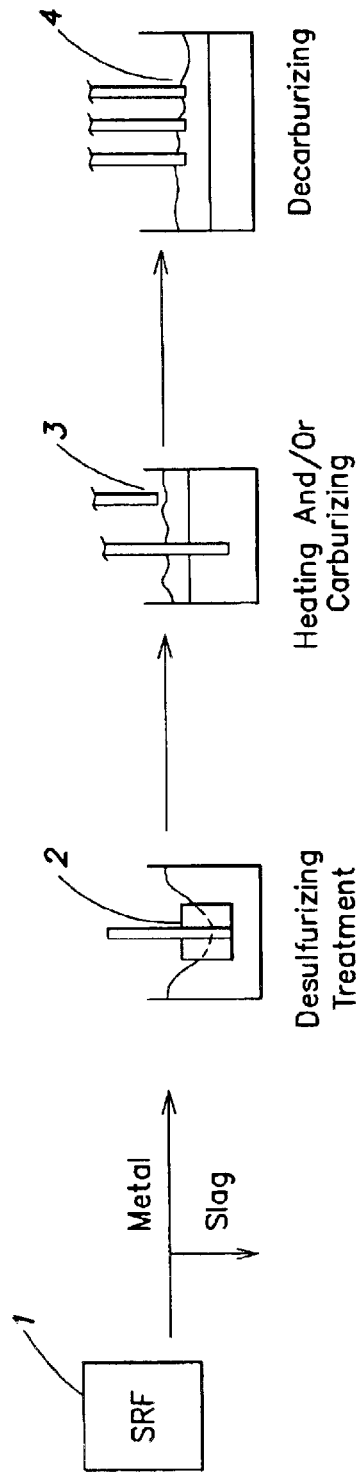
FIG. 1A is a schematic view showing a refining flow of a practicing mode 1.
Figure 1B:
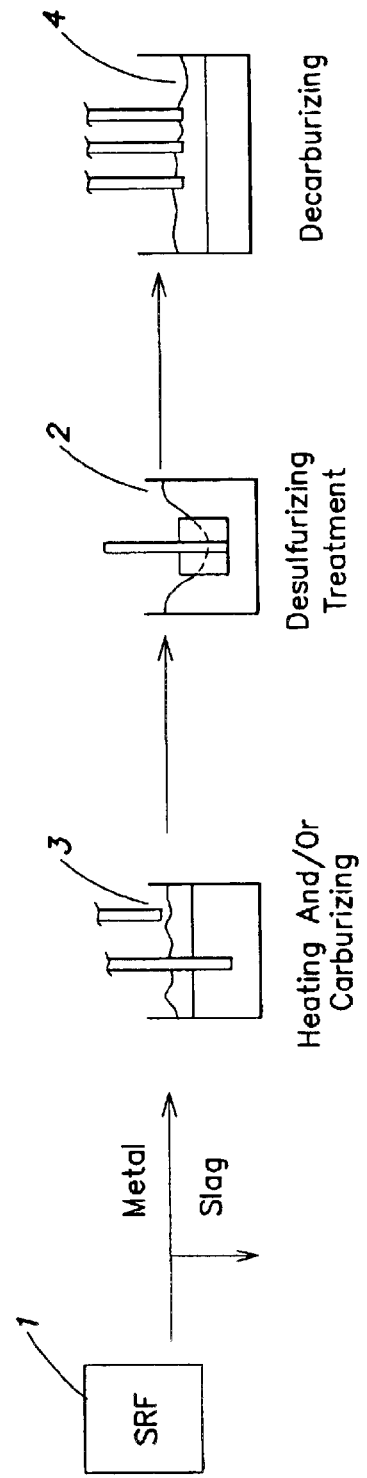
FIG. 1B is a schematic view showing another refining flow of Embodiment 1.

FIGS. 1A and 1B show the refining flow applied to refining of the smelted reduced molten iron.

In the refining flow of FIG. 1A, the smelted reduced molten iron poured from the smelting reduction furnace 1 and slag are separated, then, if necessary, remaining slag is removed by scraping a slag, thereafter the molten iron is transferred to the molten iron refining container 2 for desulfurization, and the desulfurizing agent and if required the deoxidizing agent are supplied to agitate the molten iron for carrying out the desulfurization.

In this desulfurizing treatment, the desulfurizing agent is added around 5 to 30 kg/t of the molten iron in response to S amount in the molten iron. Generally, around 20 kg/t is an amount for effective suspension in and mixture with the metal. Usually used desulfurizing agents contain CaO of main component, $CaF_2$ around 5 to 10% and $CaCO_3$ of some quantity.

The deoxidizing agent is added for lowering oxygen activity $a_o$ and accelerating the desulfurizing reaction, and ordinarily used deoxidizing agents are Al, Almix or alloy irons of FeSi or SiMn. It is preferable to add deoxidizing agent such that the oxygen activity $a_o$ in the Henry standard is $1/10^4$ or less, preferably $1/10^5$ or less. For example, in a case of Al, addition of around 0.5 to 2 kg/t of molten iron is preferable.

The agitation of the desulfurization may be any of the gas agitation and the mechanical agitation, but the mechanical agitation is better in dispersion into the molten iron than the gas agitation. In the gas agitation, there occur stagnant parts of the molten iron not agitated in the container, while in the mechanical agitation, such stagnant parts are difficult to occur. For these reasons, the mechanical agitation is preferable, since a strong agitation can be realized.

Figure 2A:
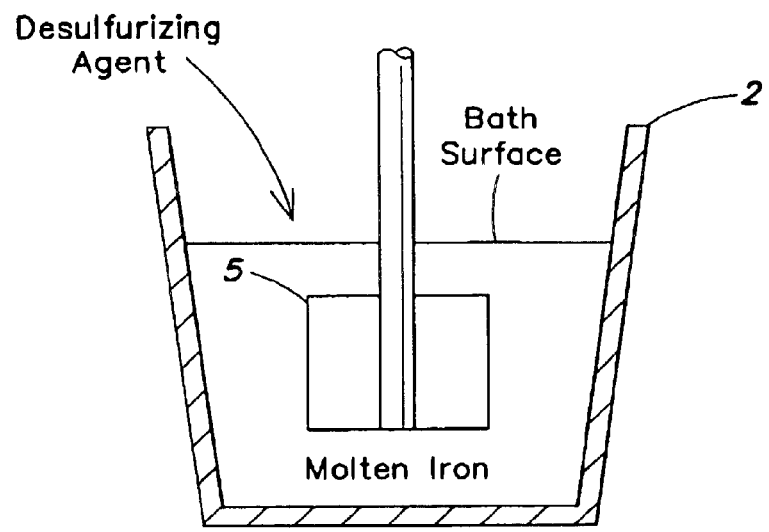
FIG. 2A is a view showing a molten iron refining container of mechanical agitation system to be used for a desulfurization treating process of Embodiment 1.
Figure 2B:
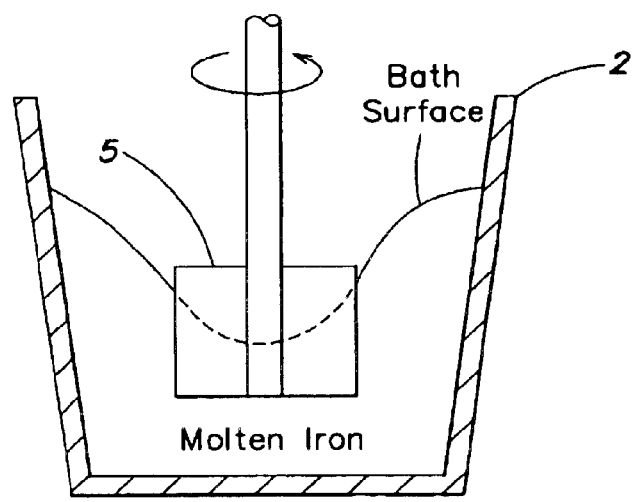
FIG. 2B is a vie showing a refining condition by the molten iron refining container of FIG. 2A.

FIG. 2 shows one example of the molten iron refining container for carrying out the mechanical agitation (the refining apparatus of the mechanical agitation system), FIG. 2A is a non-operative condition and FIG. 2B is an operative condition. The molten iron refining container 2 is provided with a molten iron agitating impeller 5, and also provided with an impeller vertically moving apparatus, chuting means for supplying the desulfurizing agent and the deoxidizing agent, and auxiliarily provided with a dust collector, a thermometer and a sampling apparatus (these not shown).

In the desulfurization treatment using the molten iron refining container 2, the desulfurizing agent and if necessary the deoxidizing agent are supplied to the molten iron in the container, and the agitating impeller immersed in the molten iron is rotated. Rotating speed is heightened until a predetermined agitating force is obtained, and then the agitation is performed for 3 to 15 minutes as the desulfurizing time. For example, when the charging amount of the molten iron in the container is 150 t, the agitating impeller 5 is actuated under the condition of rotation torque: 900 to 1000 kg-m and rotation number: 100 to 110 rpm, thereby enabling to provide a sufficient desulfurizing treatment. The agitating impeller 5 is rotated at higher speed than the above condition when the molten iron refining container is smaller than the above container, and it is rotated at lower speed than the above condition when the container is larger than the above container, so that the same effect as the above mentioned can be brought about.

As the actuating condition of the agitating impeller 5, as shown in FIG. 2B, the upper part of the impeller 5 is exposed in a concave shape of the bath surface formed by agitation, and it is preferable that the upper part of the impeller 5 can be directly observed from the upper part of the container, and the desulfurizing agent is fully involved into the molten iron, and the desulfurizing agent and the molten iron are completely agitated. Therefore, it is desirable to adjust the rotation number such that the acting condition of the impeller 5 is provided.

When the gas agitation is performed, if powder of the desulfurizing agent is injected, energy by the powder injection can be utilized, and desirably the strong agitation can be realized than simply injecting a gas. As the molten iron refining container, for example, containers furnished with gas blowing means as a bubbling lance or a bottom blowing nozzle are employed.

In the refining process of Embodiment 1, if an object to be refined is the molten iron containing the high level of S content as the direct iron ore smelted reduced molten iron, it is particularly preferable to add the deoxidizing agent together with the desulfurizing agent in the desulfurization process, whereby even if S in the molten iron is high as 0.3 to 0.4 wt %, S can be effectively lowered below 0.01 wt % in a short time. The low carbon and high S molten iron as the smelted reduced molten iron is different from the furnace molten iron, and as Si is low and does not work as the deoxidizing agent, the desulfurizing efficiency is bad with only addition of the desulfurizing agent. The low carbon and high S molten iron is high in the melting point and large in the desulfurizing degree, and so a rapid and efficient desulfurization is demanded. So, in the desulfurization of the low carbon and high S molten iron, it is most preferable to add the deoxidizing agent together with the desulfurizing agent and carry out the mechanical agitation excellent in the agitating performance for the effective desulfurization.

Embodiment 1 operates the step of heating and/or carburizing the molten iron before or after the desulfurizing step so as to make difference large between the melting point and the temperature of the molten iron. By this treatment, adherence of metal of the low carbon molten iron is improved, and allowable heating margin in a post-process as the decarburization may be secured. The heating and/or carburizing step may be performed before or after the desulfurizing process in the molten iron refining container for desulfurization or other molten iron refining containers.

If the heating and/or carburizing step is operated after the desulfurizing step, the temperature of the same may be lowered than operating before the desulfurization, and the heat loss is small and the wearing of the refractory or bubbling lance can be suppressed. On the other hand, if the heating and/or carburizing step is operated before the desulfurizing step, a hot slag having not been separated from the metal at pouring can be utilized as a slag for heating, and it can be substituted for all or part of flux to be supplied in this step. Thus, the net units of the flux or the fuel may be decreased.

In the refining flow of FIG. 1A, the desulfurized molten iron in the molten iron refining container 2 is transferred to a molten iron refining container 3 for practicing the heating and/or carburizing of the molten iron. On the other hand, in the refining flow of FIG. 1B, the heating and/or carburizing of the molten iron is practiced before the desulfurization in the molten iron refining container 2. That is, the molten iron separated from slag is, if necessary, scraped from the remaining slag, then received in the molten iron refining container 3, performed there with the heating and/or carburizing of the molten iron, and subjected to the desulfurization in the molten iron refining container 2.

This treatment is carried out aiming at the heating and/or carburizing of the molten iron, and never prevents dephosphorization nor the refinings in company with dephosphorizing reaction or desulfurizing reaction.

The amount of heating and heightening temperature and the amount of carbonization are determined taking into consideration the melting point of the molten iron and the allowable heating margin in the post-process. A carburizing level at carbonization is ordinarily 0.1 to 1 wt %, and in particular, if carburizing 0.5 wt % or higher, the degree of freedom of scrap mixing ratio is preferably increased during the decarburizing treatment in the post-process in the converter. When carburizing the molten iron, depending on the mode of the treatment, (for example, when dephosphorizing concurrently), the temperature of the molten iron after the treatment is often lower than before the treatment, and in such a case, part of the lowering of temperature of the molten iron is compensated by heating the molten iron, and as it is an object of the instant process (the heating and/or carburizing of the molten iron) to make large the allowable heat margin in view of the melting point of the molten iron, this case falls into the range of the invention.

Preferably, the heating and/or carburizing of the molten iron is carried out in the molten iron refining container having the arc heating function and the gas bubbling function, otherwise in the molten iron refining container having the heating function by blowing oxygen and the powder injection and/or gas bubbling function. As the former molten iron refining container, a ladle refining facility used in a molten iron treatment known as so-called LF process may be employed, and as the latter molten iron refining container, a molten iron processing facility used in a molten iron treatment known as so-called NRP process may be employed.

Figure 3:
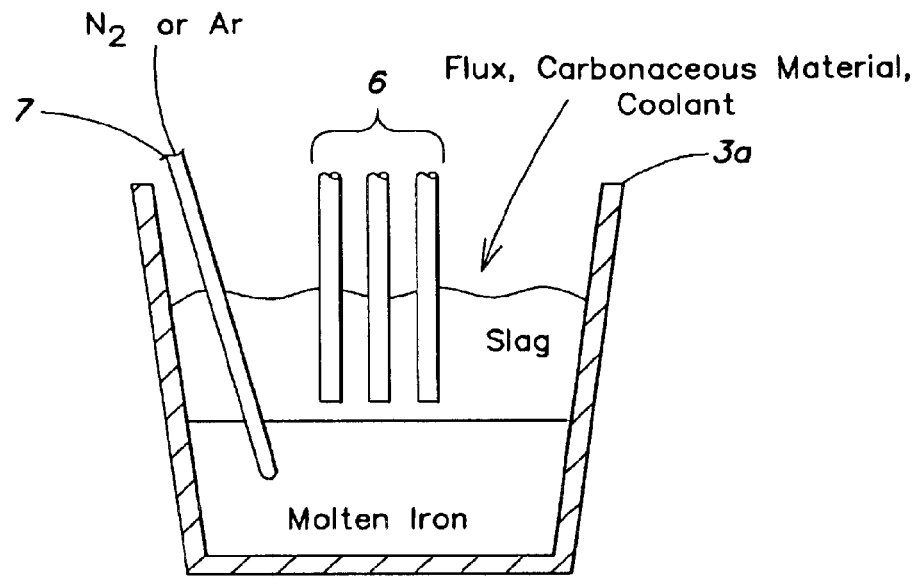
FIG. 3 is a schematic view showing the refining condition in the molten iron refining container used to the desulfurization treating process of Embodiment 1.

FIG. 3 shows one example of the molten iron refining container 3a having the arc heating function and the gas bubbling function, where 6 is electrodes (3-phase graphite electrode), 7 is a bubbling lance which can operate not only the gas bubbling but also the powder injection.

In the molten iron refining container 3a shown in FIG. 3, the inert gas such as $N_2$ or Ar is blown into the molten iron from the bubbling lance 7 under the existence of the molten slag ($CaO/SiO_2$: around 1 to 4) of around 10 to 20 kg/t of molten iron, and while bubbling thereby, the molten iron is heated by the arc heat of the electrodes 6 immersing at end parts in the slag. The amount of bubbling gas is not especially limited, and around 0.001 to 0.01 $Nm^3$/t/min is generally sufficient.

The slag used in this treating step may be generated by supplying the flux (generally, CaO is a main component), otherwise the remaining slag brought together with the molten iron may be utilized as a substitution for all or part of the flux to be supplied. Further in this treating step, if required, the carbonaceous material may be supplied for providing carbonization, or a cooling material may be supplied for controlling temperature. The supplying of the carbonaceous material, flux and cooling material may depend upon dropping by gravity or injection by the bubbling lance 7.

Generally, in the heating and/or carburizing step of the molten iron by the molten iron refining container 3, the desulfurizing reaction progresses simultaneously.

Figure 4:
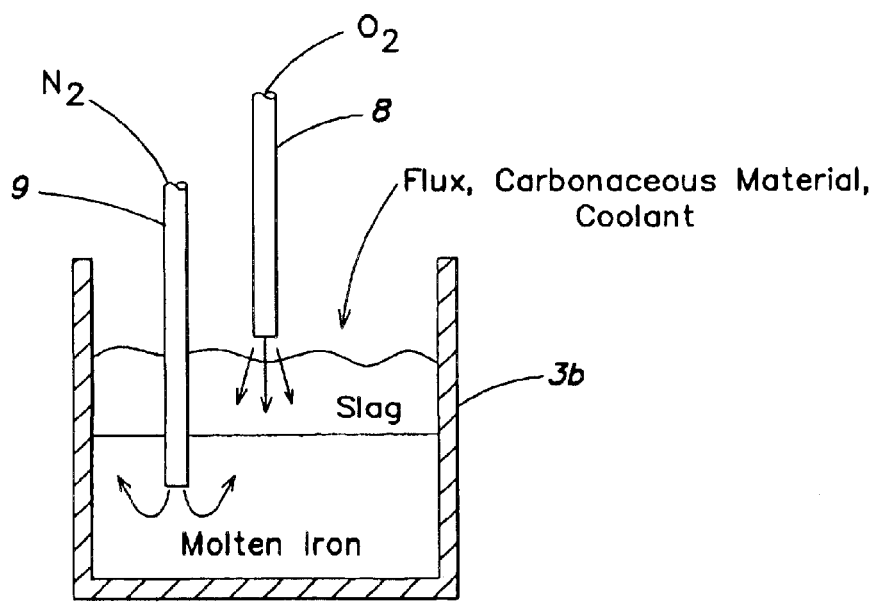
FIG. 4 is a schematic view showing the refining condition in the other molten iron refining container used to the desulfurization treating process of Embodiment 1.

FIG. 4 shows one example of the molten iron refining container having the heating function by blowing oxygen and the powder injection and/or gas bubbling function, where 8 is an oxygen blowing lance and 9 is a bubbling lance enabling to perform the powder injection and the gas bubbling.

In the molten iron refining container shown in FIG. 4, the inert gas such as $N_2$ or Ar is blown into the molten iron from the bubbling lance 9 under the existence of the molten slag a ($CaO/SiO_2$: around 1 to 4) of around 10 to 20 kg/t of molten iron, and while bubbling thereby, oxygen is blown (blowing of oxygen or oxygen containing gas) from the oxygen blowing lance 8, so that the molten iron is heated, or while blowing oxygen from the oxygen blowing lance 8, the carbonaceous material is injected through the bubbling lance 9 for compensating the lowering of C in the molten iron due to blowing of oxygen, and more preferably for lowering the melting point of the molten iron through the bubbling lance 9, and the carbonization is carried out.

The injection through the bubbling lance 9 may be utilized for supplying not only the carbonaceous material but also the flux or the cooling material. The amount of bubbling gas by the bubbling lance 9 and the amount of blowing oxygen by the oxygen blowing lance 8 are not especially limited, but it is generally sufficient that the bubbling gas amount is around 0.05 to 0.2 $Nm^3$/t/min of molten iron, and the oxygen blowing amount is around 5 to 10 $Nm^3$/t of molten iron.

The slag used in this treating step may be generated by supplying the flux (generally, CaO is a main component), otherwise the remaining slag brought together with the molten iron may be utilized as a substitution for all or part of the flux to be supplied. In the heating and/or carburizing step of the molten iron, it is expected that since oxygen is blown, the desulfurizing reaction and the dephosphorizing reaction progress at the same time.

In the treatment using the molten iron refining container shown in FIG. 4, mill scales, iron oxide, ores, sintered ores or Mn ores may be charged as solid oxygen source for adjusting the temperature, and for example, if Mn ores are supplied, the amount of Mn in the molten iron may be increased.

The molten iron having passed through the serial treatments including the above mentioned desulfurizing step and the heating and/or carburizing step of the molten iron is sent in succession to the decarburization, but if the slag of the desulfurizing step (provided that in case the desulfurizing reaction takes place in the heating and/or carburizing step of the molten iron, this step is also included) is brought into the decarburization, since re-sulfurization takes place, slag should be removed (slag scrape) in such a manner that the slag at least in the desulfurization is not brought into the decarburization.

Therefore, in the refining flow of FIG. 1A, it is indispensable to remove the slag after the desulfurization by at least the molten iron refining container 2 or after the heating and/or carburizing by the molten iron refining container 3, while in the refining flow of FIG. 1B, it is indispensable to remove the slag after the desulfurization by at least the molten iron refining container 2.

Further, if a slag of low basicity is brought into the desulfurizing step, since a high desulfurizing efficiency cannot be provided. the slag of low basicity should be removed before the desulfurization.

The molten iron having passed through the above mentioned serial treatments is sent to the decarburizing furnace 4 as the converter or electric furnace for the decarburization. This decarburizing treatment may follow the ordinary process.

If it is expected that the temperature of the molten iron goes down below a liquidus line on the way of the serial steps, the molten iron is sent to a pig casting machine on the way or in-between of appropriate steps to produce a cold pig, and this cold pig is charged into the smelting reduction furnace or the decarburizing furnace. In this case, a shape of the cold pig is preferably relatively small as 100 mm or smaller, more preferably 50 mm or smaller.

EXAMPLE 1

Following the refining flow shown in FIG. 1B, the under mentioned refining treatment of the direct iron ore smelted reduced molten iron was carried out. That is, the direct iron ore smelted reduced molten iron poured from the smelting reduction furnace 1 and the slag were separated, the remaining slag in the molten iron was removed by the slag scrape, then the molten iron was transferred to the molten iron refining container 3 shown in FIG. 4, the flux of 12 kg/t where burnt lime was main component and $CaO/SiO_2$ were adjusted to be around 3 (2 to 4) was supplied, oxygen was blown, the carbonaceous material (coke) of 10 kg/t and the dephosphorizing agent (CaO: 84%, $CaCO_3$: 10%, $CaF_2$: 6%) were injected for heating and carburizing the molten iron (further, dephosphorization). Then, the molten iron was transferred to the molten iron refining container 2 having the agitating impeller as shown in FIG. 2, and the desulfurizing agent (burnt lime: 19 kg/t and fluorite: 1 kg/t) and the deoxidizing agent (Al: 2 kg/t) were added thereto, and the desulfurization was carried out by the mechanical agitation. Subsequently, the desulfurized slag in the molten iron was removed by the slag scrape, and the molten iron was transferred to the decarburizing furnace 4 (electric furnace) for carrying out the decarburization.

Table 1 shows temperatures and [C], [P] and [S] in the molten iron before and after the respective steps, and the treating times in the steps.

According to the same, it is seen that the direct iron ore smelted reduced molten iron as the low carbon and high S molten iron can be refining-treated in short time and efficiently by the invention. Further, metal in the molten iron was not adhered in the serial procedure.

TABLE 1

| | Temperature of molten iron | Composition of molten iron (wt %) | | | Remarks |
|---|---|---|---|---|---|
| | | [C] | [P] | [S] | |
| Reduced molten iron | | | | | |
| When pouring molten iron | 1510° C. | 3.00 | 0.120 | 0.400 | — |
| When receiving molten iron | 1420° C. | 3.00 | 0.120 | 0.400 | After removing slag from molten iron |
| Heating + carbonization (Dephosphorization is also practiced) | | | | | |
| Before processing | 1400° C. | 3.00 | 0.120 | 0.400 | — |
| After processing | 1380° C. | 3.50 | 0.050 | 0.250 | Processing time: 30 min. |
| After removing slag | 1370° C. | 3.50 | 0.050 | 0.250 | Slag scrape: 15 min. |
| Desulphurization process | | | | | |
| Before processing | 1360° C. | 3.50 | 0.050 | 0.250 | — |
| After processing | 1330° C. | 3.50 | 0.050 | 0.010 | Processing time: 30 min. |
| After removing slag | 1320° C. | 3.50 | 0.050 | 0.010 | Slag scrape: 15 min. |
| Decarburization process | | | | | |
| Before processing | 1300° C. | 3.50 | 0.050 | 0.010 | — |
| After processing | 1620° C. | 0.05 | 0.015 | 0.010 | Processing time: 60 min. |

EXAMPLE 2

Following the refining flow shown in FIG. 1A, the under mentioned refining treatment of the direct iron ore smelted reduced molten iron was carried out. That is, the direct iron ore smelted reduced molten iron poured from the smelting reduction furnace 1 and the slag were separated, the remaining slag in the molten iron was removed by the slag scrape. Then, the molten iron was transferred to the molten iron refining container 2 having the agitating impeller as shown in FIG. 2, and the desulfurizing agent (burnt lime: 19 kg/t and fluorite: 1 kg/t) and the deoxidizing agent (Al: 2 kg/t) were added thereto, and the desulfurization was carried out by the mechanical agitation. Subsequently, desulfurized slag in the molten iron was removed by the slag scrape, and the molten iron was transferred to the molten iron refining container 3 as shown in FIG. 3, the flux of 10 kg/t where burnt lime was main component and $CaO/SiO_2$ were adjusted to be around 1.5 was supplied, the carbonaceous material (coke) of 7 kg/t was supplied, the flux was dissolved by immersing the electrodes in the flux and arc-heating, and further, heating and carburizing the molten iron. For accelerating heat conductivity and preventing the heat from biasing, $N_2$ gas was blown 0.004 $Nm^3$/t/min from the bubble lance during treating.

Table 2 shows temperatures and [C], [P] and [S] in the molten iron before and after the respective steps, and the treating times in the steps.

According to the same, it is seen that the direct iron ore smelted reduced molten iron as the low carbon and high S molten iron can be refining-treated in short time and efficiently by the invention. Further, metal in the molten iron was not adhered in the serial procedure.

TABLE 2

| | Temperature of molten iron | Composition of molten iron (wt %) | | | Remarks |
|---|---|---|---|---|---|
| | | [C] | [P] | [S] | |
| Reduced molten iron | | | | | |
| When pouring molten iron | 1510° C. | 3.00 | 0.120 | 0.400 | — |
| When receiving molten iron | 1420° C. | 3.00 | 0.120 | 0.400 | After removing slag from molten iron |

TABLE 2-continued

|  | Temperature of molten iron | Composition of molten iron (wt %) | | | Remarks |
| --- | --- | --- | --- | --- | --- |
| | | [C] | [P] | [S] | |
| Desulphurization process | | | | | |
| Before processing | 1400° C. | 3.00 | 0.120 | 0.400 | — |
| After processing | 1360° C. | 3.00 | 0.120 | 0.009 | Processing time: 30 min. |
| After removing slag Heating + carbonization | 1350° C. | 3.00 | 0.120 | 0.009 | Slag scrape: 15 min. |
| Before processing | 1340° C. | 3.00 | 0.120 | 0.009 | — |
| After processing | 1350° C. | 3.50 | 0.120 | 0.007 | Processing time: 30 min. |
| After removing slag Decarburization process | 1340° C. | 3.50 | 0.120 | 0.007 | Slag scrape: 15 min. |
| Before processing | 1320° C. | 3.50 | 0.120 | 0.007 | — |
| After processing | 1620° C. | 0.10 | 0.015 | 0.007 | Processing time: 60 min. |

Embodiment 2

Inventors of the present invention were based on a concept that a spare machine of the reacting container of converter type installed for repairing bricks of the furnace was utilized to the desulfurizing process, and used parts of a plurality of reacting containers of converter type for carrying out only the desulfurization treatment and considered the decarburizing treatment to be done in other reacting container of converter type. The reacting container of converter type referred to herein include converters of lateral blowing type, converters of top-lateral blowing type and other types other than generally used converters of top-bottom blowing type.

As the reacting container of converter type is large sized and has an enough free board, no problem arises in the desulfurization treatment, and steel making slag or smelting slag of high reactivity as the desulfurization agent can be much used because of the enough freeboard, so that the desulfurization can be performed efficiently, and total Fe in the slag can be reduced concurrently, heightening yield advantageously.

As the desulfurization reaction is the reducing reaction and since the supply of oxygen in the desulfurization treatment causes hindrance of the desulfurization reaction, it has conventionally been considered that the sending of oxygen should be avoided in the desulfurization treatment, but it has been found that when the desulfurization is performed in the converter typed reacting container under the strong agitation, the desulfurization reaction is scarcely hindered even if oxygen of a certain amount is sent. The carbonaceous material as coke contains sulfur content, and in ordinary operation of the converter, the supply of the carbonaceous material is largely restrained due to the problem of sulfurization, but when the desulfurization is done using the converter typed reacting container as a pre-process of the decarburizing treatment, since a step of supplying the carbonaceous material is the desulfurization treating step and the desulfurization is efficiently performed in the converter typed reacting container under the strong agitation, any problem scarcely occurs about the sulfurization to the molten iron by supplying the carbonaceous material, and it has been found that the carbonaceous material can be relatively much supplied.

Therefore, in the desulfurization treatment using the converter typed reacting container, the blowing of oxygen and the supplying of the carbonaceous material are easy, and the high temperature treatment advantageous to desulfurization can be performed. Further the maintenance of temperature in the molten iron is easy taking the allowable heat margin in the post-process into consideration. In addition, the lowering of [C] in the molten iron effected by supplying the carbonaceous material can be prevented, so that the decarburization to be treated in succession can be practiced very usefully in an aspect of securing the allowance heat margin.

In the desulfurization treatment using the converter typed reacting container, solid iron sources as scraps can be charged, and if oxygen and the carbonaceous material are charged appropriately, no hindrance occurs about the temperature of the molten iron after the treatment and the decarburization of the post-treatment, and the solid iron source can be effectively dissolved. Since the solid iron source is supplied in the desulfurization treating process, reduced iron of high S can be used as the solid iron source without any problem.

In the ordinary converter refining facility as mentioned above, the spare machine of the converter typed reacting container is provided for repairing bricks of the furnace, and the spare machine is at rest excepting the period of repairing furnace bricks for a very short period. Therefore, if using the converter typed reacting container of the spare machine, the desulfurization treatment is possible, not bearing any equipment burden as in the conventional desulfurization outside of furnace.

The molten iron refining process of the practicing mode 2 using parts (preferably, the converter typed reacting container) of a plurality of converter typed reacting containers for carrying out the desulfurization treatment, and it has been found that huge merits being not present in the prior art in both of the treating efficiency and the facility, and the following characteristics are brought about.

[1] The molten iron refining process, characterized by using the converter typed reacting containers of two or more, desulfurizing the molten iron in at least one converter typed reacting container, and decarburizing the desulfurized molten iron in the converter typed reacting container so as to produce liquid steel.

[2] The molten iron refining process of the above molten iron refining process [1], characterized in that the amount of blowing gas for agitating the molten iron in the converter typed reacting container for desulfurization is 0.05 Nm³/t/min or more of molten iron.

[3] The molten iron refining process of the above molten iron refining process [1] or [2], characterized in that the amount of blowing oxygen in the converter typed reacting container for desulfurization is 2.5 Nm³/t/min or more of molten iron.

[4] The molten iron refining process of any one of the above molten iron refining processes [1] to [3], characterized in that the carbonaceous material is supplied in the desulfurizing treatment.

[5] The molten iron refining process of any one of the above molten iron refining processes [1] to [4], characterized in that the desulfurizing agent and/or the carbonaceous material are blown from the agitating gas blowing nozzle of the converter typed reacting container for desulfurization.

[6] The molten iron refining process of any one of the above molten iron refining processes [1] to [5], characterized in that the solid iron source is charged together with the molten iron into the converter typed reacting container for desulfurization, oxygen is sent and the carbonaceous material is supplied to dissolve the solid iron source followed by the desulfurizing treatment.

[7] The molten iron refining process of any one of the above molten iron refining processes [1] to [6], characterized in that the steel making slag and/or the smelting slag are charged in the desulfurizing treatment.

Embodiment 2 is the molten iron refining process using the converter typed reacting containers of two or more, desulfurizing the molten iron in at least one converter typed reacting container, and decarburizing the desulfurized molten iron in the converter typed reacting container so as to produce liquid steel. Therefore, the inventive process no longer requires the desulfurization outside furnace conventionally performed excepting an especial case of producing ultra low S steel.

The desulfurizing process and the decarburizing process in Embodiment 2 can be performed using optionally different converter typed reacting containers, and accordingly it is possible to practice the treatments by respectively installing the converter typed reacting container for desulfurization and the converter typed reacting container for decarburization, but the most preferable and useful practicing mode of the invention is to utilize the converter typed reacting containers or two or more including the spare machine installed in the converter refining facility so as to carry out the desulfurizing treatment and the decarburizing treatment respectively.

The ordinary converter refining facility has a plurality (ordinarily, 2 or 3) of converter typed reacting containers including the spare machine for repairing furnace bricks. In general, the once operating period of the converter typed reacting container is around 4 to 5 months, and after this operating period, passing through the very short repairing period of the furnace bricks (ordinarily around two weeks, and during this repairing period, the converter typed reacting container of the spare machine is worked), the operation enters an ensuring working period. Otherwise, replacing the converter typed reacting container of the spare machine up to that time, the converter typed reacting container is at rest as the spare machine. Therefore, in a case of the facility installing the two converter typed reacting containers, there exists such a converter typed reacting container of the spare machine at rest for a full period excepting the above repairing period.

Thus, if such a converter typed reacting container of the spare machine at rest is utilized to the desulfurization of the molten iron, it is not necessary to provide a facility to be used exclusively for the desulfurizing treatment outside furnace, and while effectively using the facility, the desulfurizing treatment can be practiced. With respect to the repairing period when the two converter typed reacting containers are installed, the desulfurization is not performed only in this period (in this case, steel is poured as a high S steel), or a furnace body is exchanged (a spare furnace body is prepared and the only furnace body is exchanged) for the converter typed reacting container to be repaired in bricks, so that both converter typed reacting containers are ready for working.

Any especial limitation is not made to kinds of molten irons to be applied with Embodiment 2, and Embodiment 2 may be applied to refining of molten irons produced in the blast furnace or the smelting reduction furnace. Embodiment 2 is especially useful as the refining process of molten iron produced in the smelting reduction furnace. Namely, [S] in molten iron produced in the blast furnace is around 0.03 wt %, and it is sufficient to lower it less than 0.01 wt %. On the other hand, [S] in molten iron produced in the smelting reduction furnace is 0.3 to 0.4 wt % far higher than molten iron of the blast furnace. Accordingly, it is very difficult to decrease [S] of the high level till less than 0.01 wt %. In this regard, the inventive process makes use of the strong agitation of the converter typed reacting container and carries out the desulfurization in accordance with the following conditions, whereby the desulfurizing treatment can be performed without any problem, in spite of high S molten iron by the smelting reduction furnace, and the efficient refining can be performed including the decarburizing treatment to be operated in succession in the other converter typed reacting container.

Embodiment 2 makes use of the strong agitation performance in the converter typed reacting container so as to desulfurize the molten iron, for which the agitating gas as $N_2$ is supplied into the converter typed reacting container (in the case of the top-bottom blowing converter, the bottom blowing gas). The preferable blowing amount of the agitating gas is 0.05 Nm³/t/min or more, desirably 0.1 Nm³/t/min or more for providing desired strong agitation.

Figure 5:
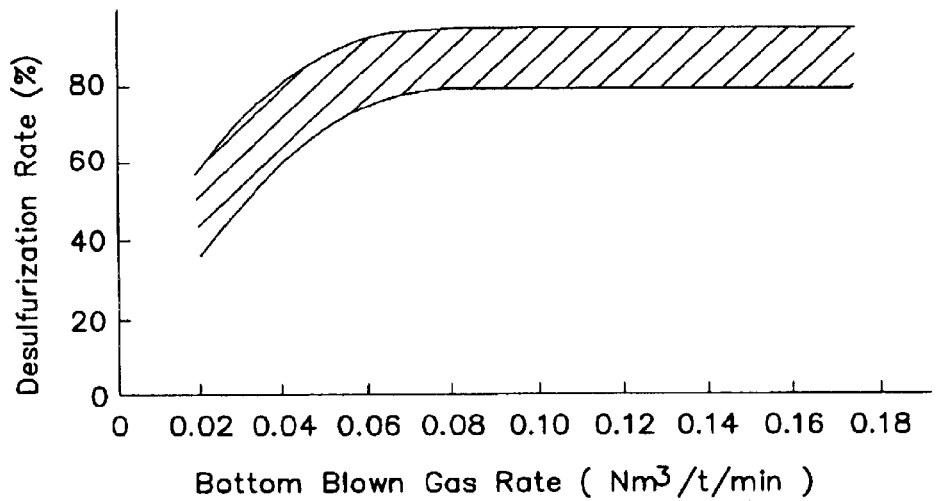
FIG. 5 is a graph showing the relation between bottom blown gas amount and refining condition when desulfurizing by means of a top blowing converter of Embodiment 2.

FIG. 5 shows the relation between the amount of bottom blowing gas (nitrogen gas) for agitation and the desulfurization rate when the desulfurization was carried out in the top-bottom converter (the oxygen blowing amount: 1.0 Nm³/t/min), and it is seen that the high desulfurization rate is obtained by determining the bottom blowing amount to be 0.05 Nm³/t/min or higher.

In the desulfurizing treatment, if necessary, oxygen is sent through an oxygen blowing lance (oxygen blowing). By sending oxygen, the treatment at high temperature advantageous to desulfurization is possible, and it is easy to secure the temperature of molten iron taking the allowable heat margin in the post-process into consideration, so that an ensuing decarburizing treatment can be usefully practiced. As the desulfurization reaction is, as mentioned above, the reducing reaction, and since the supply of oxygen or oxides in the desulfurization treatment causes hindrance of the desulfurization reaction, it has conventionally been considered that the blowing of oxygen should be basically avoided in the desulfurization treatment, but the inventors have been found that when the desulfurization is performed in the converter typed reacting container under the strong agitation, the desulfurization reaction is scarcely hindered even if oxygen of a certain amount is sent.

Taking temperature of molten iron after the desulfurization and the allowable heat margin in the post-process into consideration, the oxygen is supplied 2.5 Nm$^3$/t/min or less, preferably 2 Nm$^3$/t/min or less, more preferably 1.5 Nm$^3$/t/min or less, whereby the desulfurizing reaction is not hindered, the decarburizing reaction does not exceedingly progress, and the desulfurization can be operated at the high temperature of the molten iron. In view of the treating temperature, the temperature of the molten iron after treatment and the allowable heat margin of the post-process, the oxygen may not be blown.

If the amount of blowing oxygen exceeds 2.5 Nm$^3$/t/min, there occur such problems that the desulfurizing reaction is hindered and the desulfurizing efficiency is lowered, and further since the desulfurizing reaction advances and [C] in the molten iron is decreased no allowable heat margin exists in a desulfurization treatment to be in succession carried out in the other converter typed reacting container, and scraps are less dissolved and metal in the molten iron adheres to the facility.

Figure 6:
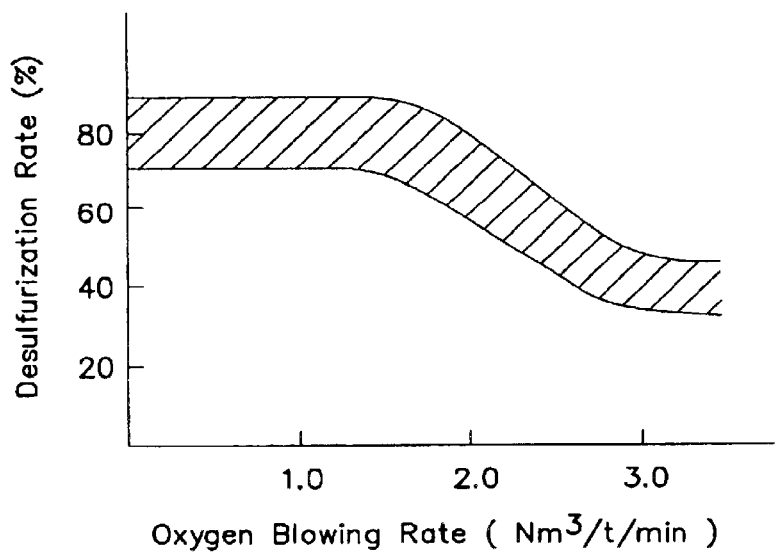
FIG. 6 is a graph showing the relation between oxygen feeding amount and desulfurizing effect when desulfurizing by means of a top blowing converter of Embodiment 2.

FIG. 6 shows the relation between the oxygen blowing amount and the desulfurizing rate when the desulfurizing treatment was carried out (the bottom blowing amount: 0.1 Nm$^3$/t/min), and if it is seen that the oxygen blowing amount exceeds 2.5 Nm$^3$/t/min, the desulfurizing efficiency becomes bad extremely.

In the practicing mode 2, influences of supplying the oxygen to the desulfurizing reaction are small in the above range, and it is preferable to supply oxygen within the limitation of the above supplying amount in view of shortening the treating time by high temperature and securing the temperature of the molten iron after the treatment.

In the desulfurizing treatment of the practicing mode 2, as the heat source, the carbonaceous materials as coke may be supplied for preventing the lowering of [C] in the molten iron by supplying oxygen. By supplying the carbonaceous material, the, treatment at high temperature advantageous to the desulfurization is possible in company with the effect by blowing oxygen, and it is easy to secure the temperature of the molten iron considering the allowable heat margin in the post-process, and the lowering of [C] in the molten iron is avoided, so that an ensuing decarburizing treatment can be performed advantageously. The amount of supplying the carbonaceous material as coke is determined taking the oxygen supplying amount into consideration in response to an objective [C] amount in the molten iron after the desulfurizing treatment.

The desulfurizing agent may be arbitrarily added in the desulfurizing treatment, and it is preferable that the desulfurizing treatment to be carried out in the invention is ended almost at the same time as the decarburizing treatment (ordinarily, around 15 minutes) to be carried out in the other converter typed reacting container, meeting the working pitch of the converter operating the decarburizing treatment. For enhancing the desulfurizing effect, the desulfurizing agent of lime powder (ordinarily, burnt line) as the main component is blown from the agitating gas blowing nozzle.

As the desulfurizing agents, one or two kinds or more of the steel making slag or molten iron slag may be charged, As mentioned above, the converter typed reacting container is large sized and has an enough freeboard, no problem arises in the desulfurization treatment, and steel making slag or smelting slag of high reactivity as the desulfurization agent can be much used because of the enough freeboard, so that the desulfurization can be performed efficiently, and total Fe in the slag can be reduced concurrently, heightening yield advantageously. For example, a slag of total Fe being around 5 wt % is used, total Fe in the slag after the treatment can be lowered to around 0.05 wt %.

Accordingly, when the molten iron produced in the smelting reduction furnace is subjected to the desulfurizing treatment, if the direct iron ore smelted reduced slag is supplied as the desulfurizing agent, the molten iron of high S can be efficiently desulfurized and the yield can be heightened.

The carbonaceous material or the desulfurizing agent are charged by arbitrary manner such as dropping due to gravity from the upper part of the furnace by the charging apparatus or blowing from the agitating gas blowing nozzle (injection), and the blowing from the agitating gas blowing nozzle is more advantageous in the following aspects that (1) in the blowing method, since powder having large specific surface area is used as the carbonaceous material or the desulfurizing agent, the reactivity with the molten iron can be heightened, (2) due to the energy of the blown powder (carbonaceous material, desulfurizing agent), the strong agitation can be effected in comparison with the blowing of the only agitating gas and the reaction efficiency can be heightened by such an amount, and (3) as powders of the blown carbonaceous material or the desulfurizing agent pass through the molten iron until they float on the slag, the reactivity or the agitating performance can be heightened by such amounts.

With respect to the agitating gas blowing nozzle, for example, in a case of the top-bottom blowing converter, it is the bottom blowing nozzle from which the carbonaceous material or the desulfurizing agent are blown.

Aiming at enhancing of the desulfurizing efficiency, after blowing oxygen, metal Al, Al containing substances, alloys of FeSi or SiMn, or SiC are supplied as the deoxidizing agent, and by supplying these substances, the slag-metal is agitated, so that further high desulfurizing efficiency can be provided. These deoxidizing agents may be supplied in dependence on dropping due to gravity from the upper part of the furnace, but if blowing from the agitating gas blowing nozzle, loss by the slag can be effectively decreased.

As the desulfurizing treatment of the practicing mode 2 utilizes the converter typed reacting container, the solid iron source as scraps can be charged and dissolved in the desulfurization treating step, and for dissolving the solid iron source, the heat is supplied by charging oxygen or carbonaceous material, so that bad influences are not affected to the temperature of the molten iron after the treatment and the decarburizing treatment of the post-process.

As the solid iron source is dissolved in the desulfurizing treatment, no problem arises if the solid iron source such as reduced iron having high sulfur content, and it is possible to employ, as the solid iron source, the reduced iron of the high S content or a molten iron solidified in the casting machine prior to the desulfurizing treatment which were difficult to use in the conventional steel-making process.

Accordingly, in Embodiment 2, the solid iron sources of one kind or more selected from reduced iron, scrap or molten iron are charged into the converter typed reacting container performing the desulfurization, and dissolved by supplying oxygen and the carbonaceous material, followed by the desulfurization.

The molten iron desulfurized in at least one converter typed reacting container is transferred to the other converter typed reacting container via a transferring container, and is subjected to the decarburizing treatment (if required, the dephosphorizing treatment at the same time). This decarburization is not especially limited but follows the ordinary conditions.

As the converter typed reacting containers to be employed in the practicing mode 2, there are the top-bottom blowing type converter, the lateral blowing type converter, or the top-lateral blowing type converter. With respect to the converter typed reacting container to be served especially to the desulfurization, the top-bottom blowing type converter is more excellent in the reaction efficiency because of a wide reacting range of the slag-metal interface than the lateral blowing type converter or the top-lateral blowing type converter, and an improvement of the desulfurizing efficiency can be desirably expected.

The molten iron refining process of the practicing mode 2 has advantages as mentioned under in comparison with the prior art performing the desulfurizing treatment outside furnace.

(1) Since the spare machine at rest ordinarily of the converter typed reacting container can be utilized as it is for the desulfurizing treatment, the desulfurization can be carried out without bearing any equipment burden as the conventional desulfurizing treatment outside furnace.

(2) Since the converter typed reacting container for the desulfurization has an enough freeboard, no problem arises in the desulfurization treatment, and steel making slag or smelting slag of high reactivity as the desulfurization agent can be much used, so that the desulfurization can be performed efficiently, and total Fe in the slag can be reduced concurrently, heightening yield advantageously.

(3) In the desulfurizing treatment, oxygen and the carbonaceous material can be supplied by using the oxygen blowing lance of the converter typed reacting container. In the prior art, since the supply of oxygen content in the desulfurization treatment causes hindrance of the desulfurization reaction, it has been considered that the blowing of oxygen should be basically avoided in the desulfurization treatment, but when the desulfurization is performed in the converter typed reacting container under the strong agitation, the desulfurization reaction is scarcely hindered even if oxygen of a certain amount is sent. The carbonaceous material as coke contains sulfur content, and in ordinary operation of the converter, the supply of the carbonaceous material is largely restrained due to the problem of sulfurization, but since a step of supplying the carbonaceous material is the desulfurization treating step and the desulfurization is efficiently performed in the converter typed reacting container under the strong agitation, any problem scarcely occurs about the sulfurization to the molten iron by supplying the carbonaceous material, and the carbonaceous material can be relatively much supplied.

Thus, in the desulfurization using the converter typed reacting container, it is relatively easy to supply oxygen and the carbonaceous material, and the treatment at high temperature advantageous to the desulfurization is possible, and the temperature of the molten iron is easily secured considering the allowable heat margin in the post-process. Therefore, the scrap can be much charged in the desulfurization treating step.

(4) Since the carbonaceous material as coke can be supplied in the desulfurizing treatment, [C] in the molten iron can be prevented from lowering, and an ensuing decarburizing treatment to be operated in succession can be practiced very usefully. The charging amount of scrap is largely increased in company with securing of the temperature of the molten iron. Further, by supplying the carbonaceous material to carbonize the molten iron, the generated gas of high quality can be much obtained in the decarburization.

(5) Since the desulfurizing treatment utilizes the converter typed reacting container, the solid iron source as scraps can be charged, and by appropriately charging oxygen or carbonaceous material as mentioned above, bad influences are not affected to the temperature of the molten iron after the treatment and the decarburizing treatment of the post-process, and the solid iron source can be dissolved. As a result, it is possible to largely increase the amount of consuming the solid iron source as scrap in the whole of the refining process including the decarburization treating step. Further, as the solid iron source is charged in the desulfurizing treatment, no problem arises if the solid iron source such as reduced iron having high sulfur content, and it is possible to employ, as the solid iron source, the reduced iron of the high S content or a molten iron solidified in the casting machine prior to the desulfurizing treatment, which were difficult to use in the conventional steel-making process.

(6) The molten iron refining process of the practicing mode 2 is especially useful to refining of molten iron produced in the smelting reduction furnace. Namely, [S] in molten iron produced in the smelting reduction furnace is far higher than that of molten iron of the blast furnace, and in the conventional desulfurization outside furnace, it is difficult to lower [S] of the high level to the predetermined level. On the other hand, the inventive process makes use of the strong agitating function of the converter typed reacting container and carries out the desulfurization in accordance with the above mentioned conditions, whereby the desulfurizing treatment can be performed without any problem, in spite of high S molten iron by the smelting reduction furnace, and the efficient refining can be performed including the decarburizing treatment to be operated in succession in the other converter typed reacting container.

The converter typed reacting containers of two or more to be served in the practicing mode 2 are desirably used to both of the desulfurization and the decarburization, when assuming the ordinary operating mode, and as the refractory for the converter typed reacting container, it is preferable to use bricks of MgO—C group having high durability to both of desulfurization and decarburization.

EXAMPLE 1

The 100 t molten iron was charged into the 100 t converter (the content volume 90 m$^3$ after laying bricks), the amount of the bottom blowing gas was 0.1 Nm$^3$/t/min of molten iron, burnt lime of 5 kg/t of molten iron was dropped by gravity, and the desulfurizing treatment was practiced. In this desulfurizing treatment, [S] was decreased from 0.032 wt % to 0.010 wt % for around 15 minutes from starting of the treatment as shown under.

|  | [C] | [S] | Temp. of Molten Iron |
|---|---|---|---|
| Before treatment | 4.5 wt % | 0.032 wt % | 1400° C. |
| After treatment | 4.5 wt % | 0.010 wt % | 1360° C. |

Subsequently, the desulfurized molten iron was carried out with the decarburizing treatment in another converter, and the steel of [C]: 0.05 wt % and [S]: 0.010 wt % was produced.

EXAMPLE 2

The 100 t molten iron was charged into the 100 t converter (the content volume 90 m$^3$ after laying bricks), the amount of the bottom blowing gas was 0.5 Nm$^3$/t/min of molten iron, burnt lime of 5 kg/t of molten iron was dropped by gravity, and the desulfurizing treatment was practiced. In this desulfurizing treatment, [S] was decreased from 0.032 wt % to 0.007 wt % for around 10 minutes from starting of the treatment as shown under.

|  | [C] | [S] | Temp. of Molten Iron |
|---|---|---|---|
| Before treatment | 4.5 wt % | 0.032 wt % | 1400° C. |
| After treatment | 4.5 wt % | 0.007 wt % | 1360° C. |

Subsequently, the desulfurized molten iron was carried out with the decarburizing treatment in another converter, and the steel of [C]: 0.05 wt % and [S]: 0.007 wt % was produced.

EXAMPLE 3

The 200 t molten iron of [C]: around 3 wt % and [S]: around 0.3 wt % was charged into the 100 t converter (the content volume 90 m$^3$ after laying bricks), the 60 t slag of [total Fe]: around 5 wt % and [CaO]/[SiO$_2$]: 1.2 produced in the step of producing said molten iron was charged, the amount of blowing oxygen from the lance was 10000 Nm$^3$/h, the amount of the bottom blowing gas was 1 Nm$^3$/h, the amount of charging coke was 7 t, and the desulfurizing treatment was practiced. In this desulfurizing treatment, [S]was decreased from 0.305 wt % to 0.010 wt % for around 30 minutes from starting of the treatment as shown under. The temperature of the molten iron could be increased 50° C.

|  | [C] | [S] | Temp. of Molten iron |
|---|---|---|---|
| Before treatment | 3.1 wt % | 0.305 wt % | 1400° C. |
| After treatment | 4.5 wt % | 0.010 wt % | 1450° C. |

Subsequently, the desulfurized molten iron was divided in another converter by 100 t and the decarburizing treatment was carried out, and the steel of [C]: 0.05 wt % and [S]: 0.010 wt % was produced.

EXAMPLE 4

The 100 t molten iron was charged into the 100 t converter (the content volume 90 m$^3$ after laying bricks), the amount of the bottom blowing gas was 0.5 Nm$^3$/min of molten iron, burnt lime of 5 kg/t of molten iron was blown from the bottom blowing nozzle and the decarburizing treatment was carried out. In this desulfurizing treatment, [S] was decreased from 0.032 wt % to 0.002 wt % for around 5 minutes from starting of the treatment as shown under.

|  | [C] | [S] | Temp. of Molten Iron |
|---|---|---|---|
| Before treatment | 4.5 wt % | 0.032 wt % | 1400° C. |
| After treatment | 4.5 wt % | 0.002 wt % | 1380° C. |

Subsequently, the desulfurized molten iron was carried out with the decarburizing treatment in another converter, and the steel of [C]: 0.05 wt % and [S]: 0.002 wt % was produced.

EXAMPLE 5

The 100 t molten iron was charged into the 100 t converter (the content volume 90 m$^3$ after laying bricks), the amount of the bottom blowing gas was 0.1 Nm$^3$/t/min of molten iron, burnt lime of 5 kg/t of molten iron and Al was 0.2 kg/t of molten iron were charged, and the desulfurizing treatment was carried. In this desulfurizing treatment, [S] was decreased from 0.032 wt % to 0.002 wt % for around 5 minutes from starting of the treatment as shown under.

|  | [C] | [S] | Temp. of Molten Iron |
|---|---|---|---|
| Before treatment | 4.5 wt % | 0.032 wt % | 1380° C. |
| After treatment | 4.5 wt % | 0.002 wt % | 1400° C. |

Subsequently, the desulfurized molten iron was carried out with the decarburizing treatment in another converter, and the steel of [C]: 0.05 wt % and [S]: 0.002 wt % was produced.

EXAMPLE 6

The 100 t molten iron was charged into the 100 t converter (the content volume 90 m$^3$ after laying bricks), the amount of the bottom blowing gas was 0.5 Nm$^3$/t/min of molten iron, burnt lime of 5 kg/t of molten iron and coke of 20 kg/t of molten iron were charged, and oxygen of 5000 Nm$^3$/t/min of molten iron was sent from the lance, and the desulfurizing treatment was practiced. In this desulfurizing treatment, [S] was decreased from 0.032 wt % to 0.015 wt % for around 10 minutes from starting of the treatment as shown under, and [C] was increased from 3.2 wt % to 4.5 wt %.

|  | [C] | [S] | Temp. of molten Iron |
|---|---|---|---|
| Before treatment | 3.2 wt % | 0.032 wt % | 1380° C. |
| After treatment | 4.5 wt % | 0.015 wt % | 1400° C. |

Herein, Temp.: Temperature; and M.M.: Molten iron

Subsequently, the desulfurized molten iron was carried out with the decarburizing treatment in another converter, and the steel of [C]: 0.05 wt % and [S]: 0.015 wt % was produced.

Embodiment 3

From the above mentioned viewpoints, the inventors have made studies to develop the smelting reduction process of metal, and consequently accomplished the under mentioned findings.

In the process of producing molten iron by blowing gas containing oxygen of 20% or more at room temperature or preheated, while charging iron ores and carbonaceous material into the smelting furnace of iron bath type, that is, the direct iron ore smelting and reduction furnace, coal was previously de-volatilized to prepare a char as the carbonaceous material to be charged into the smelting reduction furnace, and by using the char, even if a post combustion rate was remarkably heightened than the prior art level in the smelting reduction furnace, the heat load in the furnace wall could be controlled to be low. The inventors tested to clear how the heat load of the furnace wall was changed with respect to increasing of the post combustion rate when de-volatilizing coal to be charged as the carbonaceous material in the smelting reduction furnace and decreasing the containing rate of the remaining volatilized substance (VM), and obtained the results shown in FIG. 7.

Figure 7:
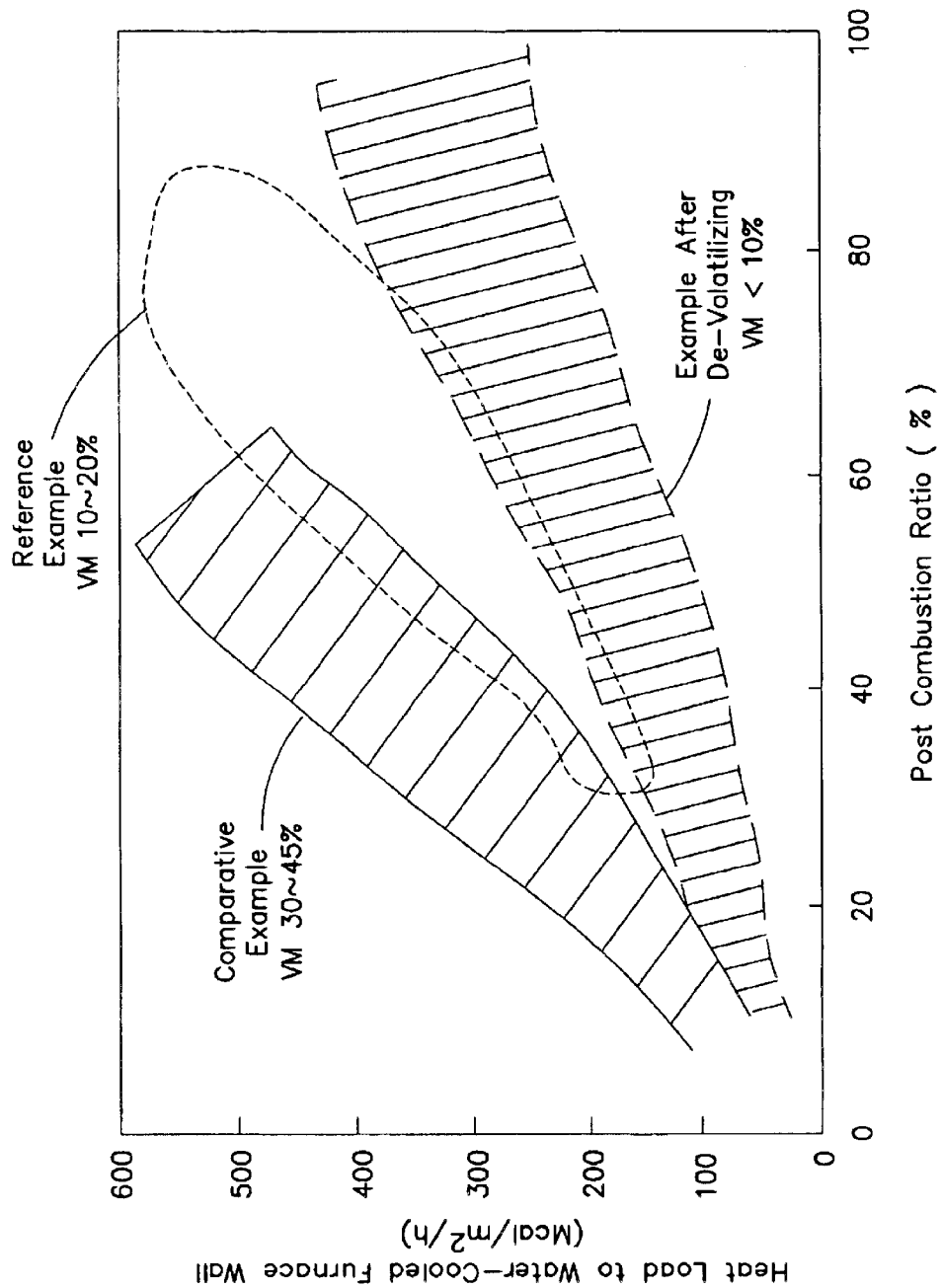
FIG. 7 is a graph showing influences of de-volatilizing degree of the carbonaceous material to the heat load of the furnace wall and the post combustion ratio of the smelting reduction furnace in Embodiment 3.

As is seen from FIG. 7, if the content of volatilizing substance in coal to be charged into the smelting reduction to be less than 10 wt %, the heat load of the furnace wall is considerably decreased in comparison with using of coal not de-volatilized at all (VM: 30 to 45%). The decreasing degree is around ⅓ in average.

For accomplishing the object of the present invention, the inventors paid attention to the using of char generated by de-volatilizing the coal as the carbonaceous material to be charged into the smelting reduction in the above mentioned DIOS Process. Following this attention, it was conceived that the char would be used in the pre-reduction furnace in the DIOS Process, and the inventors got to an absolutely new idea that, in the pre-reduction procedure, the pre-reducing rate was heightened above the conventional level, and at the same time, a reacting furnace having a function to change the coal into the char through volatilization had to be employed as the pre-reduction furnace.

This Embodiment 3 is based on the above mentioned finding and original idea.

A first smelting reduction process of metal, which charges the carbonaceous material and oxide or hydroxide ore into the prereduction furnace, pre-reduces the oxide or hydroxide ore with the carbonaceous material, charges the pre-reduced oxide or hydroxide ore and the carbonaceous material into the smelting reduction of metal bath type, and at the same time blows gas containing oxygen of 20% or more at room temperature or preheated, thereby to produce the direct iron or smelted reduced molten iron, is characterized in that materials pre-reduced in the under (a) step are used as the pre-reduced oxide or hydroxide ore.

The Step (a): Used is a reacting furnace having a function of directly contacting the carbonaceous material and oxide or hydroxide ores, into which the carbonaceous material and oxide or hydroxide ores are charged, and at least parts of the oxide or hydroxide ores are reduced until metallization, and the oxide or hydroxide ores containing at least parts of the thus metallized metal are prepared.

A second smelting reduction process of metal, which charges the carbonaceous material and the pre-reduced oxide or hydroxide ores into the smelting furnace of metal bath type, and at the same time blows gas containing oxygen of 20% or more at room temperature or preheated, thereby to produce the smelted molten iron, is characterized in that the carbonaceous material and the pre-reduced oxide or hydroxide ores to be charged into the smelting furnace molten bath type are respectively contained with the oxides pre-reduced in the under (b) step or the hydroxide ores and the carbonaceous material.

The Step (b): Used is a reacting furnace having a function of directly contacting the carbonaceous material and oxide or hydroxide ores, into which the carbonaceous material and oxide or hydroxide ores are charged, and at least parts of the oxide or hydroxide ores are reduced until metallization, and the oxide or hydroxide ores containing at least parts of the thus metallized metal and the carbonaceous material containing at least parts of the char generated by de-volatilizing the coal are prepared.

A third smelting reduction process of metal, in the first and second processes, is characterized in that the amount of the carbonaceous material to be charged into the prereduction furnace is above an amount required stoichometrically so as to metallize all amount of the oxides or hydroxide ores by pre-reduction.

A fourth smelting reduction process of metal, in any one of the first to third processes, is characterized in that the carbonaceous material to be charged in the prereduction furnace contains the char generated by de-volatilizing the coal.

A fifth smelting reduction process of metal, in any one of the first to fourth processes, is characterized in that the prereduction furnace is the reacting furnace of a rotary kiln type or rotary hearth type.

A sixth smelting reduction process of metal, which charges the carbonaceous material and the oxide or hydroxide ores into the smelting furnace of metal bath type, and at the same time blows gas containing oxygen of 20% or more at room temperature or preheated into the smelting furnace, thereby to produce the direct iron or smelted reduced molten iron, is characterized in that the carbonaceous material, at least parts of which are previously de-volatilized is used as the carbonaceous material to be charged into the smelting reduction furnace of metal bath type.

A seventh smelting reduction process of metal, in the sixth process, is characterized in that the oxide or hydroxide ores are pre-heated and/or pre-reduced, and the obtained pre-heated and/or pre-reduced oxides or hydroxide ores are charged into the smelting furnace of metal bath type.

An eighth smelting reduction process of metal, in the seventh process, is characterized in that the carbonaceous material to be charged into the smelting furnace of metal bath type is at least parts de-volatilized when preheating and/or pre-reducing.

A ninth smelting reduction process of metal, in the seventh or eighth process, is characterized in that the prereduction furnace is the reacting furnace of a rotary kiln type or rotary hearth type.

Further reference will be made to the practicing mode of the invention, the reducing reaction accompanied with the practice, the working and the effects.

(1) MODE

[1st Mode]

Figure 8:
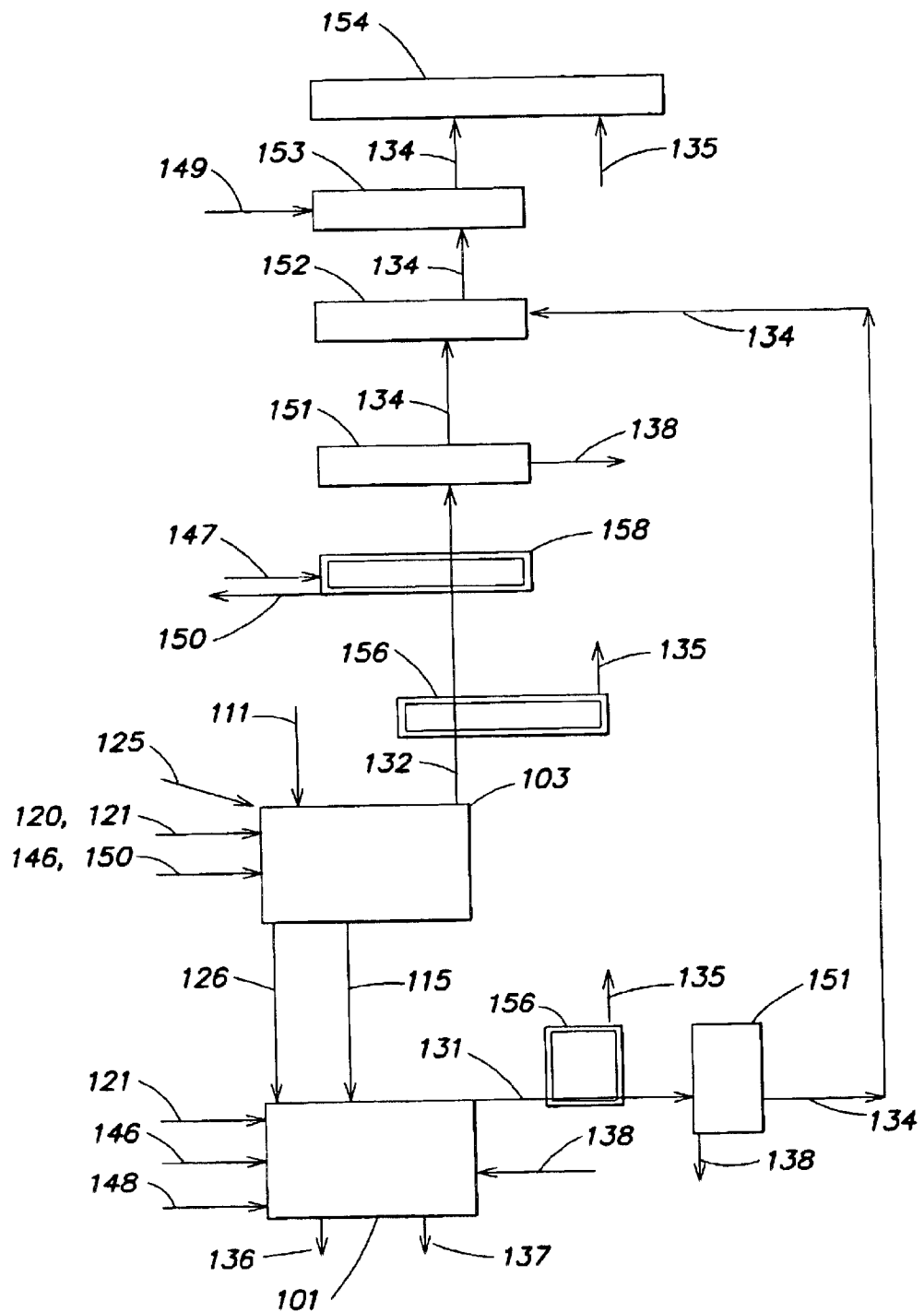
FIG. 8 is an equipment flow chart used in examples 2 to 4 of Embodiment 3.

FIG. 8 shows one example of the schematic flow chart of the facility to be used when the invention is practiced. As shown in the same, raw ores 111 and raw coal 121 are successively charged into a furnace 103 as the pre-reduction furnace for directly contacting the pre-reducing carbonaceous material and ores (excepting, for example, the rotary kiln or the rotary hearth type furnace, such as a furnace which leads the gas generated in the smelting reduction furnace to the pre-reduction fluidized bed for performing the reducing treatment, and in which an atmosphere around ores are not affected with influences of the carbonaceous materials), high calorie fuels 120 are supplied, and a mixed gas of oxygen 146 and a pre-heated air 150 is blown thereinto so as to pre-reduce the raw ores 111. Raw auxiliary materials 125 as burnt lime or raw dolomite are then charged into the directly contacting furnace 103. Depending on the pre-reducing conditions (the feed speed of the raw carbonaceous material or the pre-reducing temperature), the de-volatilization of the raw carbonaceous material 121 progresses and becomes the char. In such a way, the raw ores 111 are pre-reduced and get a predetermined reduction rate, and a reduced iron 115 including char containing metallized iron depending on the reduction rate is continuously produced.

The reduced iron 115 containing the char pre-reduced in the directly contacting furnace 103 is continuously charged into the smelting reduction furnace 101. In the smelting reduction furnace 101, auxiliary raw material 126 as burnt lime or light burnt dolomite, the carbonaceous material, oxygen and the air are also appropriately blown, so that the reduced iron is subjected to the directly smelting reduction process. For entering the smelting reduction process, nitrogen gas 148 is blown into the direct iron smelting reduction furnace 101 so as to strengthen the bath agitation. Thus, the iron bath and the slag bath are formed in the furnace 101, and the molten iron 136 and the slag 137 are discharged.

On the other hand, as shown in FIG. 8, there are, as incidental facilities, a dust collector 153, a steam recovery boiler 156, a generator 154, and an air preheating heat exchanger 158, which treat the generated gas 131 exhausted from the furnace 101 and the occurring gas 132 exhausted from the directly contacting furnace 103. From the generated gas 131 and the occurring gas 132, a recovered dust 138 is recycled to the furnace 101, and a sensible gas heat is recovered by a steam recovery boiler 156. Further, the occurring gas 132 is stored in a gas holder 152 and is supplied to a generator facility 154 for power generation.

[2nd Mode]

Figure 12:
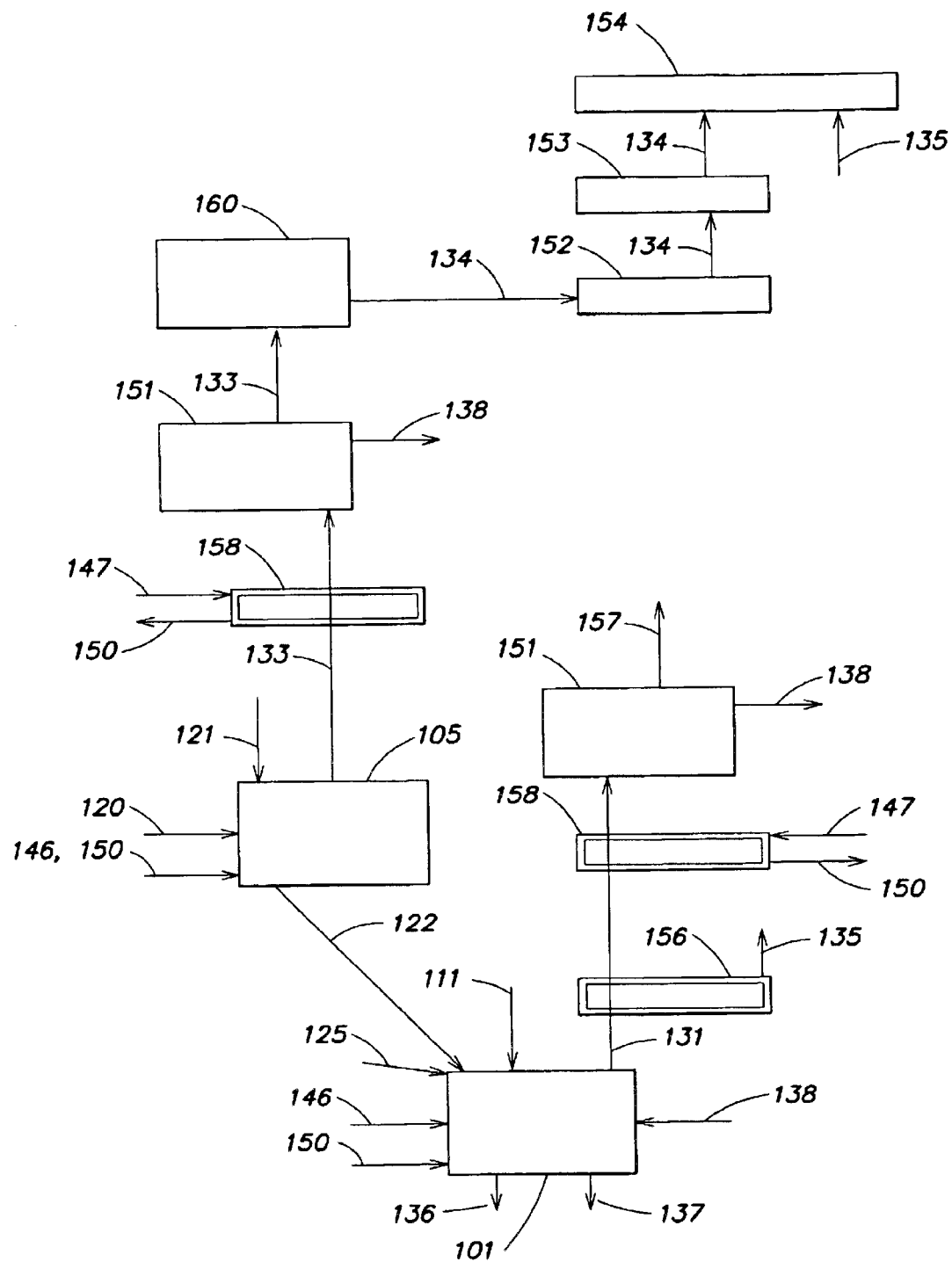
FIG. 12 is an equipment flow chart used in example 7 of Embodiment 3.

FIG. 12 shows one example of the schematic flow chart of the facility to be used when the invention is practiced. As shown in the same, the prereduction furnace is not installed, but a de-volatilizing furnace 105 of the carbonaceous material is equipped. In this furnace 105, the raw carbonaceous material 121 is charged, and the high calorie fuel 120 is supplied, and the mixed gas of oxygen 146 and a pre-heated air 150 is blown thereinto so as to de-volatilize the raw carbonaceous material 121. Into the furnace 101, the de-volatilizing carbonaceous material 122 as well as the raw ores 111 are continuously charged, and raw auxiliary materials 125 as burnt lime or raw dolomite are then charged. The mixed gas of the oxygen 146 and the pre-heated air 150 with the de-volatilizing carbonaceous material 122 is appropriately blown, and the raw ores 111 is subjected to the smelting reduction process. For entering the smelting reduction process, nitrogen gas 148 is blown into the direct iron smelting reduction furnace 101 so as to strengthen the bath agitation. Thus, the iron bath and the slag bath are formed in the furnace 101, and the molten iron 136 and the slag 137 are discharged.

On the other hand, as shown in FIG. 12, there are, as incidental facilities, a dust collector 153, a steam recovery boiler 156, a generator 154, and an air preheating and heat exchanger 158, which treat the generated gas 131 exhausted from the furnace 101 and the de-volatilizing gas 133 exhausted from the de-volatilizing furnace 105. From the generated gas 131 and the de-volatilizing gas 133, a recovered dust 138 caught by the dust collector 151 is recycled to the furnace 101, and a sensible gas heat of the generated gas 131 exhausted from the furnace 101 is recovered by a steam recovery boiler 156. Further, the occurring gas 133 is stored in a gas holder 152 and is supplied to a generator facility 154 for power generation.

[3rd Mode]

Figure 13:
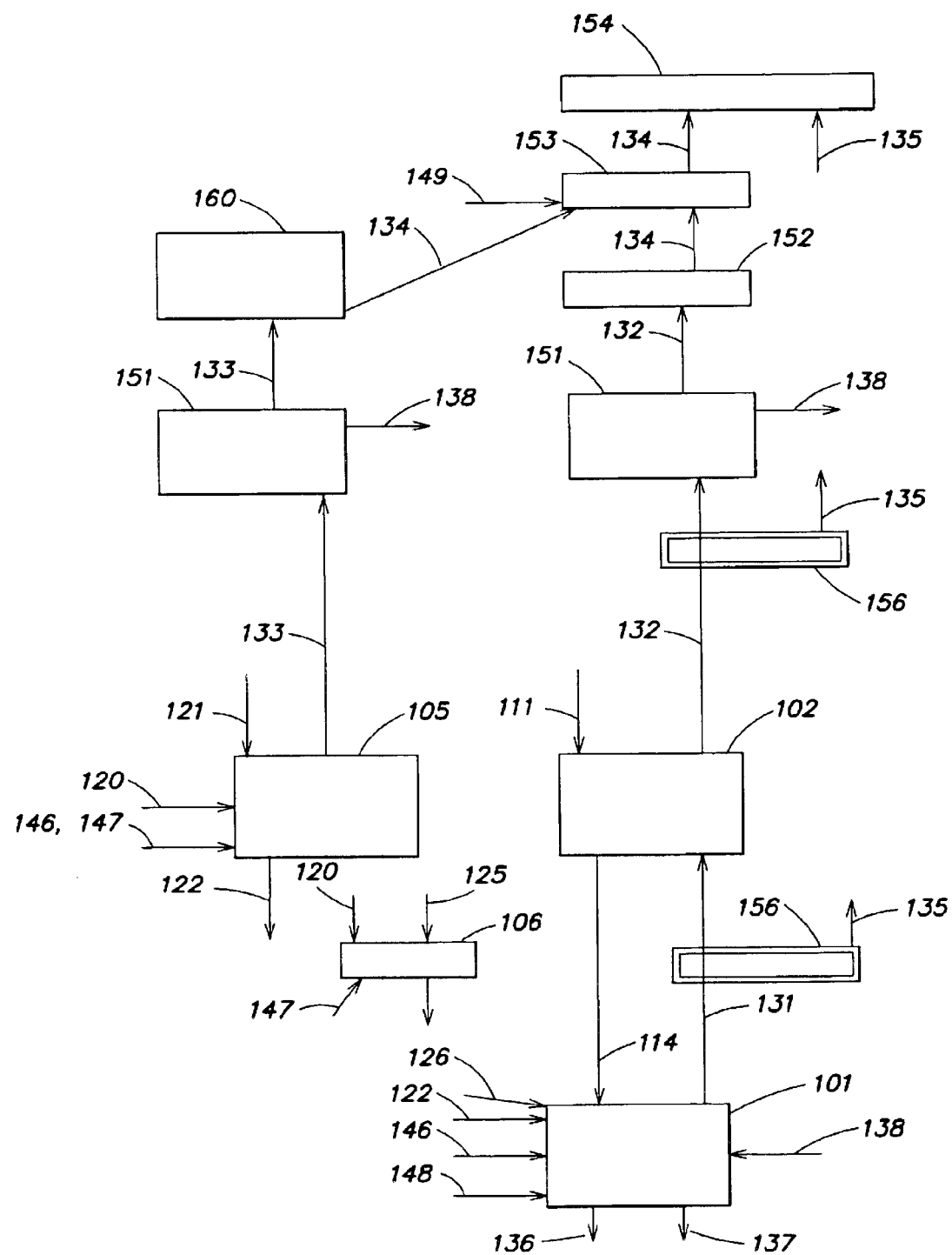
FIG. 13 is an equipment flow chart used in examples 8 and 9 of Embodiment 3.

FIG. 13 shows one example of the schematic flow chart of the facility to be used when the invention is practiced. As shown in the same, in this exemplified facility, a pre-heating pre-reduction fluidized bed 102 is installed as the prereduction furnace, in which the raw ore 111 is reduced into a char containing pre-reduced ore 114 and charged into the smelting reduction furnace 101. Into this furnace 101, the auxiliary raw materials 126 as burnt lime or light burnt dolomite are also charged, and the molten iron 122 de-volatilized in the de-volatilizing furnace 105 is charged, and those are subjected to the directly smelting reduction by blowing the oxygen 146. Then, the nitrogen gas 148 is blown to strengthen the bath agitation. Thus, the iron bath and the slag bath are formed in the furnace 101, and the molten iron 136 and the slag 137 are discharged. As the incidental facilities, there are installed the dust collector 153, the steam recovery boiler 156 and the generator 154, similarly to the second practicing mode.

[4th Mode]

Figure 14:
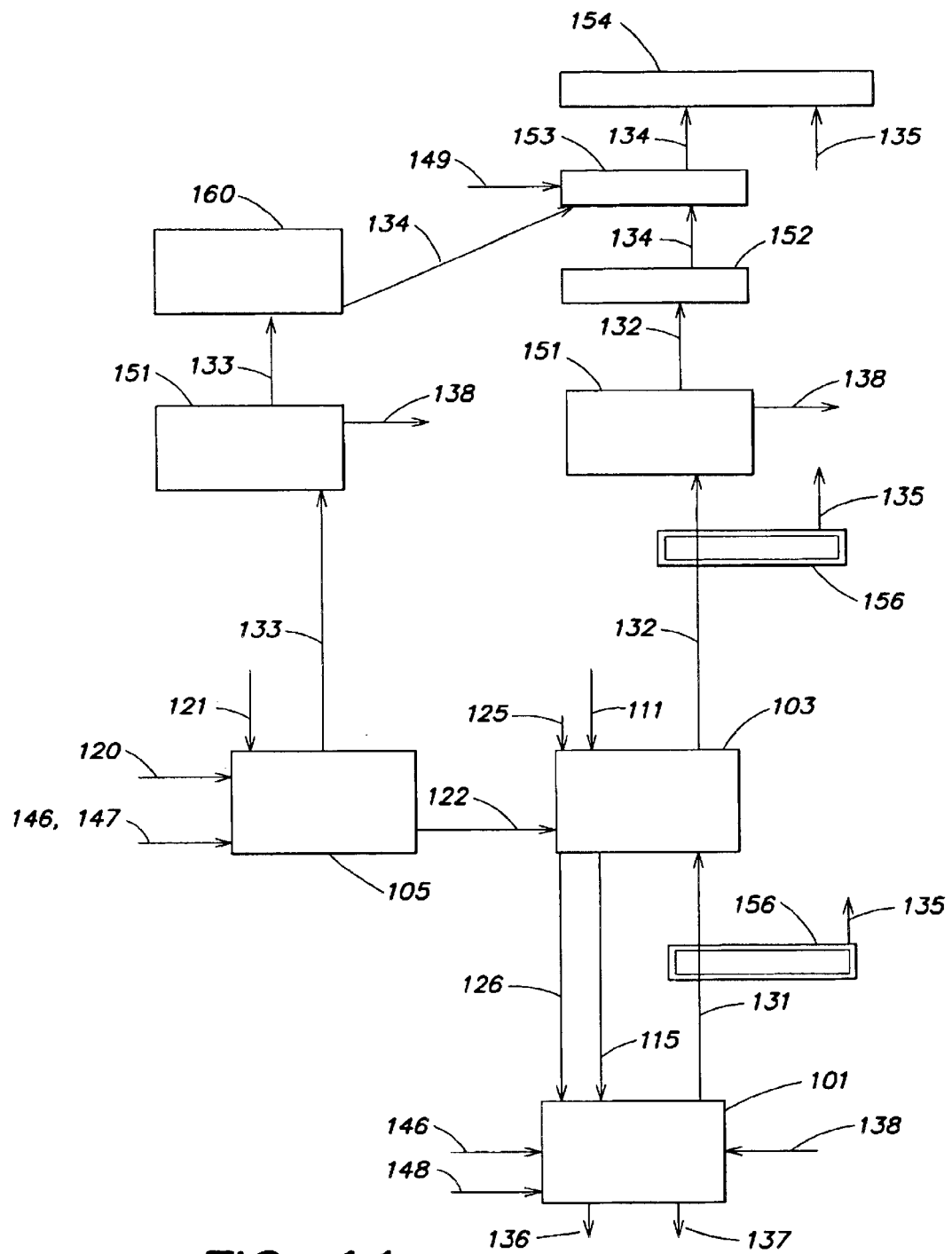
FIG. 14 is an equipment flow chart used in example 10 of Embodiment 3.

FIG. 14 shows one example of the schematic flow chart of the facility to be used when the invention is practiced. As shown in the same, in this exemplified facility, instead of the pre-heating and pre-reduction fluidized bed 102 set forth in FIG. 13, the furnace 103 of directly contacting the pre-reducing carbonaceous material and ores is equipped, into which the carbonaceous material 122 (char) de-volatilized in the de-volatilizing furnace 105 and the raw carbonaceous material 111 are charged, and the contents of other facilities follow those of the 3rd embodiment.

(2) Reducing Reaction, Operation and Effects

At first, words and phrases in the description will be defined.

[Post Combustion Rate]

The post combustion rate is meant by gas oxidizing degree measurable at the throat of the smelting reduction furnace or the part of the food duct.

Post combustion rate (%)=Gas oxidizing degree (%) around the throat of the SRF furnace Gas oxidizing degree (%)=$\{(CO_2+H_2O)/(CO+CO_2+H_2+H_2O)\} \times 100$ Ordinarily the gas oxidizing degree in the bath part of the smelting reduction furnace is higher than that of the furnace throat, but as actual measuring is difficult, the above definition is employed.

Since the post combustion rate is a rate of combustion $CO \rightarrow CO_2$ and $H_2 \rightarrow H_2O$, and the gas oxidizing degree contains in molecule $H_2O$ where adhesive water content is evaporated or decomposed and generated $CO_2$, they are strictly to say different. The gas in the SRF bath is changed in quality by carbon in the volatilized content of the molten iron or carry-over dusts in the upper gas space, and the gas oxidizing degree at the throat of the SRF furnace is often lower by around 10% to the maximum than that of the bath part.

[Carbonaceous Material]

The carbonaceous material is meant by carbon containing substance, containing so-called coal, coke, char, oil coke RDF, solids as waste fuels of waste plastic, also heavy oil or hydrocarbon containing materials.

[High Calorie Fuel]

The high calorie fuel is meant by such fuel containing calorie of at least 2500 kcal/Nm$^3$ or 10,000 kcal/kg as heavy oil or propane gas.

[Stoichiometric Amount of Carbonaceous Material Necessary to Metallize Ores]

When adding the molten iron exceedingly than the stoichiometric amount of the molten iron necessary to metallize ores into the smelting reduction furnace as in Examples 2 to 4, C density in the material generated in the prereduction furnace should be at least 5%, preferably 10% or higher. With respect to the necessary carbon amount in the smelting reduction furnace, the lower the post combustion rate, the more it is necessary, and at least, the C density in the material generated in the prereduction furnace does not exceed 40%, and ordinarily preferable is 30% or lower.

The heat load of the furnace wall during operation of the smelting reduction furnace increases in company with increase of the post combustion within the furnace, and this is assumed due to the heat conductivity of radiation from the gas at the high temperature. In the radiation in gas, $H_2O$, $CO_2$ and $CO$ are large in influences while $N_2$ and $H_2$ are negligible. Of these three components, $H_2O$ has particularly large influences, and this is expected from the radiation coefficient described in the chemical engineering handbook. The inventors could actually confirmed the contributing rate thereof in the gas containing dusts at high temperature in the smelting reduction furnace. From the investigated results, it has been found that if the volatile content (VM) in coal is de-volatilized until less than 10%, the influence of the post combustion over the heat load of the furnace wall within the smelting reduction furnace could be decreased until half of the prior art level (see FIG. 7).

The above mentioned result is due to the existence of C of at least 10%, ordinarily around 20% by the hydrogen content of around 5% in coal, and the influence of the water content adhered to raw materials or fuels is ¹/₁₀ or lower thereof.

The hydrogen content ordinarily contained in non-caking coal generally called as a steam coal can be removed as the volatile content until 1% or lower by exposing to the high temperature, and in the aspect of the heat load of the furnace wall, the post combustion rate of the smelting reduction furnace is 30% to 40% at the utmost, while depending on the invention, such an effect can be obtained that the post combustion rate can be operated 40% to around 80% without so much inviting heat loss, and it is possible to lower the net unit of coal, the net unit of oxygen and the cost of equipment.

For further improving of lowering of these net units and the cost of equipment, if the coal is de-volatilized with the mixture of ores at the atmospheric high temperature of about 1200° C., the ores necessarily generate metallic iron, and the metallization of 60% or higher, ordinarily about 80 to 90% are easy. If the ratio of coal to be mixed with ores is exceeded than the necessary amount of metallizing the ores so as to meet a necessary amount of the molten iron in a following furnace, the effect of increasing the post combustion by the coal volatilization as well as the decrease of the net units of coal and oxygen by higher reduction rate of ore than the reduction in the fluidized bed accomplish until ½ to ⅓ of values of the prior art process. Only in this case, the density of the molten iron [S] inevitably increases 0.1% or higher. But, the smelting reduction furnace is the molten iron making process to the last, and the desulfurization during making molten iron can be carried out easily and economically than the desulfurizing process of the molten iron such as so-called KR process. Of course, if a molten steel of the [S] level being about 0.1% is a product so as to be [S]= 0.01%, tremendous treating cost (several×1000 yen/t) is required for refractory or flux, and a process will not be established. On the other hand, in the stage of molten iron where a temperature is lower than that of the molten steel and the refining can be operated efficiently, an actual treatment is available with cost of ¹/₁₀ or lower of the above. Therefore, by supplying the molten iron of the invention, it is possible to accomplish the such effect enabling to supply 100% the iron source substituted for the blast furnace.

EXAMPLES

The invention will be referred to with respect to examples.

The facility flows used in the tests were those stated in the practicing modes. The prereduction furnaces were tested in the case of using the rotary kiln, rotary hearth and the fluidized bed type furnace, in the case of not using the prereduction furnace but the carbonaceous material de-volatilizing furnace, and in the case of using both of the carbonaceous material de-volatilizing furnace and the rotary kiln. The post combustion rates in the smelting reduction furnace were set at the level of each kind, the smelting reduction furnace was charged with ores where the reduction rates in the prereduction furnace were changed at the level of each kind, and the coal where the de-volatilizing levels were changed were used.

Figure 15:
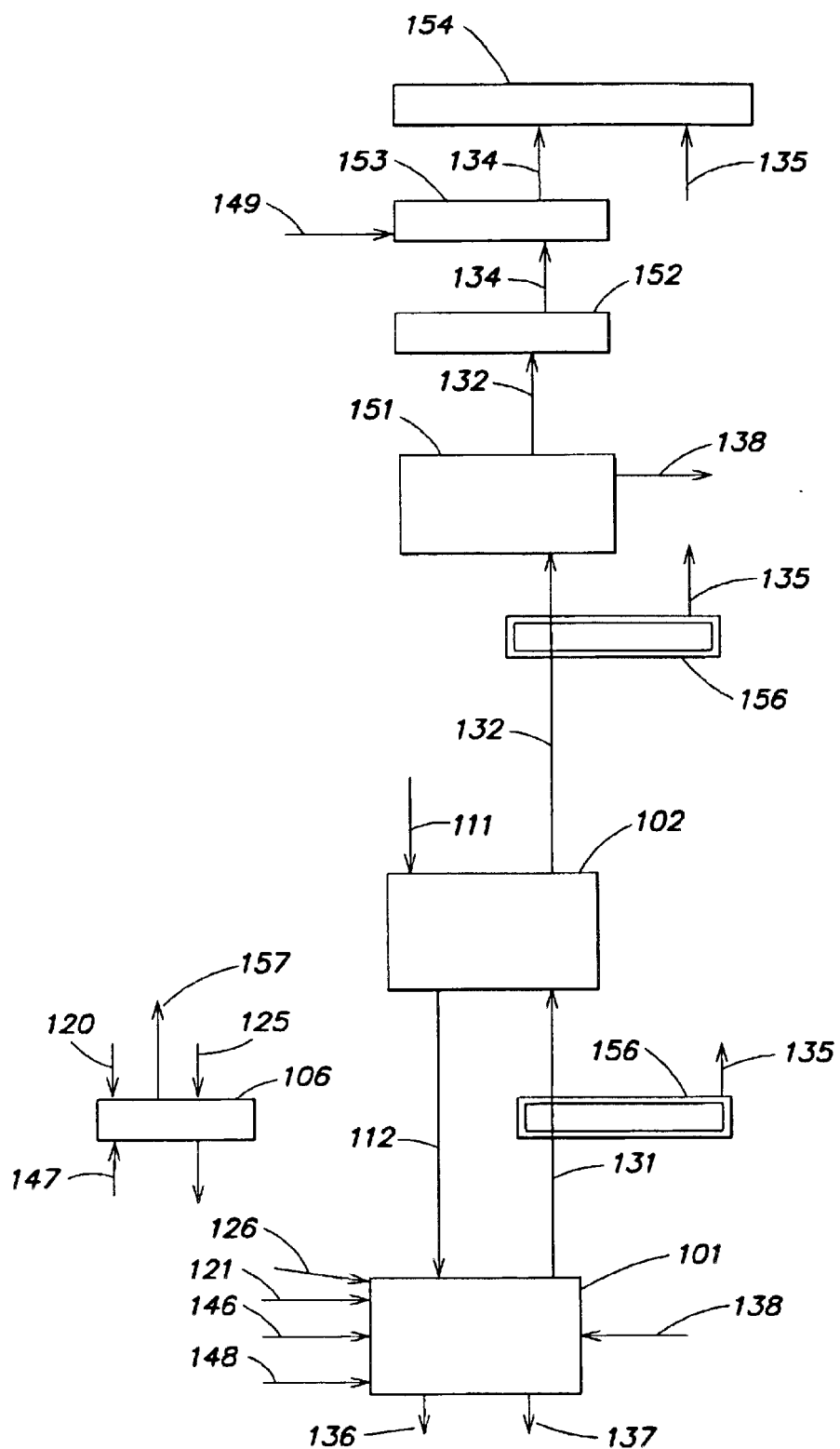
FIG. 15 is an equipment flow chart used in examples 1 and 2 of Embodiment 3.
Figure 16:
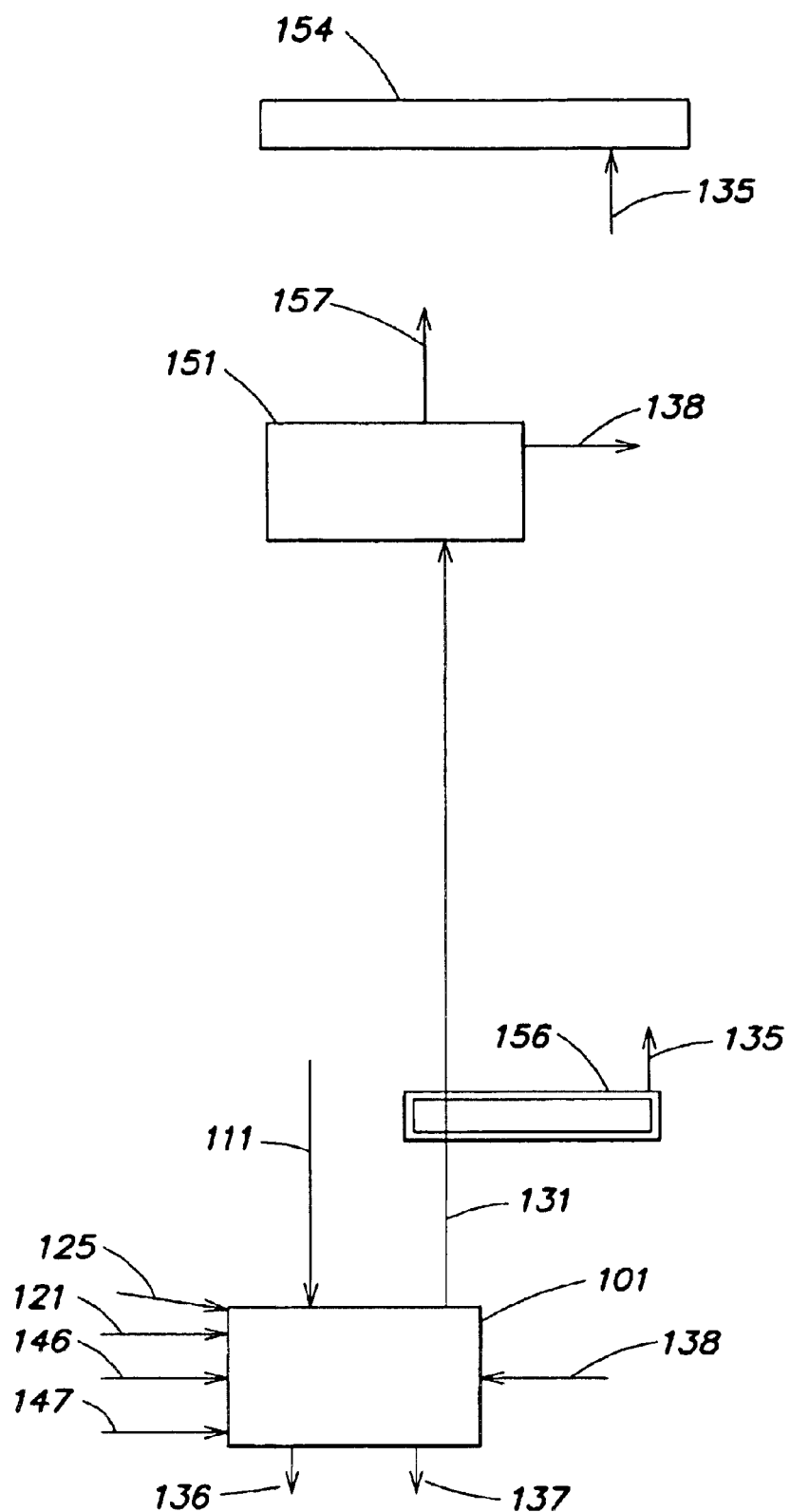
FIG. 16 is an equipment flow chart used in example 3 of Embodiment 3.
Figure 17:
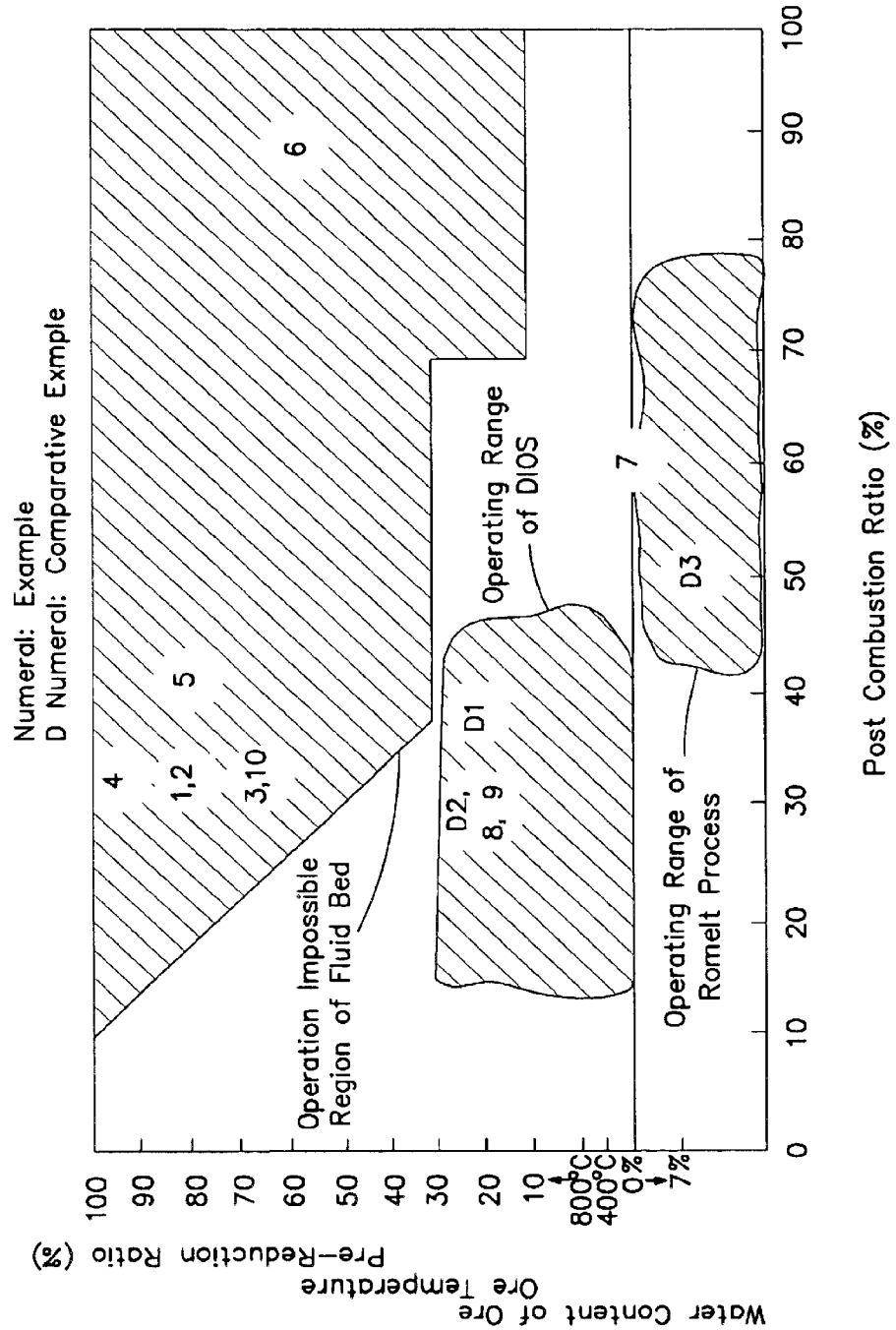
FIG. 17 is a graph showing tested results of examples and comparative examples of Embodiment 3.

Tables 3 to 6 show the detailed testing conditions of Examples 1 to 10 within the inventive range and Comparative Examples 1 to 3 outside of the inventive range. The flow charts in the respective tests are shown in FIGS. 8 to 16. The corresponding relation between the testing numbers and the facility flow charts (FIG. Nos.) are as follows. Table 7 shows analyzed results of average and low qualities of ores and coal used in the tests. The above tested results are shown in Tables 3 to 6. FIG. 17 plots the results of Examples and Comparative Examples.

Figure 9:
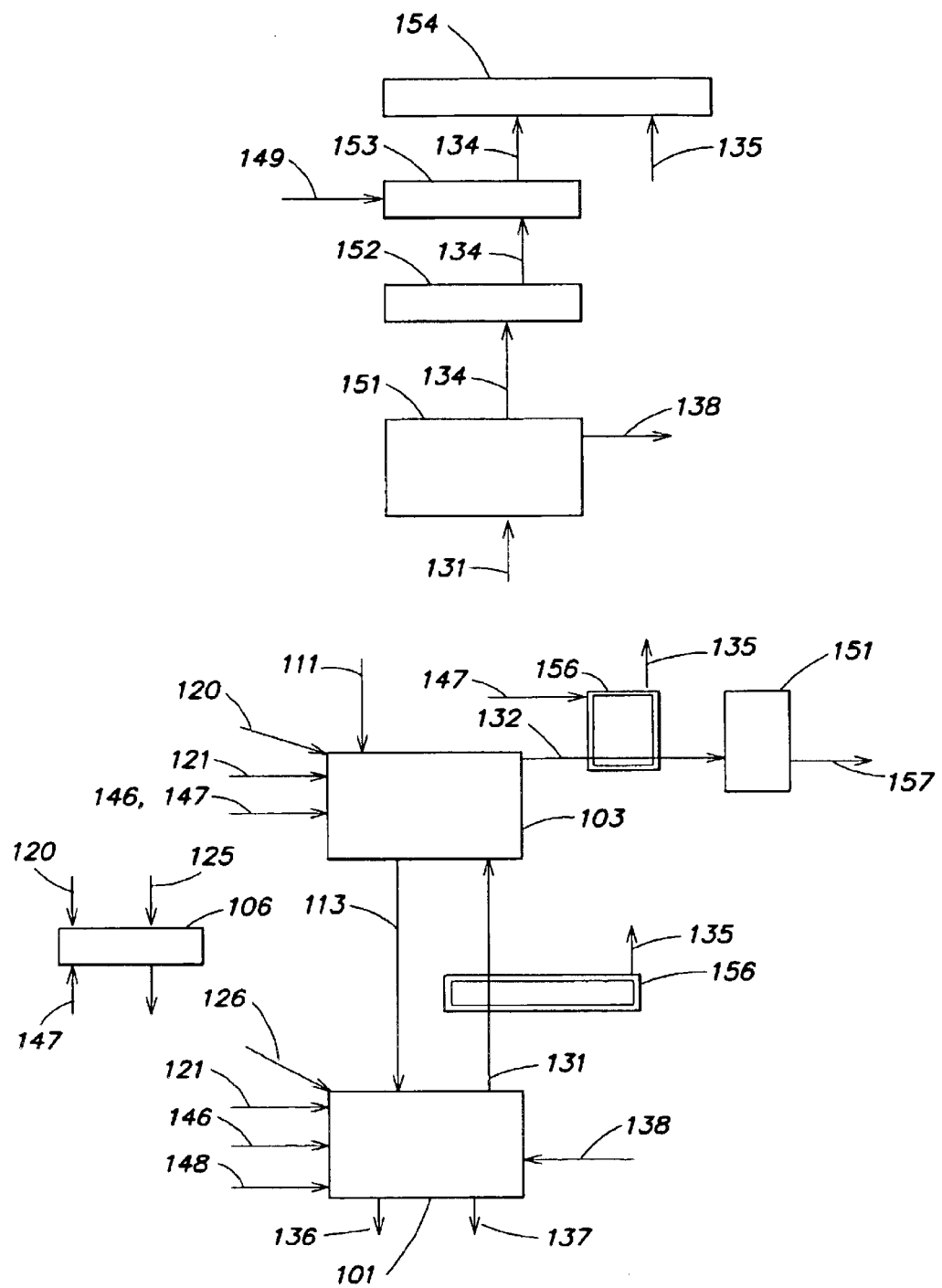
FIG. 9 is an equipment flow chart used in example 1 of Embodiment 3.
Figure 10:
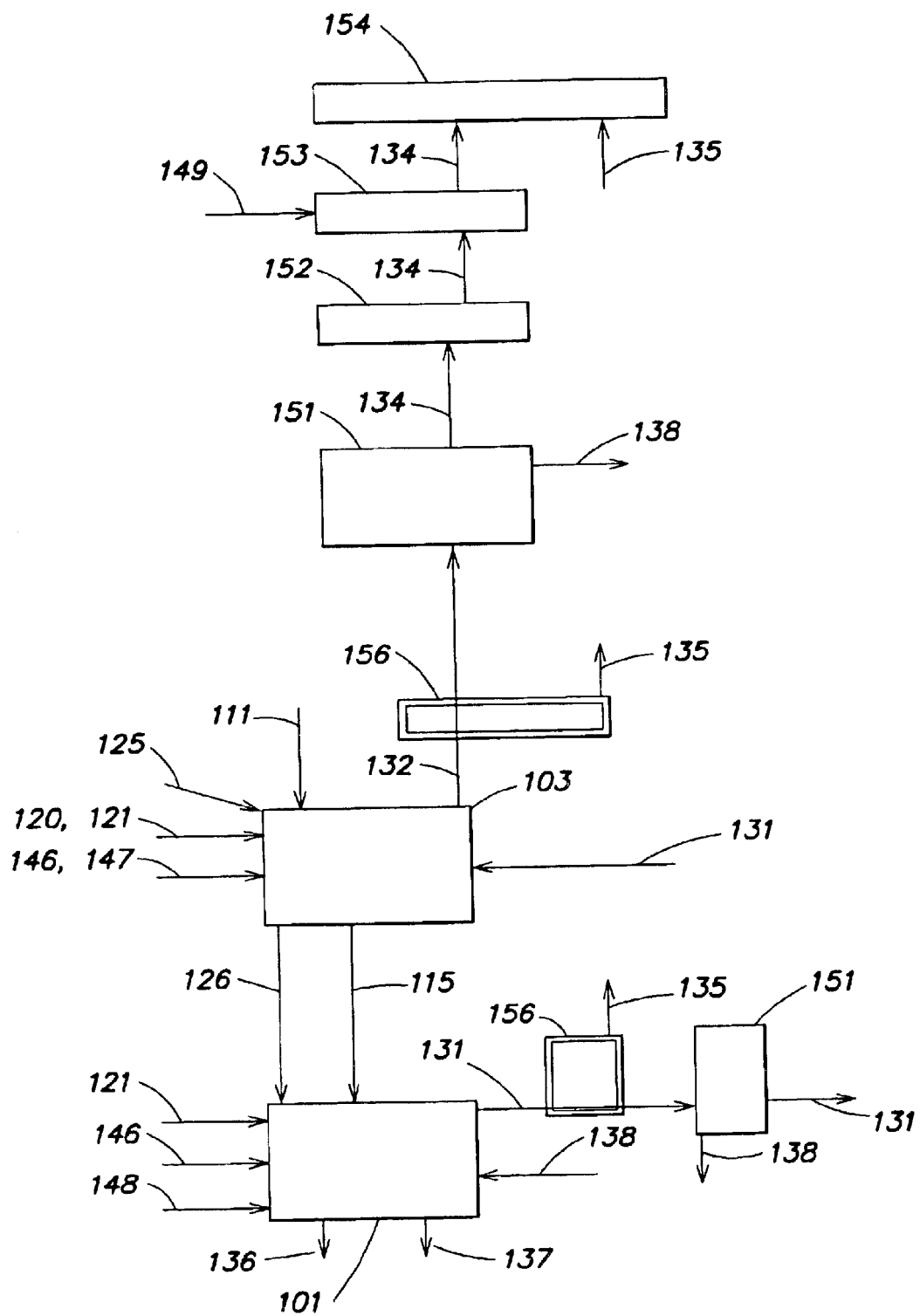
FIG. 10 is an equipment flow chart used in example 5 of Embodiment 3.
Figure 11:
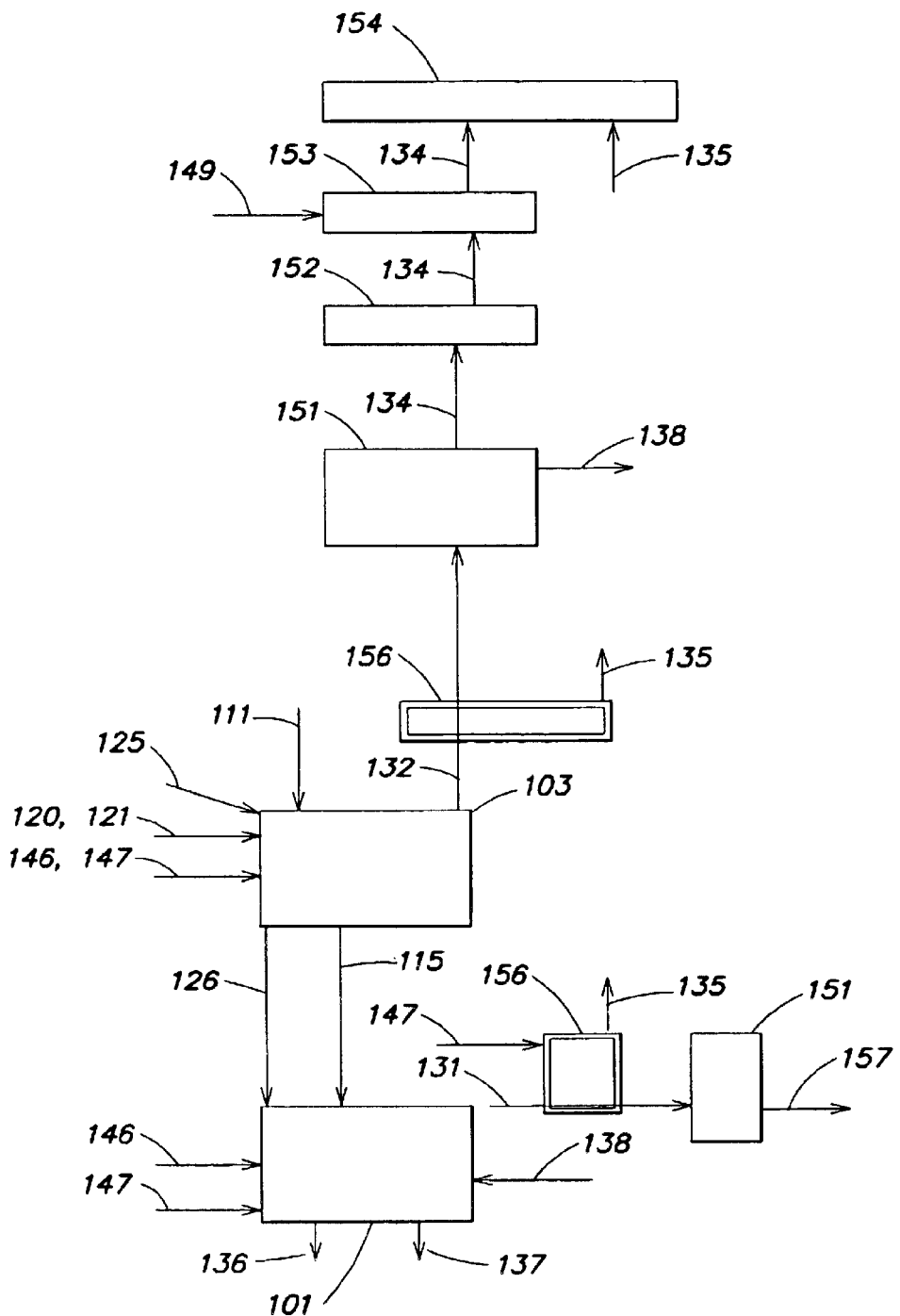
FIG. 11 is an equipment flow chart used in example 6 of Embodiment 3.

Example 1: FIG. 9, Examples 2 to 4: FIG. 8, Example 5: FIG. 10, Example 6: FIG. 11, Example 7: FIG. 12, Examples 8 and 9: FIG. 13, Example 10: FIG. 14, Comparative Examples 1 and 2: FIG. 15, Comparative Example 3: FIG. 16.

Examples 8 and 9 are that the carbonaceous material was de-volatllized in Comparative Example 2 and charged in the smelting reduction furnace. But Comparative Example 8 is that the de-volatilized carbonaceous material was charged in the smelting reduction furnace at the temperature near room temperature, but Comparative Example 9 is that the de-volatilized carbonaceous material was charged in the smelting reduction furnace while keeping not to cool, and shows that the heat gain by hot-charging of char is large.

In Comparative Example 3 and Examples 6 and 7 (FIGS. 16, 11 and 12), the agitating nitrogen gas in the smelting reduction furnace is made absent, and instead, the air or the hot blast is blown, and since combustion of the carbonaceous material is carried out with the gas of low oxygen density, so that $CO_2$ gas is not re-reduced by C content in metal as grain iron generated in the metal-slag fluidized bed in the smelting reduction furnace, and therefore the high post combustion is more easily obtained. In particular, in Example 7 (FIG. 12), since the pre-heated air is used, the higher the pre-heating temperature, the larger the effect for decreasing the net units of oxygen and the carbonaceous material in the smelting reduction furnace.

Comparative Example 1 is the average level of the raw fuel (coal is a steam coal) enabling to be used in the blast furnace. Comparative Examples 2 and 3 and Examples are all ores and coal of low quality disadvantageous to the carbonaceous material and the net unit of oxygen. Of course, the raw fuel of high quality is more effective in the inventive process.

In Examples, the post combustion rate and the pre-reduction rate in the smelting reduction furnace can be heightened. Since the post combustion rate and/or the pre-reduction rate can be heightened, the net unit of oxygen and the gas generating amount can be decreased accordingly.

Reference numerals in FIGS. 8 to 16 are as follows.

101: smelting reduction furnace, 102: pre-heating and pre-reduction fluidized bed furnace, 103: furnace of directly contacting pre-reducing carbonaceous material and ores, 105: coal de-volatilizing furnace, 106: auxiliary raw material combustion furnace, 111: raw ore, 112: pre-reduced ore, 113: pre-reduced iron, 114: char containing pre-reduced ore, 115: char containing reduced iron, 120: high calorie fuel, 121:raw molten iron, 122: de-volatilized carbonaceous material (char), 125: auxiliary crude raw material, 126: auxiliary raw material, 131: gas generated in the smelting reduction furnace, 132: gas generated in the pre-reduction furance, 133: gas generated in the de-volatilizing furance, 134: recovery gas, 135: recovery steam, 136: molten iron, 137: slag, 138: recovery dust, 146: oxygen, 147: air, 148: nitrogen, 149: fuel for adjusting gas calorie, 150: hot blast, 151: dust collector, 152: gas holder, 153: booster, 154: generator, 156: steam recovery boiler, 157: gas releasing in air, 158: heat exchanger, and 160: gas treating facility.

TABLE 3

Smelting reduction furnace Preheating and prereduction furnace

| Item | | Examples | | | | | Comparative examples | | |
|---|---|---|---|---|---|---|---|---|---|
| | | 1 | 2 | 3 | 4 | 5 | 1 | 2 | 3 |
| Raw material and fuel conditions | | | | | | | | | |
| Iron ore T. Fe | % | 57 | 57 | 57 | 57 | 57 | 63 | 57 | 57 |
| Iron ore CaO | % | 1 | 1 | 1 | 1 | 1 | 0 | 1 | 1 |
| Iron ore $SiO_2$ | % | 4 | 4 | 4 | 4 | 4 | 2 | 4 | 4 |
| Iron ore Adhesive moisture | % | 9 | 9 | 9 | 9 | 9 | 6 | 9 | 9 |
| Coal VM | % | 44 | 44 | 44 | 44 | 44 | 30 | 44 | 44 |
| Coal Ash | % | 5 | 5 | 5 | 5 | 5 | 10 | 5 | 5 |
| Coal Lower heating value kcal/kg | | 6500 | 6500 | 6500 | 6500 | 6500 | 7200 | 6500 | 6500 |
| Coal Total water content of coal | % | 21 | 21 | 21 | 21 | 21 | 7 | 21 | 21 |
| PRF operating conditions | | | | | | | | | |
| Modes of furnaces | | No kiln | No rotary hearth | No kiln | No rotary hearth | Connected to rotary hearth | Connected to fluidized bed | Connected to fluidized bed | None |
| Introduction of SRF gas | | | | | | | | | — |
| Temperature of ores during processing | °C. | 1000 | 1200 | 950 | 1250 | 1200 | 780 | 750 | — |
| Percentage of reduction RD | % | 87 | 87 | 73 | 97 | 83 | 26 | 25 | — |
| Percentage of metallization | % | 80 | 80 | 60 | 95 | 75 | 0 | 0 | — |
| SRF operating conditions | | | | | | | | | |
| Percentage of post combustion | % | 30 | 30 | 30 | 30 | 40 | 38 | 30 | 50 |
| Average VM of charged carbonaceous materials | % | 39 | 7 | 9 | 5 | 3 | 40 | 40 | 40 |
| Average temperature of charged carbonaceous materials | °C. | 50 | 800 | 730 | 800 | 800 | 40 | 40 | 40 |
| Ore charging temperature | °C. | 750 | 800 | 730 | 800 | 800 | 770 | 740 | 25 |
| Molten iron temperature | °C. | 1510 | 1510 | 1510 | 1510 | 1510 | 1500 | 1510 | 1510 |
| Molten iron | % | 3.2 | 3.2 | 3.5 | 3.3 | 3.2 | 3.5 | 3.2 | 3.3 |
| Slag basicity | — | 1.0 | 1.0 | 1.2 | 1.1 | 1.1 | 1.2 | 1.2 | 1.0 |

TABLE 4

| Item | | Examples | | | | | Comparative examples | | |
|---|---|---|---|---|---|---|---|---|---|
| | | 6 | 7 | 8 | 9 | 10 | 1 | 2 | 3 |
| Raw material and fuel conditions | | | | | | | | | |
| Iron ore T. Fe | % | 57 | 57 | | | | 63 | 57 | 57 |
| Iron ore CaO | % | 1 | 1 | | | | 0 | 1 | 1 |
| Iron ore $SiO_2$ | % | 4 | 4 | | | | 2 | 4 | 4 |
| Iron ore Adhesive moisture | % | 9 | 9 | | | | 6 | 9 | 9 |
| Coal VM | % | 44 | 44 | | | | 30 | 44 | 44 |
| Coal Ash | % | 5 | 5 | | | | 10 | 5 | 5 |
| Coal Lower heating value kcal/kg | | 6500 | 6500 | | | | 7200 | 6500 | 6500 |
| Coal Total water content of coal | % | 21 | 21 | | | | 7 | 21 | 21 |
| PRF operating conditions | | | | | | | | | |
| Modes of furnaces | | No kiln | None | Connected to fluidized bed | Connected to fluidized bed | No kiln | Connected to fluidized bed | Connected to fluidized bed | None |
| Introduction of SRF gas | | | — | | | | | | — |
| Temperature of ores during processing | °C. | 1000 | — | 750 | 750 | 1000 | 780 | 750 | — |
| Percentage of reduction RD | % | 83 | — | 25 | 25 | 73 | 26 | 25 | — |
| Percentage of metallization | % | 75 | — | 0 | 0 | 60 | 0 | 0 | — |
| SRF operating conditions | | | | | | | | | |
| Percentage of post combustion | % | 95 | 60 | 30 | 30 | 30 | 38 | 30 | 50 |
| Average VM of charged carbonaceous materials | % | 1 | 2 | 3 | 3 | 1 | 40 | 40 | 40 |
| Average temperature of charged carbonaceous materials | °C. | 750 | 640 | 25 | 640 | 750 | 40 | 40 | 40 |
| Ore charging temperature | °C. | 750 | 25 | 740 | 740 | 750 | 770 | 740 | 25 |
| Molten iron temperature | °C. | 1510 | 1510 | 1510 | 1510 | 1510 | 1500 | 1510 | 1510 |
| Molten iron | % | 3.0 | 3.0 | 3.5 | 3.5 | 3.5 | 3.5 | 3.2 | 3.3 |
| Slag basicity | — | 1.3 | 1.0 | 1.2 | 1.2 | 1.2 | 1.2 | 1.2 | 1.0 |

TABLE 5

| | | Smelting reduction furnace Preheating and prereduction furnace | | | | | | | |
|---|---|---|---|---|---|---|---|---|---|
| | | Examples | | | | | Comparative examples | | |
| Item | | 1 | 2 | 3 | 4 | 5 | 1 | 2 | 3 |
| Raw material/Fuel/Others | | | | | | | | | |
| Net unit of Ore | kg/t | 1740 | 1740 | 1740 | 1740 | 1740 | 1510 | 1740 | 1740 |
| Net unit of carbonaceous materials | | | | | | | | | |
| Coal to be charged into de-volatilization furnace | kg/t | 0 | 0 | 0 | 0 | 0 | 0 | 0 | 0 |
| Char to be charged into PRF | kg/t | 0 | 0 | 0 | 0 | 0 | 0 | 0 | 0 |
| Coal to be charged into PRF | kg/t | 460 | 1020 | 1180 | 920 | 1000 | 0 | 0 | 0 |
| Char to be charged into SRF | kg/t | 20 | 300 | 380 | 230 | 290 | 0 | 0 | 0 |
| Coal to be charged into SRF | kg/t | 540 | 0 | 0 | 0 | 0 | 730 | 1300 | 2000 |
| Total of consumed coal | kg/t | 1000 | 1020 | 1180 | 920 | 1000 | 730 | 1300 | 2000 |
| Net unit of oxygen | Nm$^3$/t | 410 | 230 | 270 | 190 | 230 | 480 | 860 | 1350 |
| Net unit of agitating gas | Nm$^3$/t | 100 | 100 | 200 | 100 | 100 | 150 | 200 | 0 |
| Net unit of auxiliary raw materials | kg/t | 70 | 70 | 76 | 73 | 73 | 200 | 70 | 100 |
| Heat load of SRF furnace wall | Mcal/m$^2$/h | 130 | 130 | 130 | 130 | 160 | 300 | 250 | 400 |
| Main and sub products | | | | | | | | | |
| Index of production of molten iron | % | 210 | 370 | 320 | 450 | 370 | 180 | 100 | 63 |
| Net unit of generated slag | kg/t | 440 | 450 | 450 | 440 | 450 | 330 | 480 | 520 |
| Volume of generated gas in de-volatilization furnace | Nm$^3$/t | — | — | — | — | — | — | — | — |
| Recovered latent heat in de-volatilization furnace | Mcal/t | — | — | — | — | — | — | — | — |
| Volume of gas generated in SRF | Nm$^3$/t | 1620 | 1030 | 1180 | 920 | 1020 | 1500 | 3100 | 4500 |
| Latent heat of recovered gas | Mcal/t | 2060 | 930 | 1220 | 710 | — | — | — | 7600 |
| Volume of gas generated in PRF | Nm$^3$/t | 800 | 1440 | 1600 | 1380 | 2440 | 1500 | 3100 | — |
| Latent heat of recovered gas | Mcal/t | 200 | 1600 | 2000 | 1450 | 3500 | 2000 | 5000 | — |
| Total of latent heat of recovered gas | Mcal/t | 2260 | 2530 | 3220 | 2160 | 780 | 2000 | 5000 | 7600 |
| Remarks | | SRF + molten iron | Carbonaceous materials into char | Low metallization percentage | High metallization percentage | Direct connection to SRF High post combustion | DIOS process Average raw fuel | DIOS process Low grade ores Low grade coal | ROMELT process Low grade ores Low grade coal |

TABLE 6

| | | Examples | | | | | Comparative examples | | |
|---|---|---|---|---|---|---|---|---|---|
| Item | | 6 | 7 | 8 | 9 | 10 | 1 | 2 | 3 |
| Raw material/Fuel/Others | | | | | | | | | |
| Net unit of ore | kg/t | 1740 | 1740 | 1740 | 1740 | 1740 | 1510 | 1740 | 1740 |
| Net unit of carbonaceous materials | | | | | | | | | |
| Coal to be charged into de-volatilization furnace | kg/t | 0 | 1320 | 2000 | 1600 | 1640 | 0 | 0 | 0 |
| Char to be charged into PRF | kg/t | 0 | 0 | 0 | 0 | 820 | 0 | 0 | 0 |
| Coal to be charged into PRF | kg/t | 840 | 0 | 0 | 0 | 0 | 0 | 0 | 0 |
| Char to be charged into SRF | kg/t | 210 | 660 | 1000 | 800 | 380 | 0 | 0 | 0 |
| Coal to be charged into SRF | kg/t | 0 | 0 | 0 | 0 | 0 | 730 | 1300 | 2000 |
| Total of consumed coal | kg/t | 840 | 1320 | 2000 | 1600 | 1640 | 730 | 1300 | 2000 |
| Net unit of oxygen | Nm$^3$/t | 200 | 560 | 700 | 560 | 270 | 480 | 860 | 1350 |
| Net unit of agitating gas | Nm$^3$/t | 0 | 0 | 200 | 200 | 200 | 150 | 200 | 0 |
| Net unit of auxiliary raw materials | kg/t | 77 | 77 | 77 | 77 | 76 | 200 | 70 | 100 |
| Heat load of SRF furnace wall | Mcal/m$^2$/h | 300 | 180 | 100 | 100 | 130 | 300 | 250 | 400 |
| Main and sub products | | | | | | | | | |
| Index of production of molten iron | % | 430 | 150 | 120 | 150 | 320 | 180 | 100 | 63 |
| Net unit of generated slag | kg/t | 440 | 440 | 440 | 440 | 440 | 330 | 480 | 520 |
| Volume of generated gas in de-volatilization furnace | Nm$^3$/t | — | 1320 | 2000 | 1600 | 1640 | — | — | — |
| Recovered latent heat in | Mcal/t | — | 3300 | 5000 | 4000 | 4100 | — | — | — |

TABLE 6-continued

|  |  | Examples | | | | | Comparative examples | | |
| --- | --- | --- | --- | --- | --- | --- | --- | --- | --- |
| Item |  | 6 | 7 | 8 | 9 | 10 | 1 | 2 | 3 |
| de-volatilization furnace |  |  |  |  |  |  |  |  |  |
| Volume of gas generated in SRF | Nm³/t | 900 | 1460 | 2500 | 2000 | 1180 | 1500 | 3100 | 4500 |
| Latent heat of recovered gas | Mcal/t | 50 | 1310 | — | — | 1220 | — | — | 7600 |
| Volume of gas generated in PRF | Nm³/t | 1260 | — | 2500 | 2000 | 1640 | 1500 | 3100 | — |
| Latent heat of recovered gas | Mcal/t | 1150 | — | 4000 | 3200 | 2100 | 2000 | 5000 | — |
| Total of latent heat of recovered gas | Mcal/t | 50 | 4610 | 9000 | 7200 | 7420 | 2000 | 5000 | 7600 |
| Remarks |  | Super post combustion | Super post combustion by char | Char of cold charge into SRF | Char of hot charge into SRF | Char into PRF | DIOS process Average raw fuel | DIOS process Low grade ores Low grade coal | ROMELT process Low grade ores Low grade coal |

TABLE 7

|  | Brand |  | Average | Examples of low grade |
| --- | --- | --- | --- | --- |
| Components of ores | T.Fe | % | 63 | 57 |
|  | CaO | % | 0 | 1 |
|  | SiO₂ | % | 2 | 4 |
|  | Ig. Loss | % | 2 | 8 |
|  | Adhesive moisture | % | 6 | 9 |
| Industrial analysis of coal | VM | % | 30 | 40 |
|  | Ash | % | 10 | 5 |
|  | FC | % | 60 | 55 |
|  | T.S | % | 0.5 | 0.2 |
| Analysis of coal elements | C | % | 73 | 73 |
|  | H | % | 5 | 5 |
|  | N | % | 2 | 2 |
|  | O | % | 10 | 15 |
|  | Lower heating value | kcal/kg | 7200 | 6500 |
|  | Adhesive moisture | % | 3 | 3 |
|  | Total water content of coal | % | 7 | 21 |
|  | Remarks |  | Comparative examples | Others |

Embodiment 4

The smelting reduction process represented by the DIOS Process is the excellent process in the regard that the degree of freedom of the raw material and fuel is large. However, the amount of carbon dioxide generated in this process is not by far reduced in comparison with the blast furnace. Thereupon, an investigation was made to develop the smelting reduction process which was economical in the cost of equipment and operation, and enabled to more decrease the amount of carbon dioxide.

A viewpoint of the investigation was that indispensable conditions were to have high calorific power than coal, and low cost. As the carbonaceous material in the smelting reduction process, those were selected which could be substituted for al least parts of coal. As a result, the oil coke met the developing object of the inventors. For much using the oil coke as the carbonaceous material for substitution of coal in this process, it was more desirable to solve the under mentioned problems.

① The oil coke as a secondary product in a petroleum refining process is almost occupied by fine grain diameter as around 1 mm. Average grain diameters of coal or coke are around 10 mm. Ordinarily, the gas ascends 2 to 3 m/s in the smelting reduction furnace. Accordingly, when charging the oil coke into the smelting reduction furnace, it is necessary that the oil coke is made descend into the slag bath in good yield in spite of ascending of the gas.

② The sulfur content of the oil coke is high as 1.5 to 3.0 wt % being several times of the sulfur of coal. Thus, for substituting the oil coke for much coal, it is necessary to develop an effective desulfurization process of the molten iron in response to heightening the sulfur density in generated metal.

③ As stated in ②, the sulfur content of the oil coke is considerably higher than that of coal, and if much using the oil coke, the sulfur density in the smelting reduction furnace goes up and a carbonization into metal is hindered. C density in metal is not increased in comparison with increasing of oxides of Fe, Cr, Mn or Ni in slag (expressed as MxOy hereafter), and increasing of MxOy in the slag or occurrence or slopping are invited by delay of reduction of ores in the slag.

④ When the oil coke is charged into the smelting reduction furnace, it is confirmed that preferably a carrier gas is sent from a supplying chute, directing to the slag bath, and for avoiding the problem of ①, if the front end of the chute is approached too nearly to the surface of the slag bath, it is clogged by splashing and piling of adherence of splash, and the operation cannot be continued.

⑤ Substances of the hydrocarbon group much contained in the oil coke is not dissolved unless heating to high temperature, and tar and other substances harmful to the operation are generated. The tar closes, for example, piping or drains.

The above ② problem has been solved by the development of the desulfurizing technique of the inventors, and for more usefully utilizing the oil coke, the problems of the above ① ③ and ⑤ must be solved.

The investigations were made to develop a smelting reduction process of an environmetal harmony type using the oil coke as the carbonaceous material, and the following findings were obtained.

When the oil coke is charged into the smelting reduction furnace, the carrier gas is used, if raw materials of powder ores or dusts containing metallic components produced in steel works or other smelting works are continuously charged into the smelting reduction together with fluxes such as lime from a predetermined chute, it is possible to supply the oil coke into the slag in the furnace. Of course, the oil coke may be mixed and formed with the above raw fuel or the flux. If the pre-heating and pre-reducing treatment is performed thereto, the net unit of the fuel is more decreased. The raw fuel or the flux may be charged from the chute in another flowing mode. For example, it is possible to charge them in mixed states with fabric, network shaped substances, adhesive or pasting substances.

If the using amount of the oil coke is limited to decrease all the charged sulfur content in the furnace below a predetermined value, the slopping by hindrance of carboni-zation into the metal bath is dissolved, and the operation of the furnace can be preferably continued. Further, if securing the momentum when charging the raw fuel or the flux together with the oil coke above a determined value, the oil coke can be charged in good yield by preventing from rapid ascending in the furnace.

If the height of the front end of the supply chute is determined to be above a predetermined value and the temperature of the atmosphere about the front end is determined to be above a predetermined value, the slag is prevented from splashing and piling of splash adhering, so that the oil coke is fully heat-decomposed without troubles as clogging at the front end portion of the supply chute or closing of the piping circuit.

The present invention has been established on the above mentioned findings, and the subjects thereof are as follows.

The first smelting reduction process comprising charging raw materials containing metallic oxides and/or metallic hydroxide as well as the flux into the smelting reduction furnace, using the carbonaceous materials containing coal and/or coke as fuel and reducing agents, and heating and smelting the above raw materials and the above flux with heat burning the carbonaceous materials with the oxygen containing gas, so that the smelting reduction is carried out in the above mentioned smelting reduction furnace, is characterized in that the oil coke is substituted for at least parts of the above coal and/or coke for operation.

The second smelting reduction process, in the above first process is characterized in that all the amount of sulfur which is contained in the carbonaceous materials containing the oil coke as at least part thereof, raw materials and fluxes is brought into the furnace, is limited to be below 20 kg/ton of the molten iron to be generated in the furnace for operation.

The third smelting reduction process,in the above first or second process, is characterized in that a method of charging the oil coke into the smelting reduction furnace satisfies the following (a), (b) and (c) conditions. The (a), (b) and (c) conditions are:

(a) the oil coke is charged from the height in 2 m or higher than the surface of the slag bath in the smelting reduction furnace,
(b) the oil coke is charged from the position in the atmosphere where the atmospheric gas is 1000° C. or higher in the smelting reduction furnace, and
(c) the oil coke is charged by sending out the carrier gas from the supply chute, wherein, with respect to the oil coke (P) to be charged per one chute, the carbonaceous materials (Q), other than the oil coke, to be sent together with the oil coke, the raw materials (R) and the flux (S), the momentum directing downward of all solid substances (P+Q+R+S) is operated to be 100 kgm/s or more.

In the above mentioned, as the raw materials containing metallic oxide and/or metallic hydroxide, any of the following substances are available of ores, dusts containing metallic components generated in steel works or other smelting works, directly reduced iron (DRI), hot briquette iron (HBI), reduced, half-reduced and non-reduced pellets of various kinds of metals, and iron, and also refuses containing metallic elements. These materials exhibit similar services or effects as raw materials.

The invention will be explained, referring to the attached drawings. The invention is especially characterized by the smelting process in the smelting reduction furnace of the molten iron bath type in the smelting reduction process.

Figure 18:
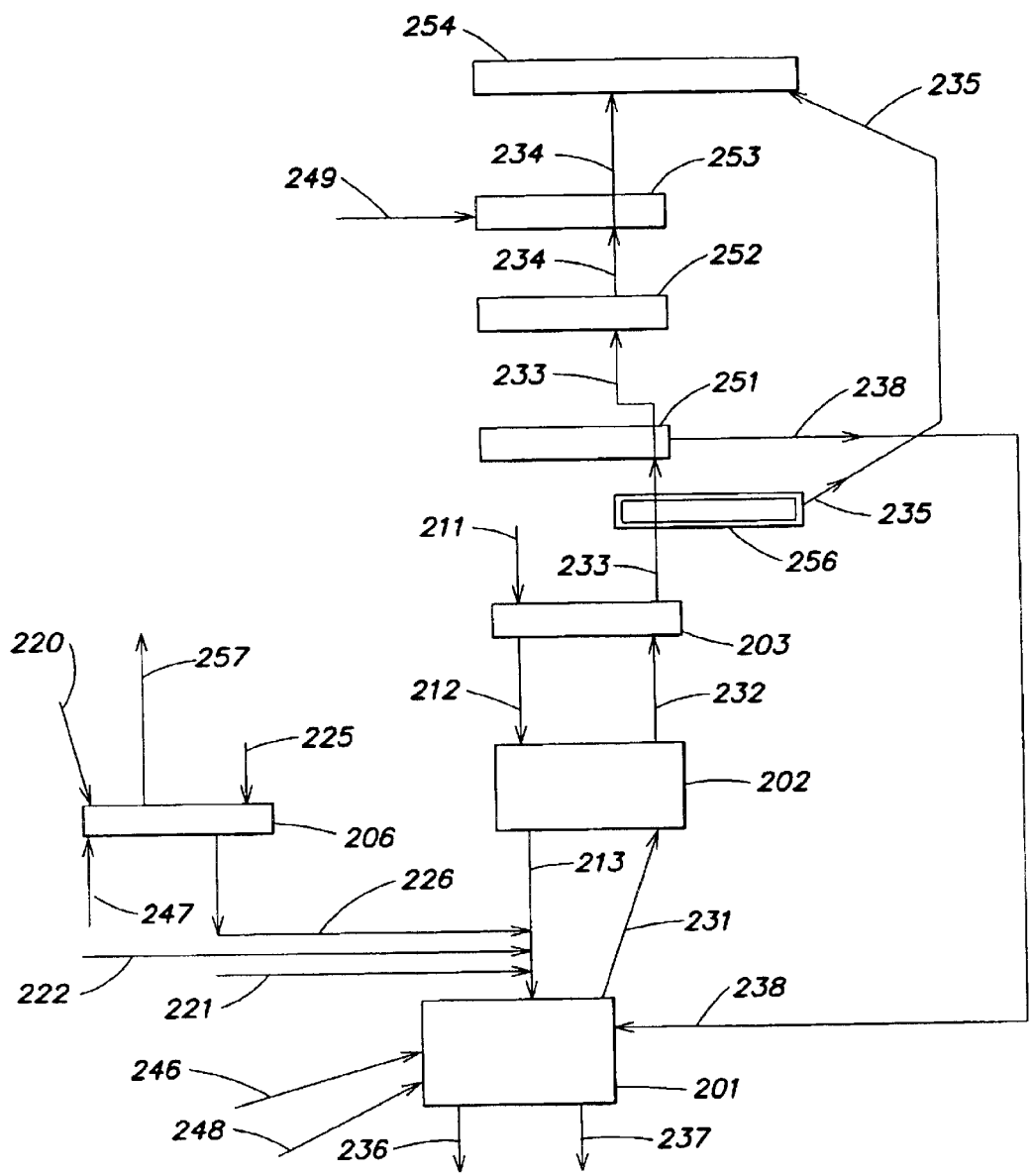
FIG. 18 is a schematic equipment flow chart used in Embodiment 4.

FIG. 18 is a schematically explaining view showing one of the practicing embodiments. The pre-reduced ore 213a of coarse grain exhausted from the pre-reduction furnace 202 of the fluidized bed type, the pre-reduced ore 213b of fine grain generated in the pre-reduction furnace 202 and the smelting reduction furnace 201 and recovered in a cyclone (not shown), part of the oil coke 222 as the carbonaceous materials and the remainder being the coal 221 or the 100% oil coke, and the flux 226, are charged from the supply chute provided at the upper part of the smelting reduction furnace 201.

Figure 19:
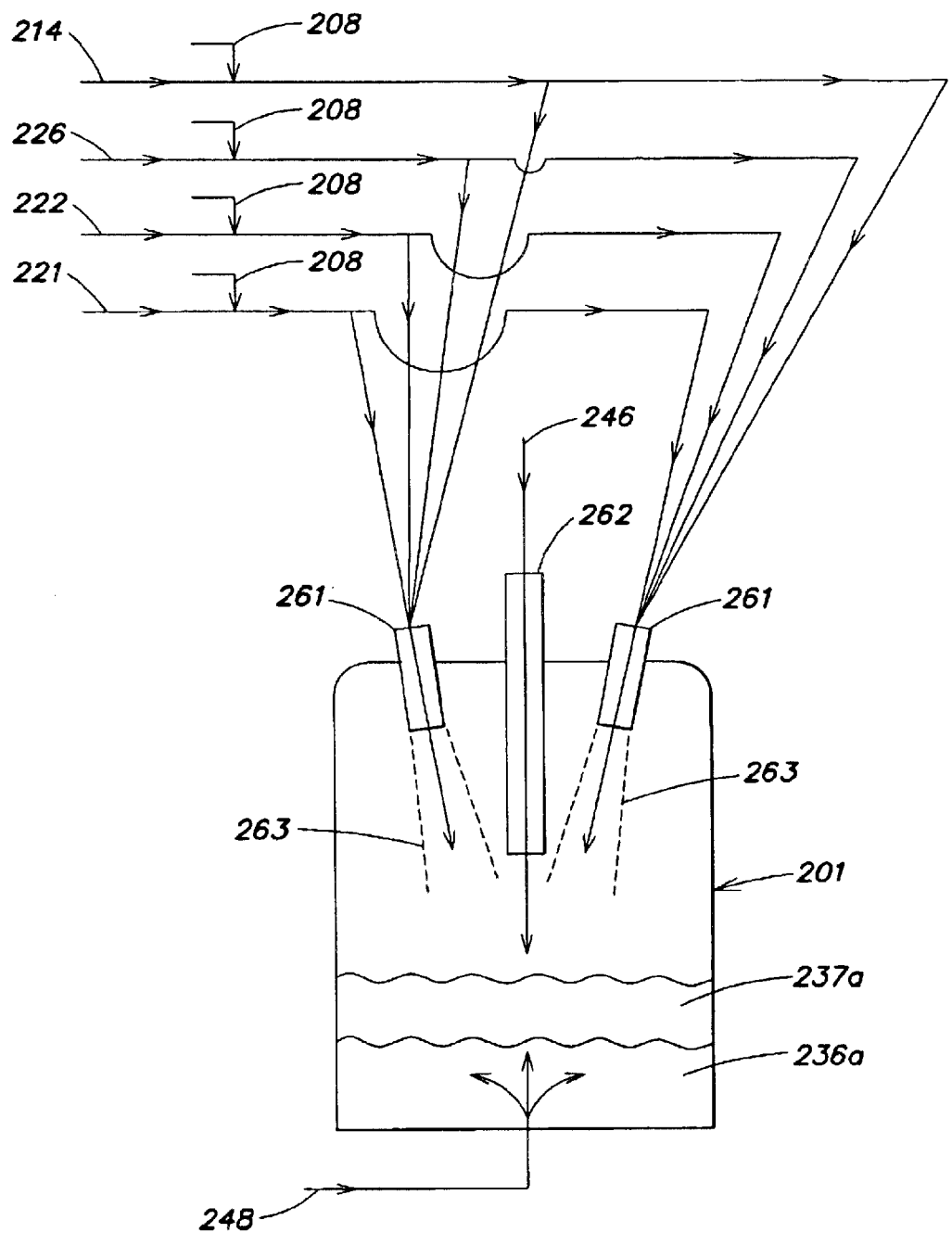
FIG. 19 is a schematic view of elemental parts of the smelting reduction furnace used in Embodiment 4.

FIG. 19 shows the schematic view of the elemental parts of the smelting reduction furnace. As the raw materials, other than the pre-reduced ore of coarse grain and the pre-reduced ore of fine grain (213a and 213b), substances containing metals such as metallic dusts generated in steel works or other smelting works may be mixed appropriately and charged. As the molten iron, waste plastics and other carbon containing substances are available. The raw materials, the carbonaceous materials and the fluxes are charged, directing downward from the front end of the chute 261 by the carrier gas, for example, the nitrogen gas 208. The periodical mode of the charging is continuous. By conditions of the facility, the charging may depend on dropping by gravity from the chute 261. In this case, a purge gas is made flow for preventing the clogging of the chute. On the other hand, an oxygen gas 246 is blown into the furnace from the top lance 262, and a bath agitating gas, for example, the nitrogen gas 248 is blown from the bottom. The ore charged in the smelting reduction furnace 201 is molten by combustion heat of the carbonaceous materials and enters the slag bath 237a, and is reduced by carbon and is transferred to the molten iron bath 236a.

If the waste plastic or the oil coke are used as the carbonaceous materials in substitution for part or all of coal or coal and coke, the following effects are exhibited.

The heating value of the oil coke is around 8440 kcal/kg, being fairly larger than 7000 to 7700 kcal/kg of coal and around 7000 kcal/kg of coke, and so the net units of carbonaceous materials and oxygen required to the smelting are decreased, and the amount of carbon dioxide generated in the smelting reduction processing system is largely lowered. Accordingly, the use of the oil coke as the substitution for the coal or coke is desirable to distribution to the environmental protection and the improvement of the yielding and heating efficiencies of the process.

It is necessary to fully demonstrate the above mentioned effects and satisfactorily realize actual operation as the smelting reduction process. From such viewpoints, it is important to add the oil coke into the slag bath, not causing to fly high up with the hot blast in the furnace and escape outside of the reducing reaction system, control behaviors of sulfur contained in the oil coke at high density for facilitating the reducing reaction of ores so as to operate the furnace under good conditions, and prevent the supply chute and the piping circuit from closing for continuously operating all the closed systems of the smelting reduction process.

From the above regards, in the invention, the desirable charging manners of the oil coke are delimited as follows. Further reference will be made to the grounds therefor and the effects thereby.

(1) All the sulfur amount (called as all input sulfur hereafter) brought into the furnace from the carbonaceous materials containing the oil coke, the raw materials and the fluxes, are limited to 20 kg/ton-metal or lower. As increasing of all input sulfur, the sulfur density in the metal is heightened, and the carburizing action into the metal by adding the carbonaceous materials is hindered, so that the carbon density of the metal is not fully increased. As a result, the metallic oxide in slag (MxOy) is increased by delay in reduction of ores, and the operation is made unstable due to occurrence of slopping. The inventors made tests on influences of all input sulfur to [S] and [C] in the molten iron and the density of (MxOy).

Figure 20:
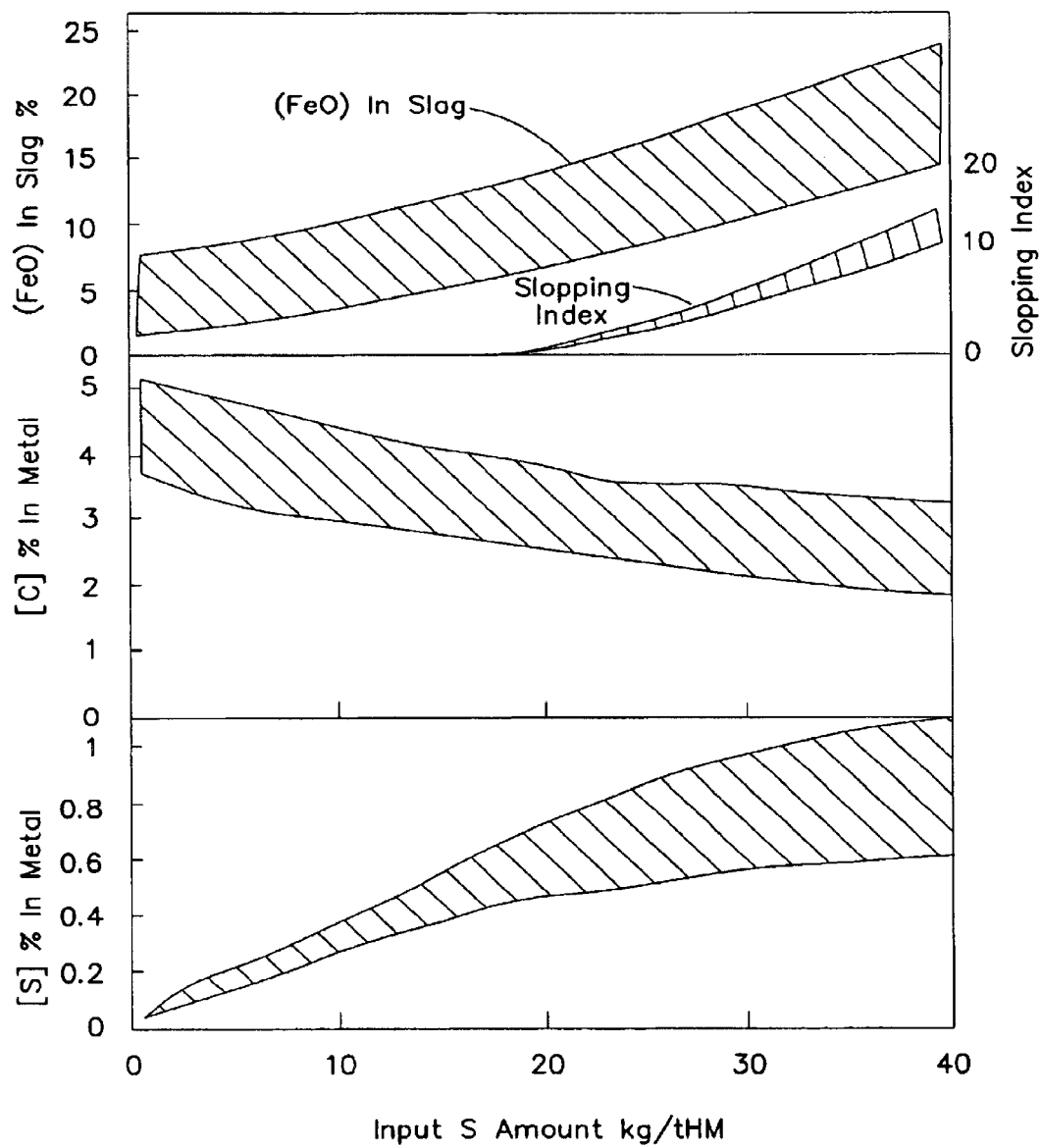
FIG. 20 is a graph showing influences of all input sulfur into the smelting reduction furnace of Embodiment 4, giving to densities and slopping degree of [S] in the molten iron, [C] in the same and (FeO) in slag.

FIG. 20 shows the results of iron ores in the smelting reduction. As seeing from this, when all input sulfur is increased exceedingly 20 kg/ton-molten iron, the operation goes into a range anxious about the slopping occurrence. Accordingly, in the invention, desirably all input sulfur is limited below 20 kg/ton-molten iron.

As mentioned above, from the influences of the adding amount of the oil coke to the reducing reaction, it is desirable to limit all input sulfur below 20 kg/ton-molten iron. However, in view of decreasing the generating amount of cheap carbon dioxide, the oil coke be desirably used as much as possible. Changing the viewpoint, when the oil coke is used as an ordinary fuel, the amount of generating $SO_x$ is increased by the amount of high sulfur. However, following the inventive process, sulfur in the oil coke much transfers to a metal phase or a slag phase and is fixed. Sulfur in metal is finally fixed in the slag in a form of CaS by de-sulfurizing the molten iron. Accordingly, there is a merit possible to avoid the sulfur content from releasing into the air in a form of $SO_x$.

(2) The oil coke is charged from the height in 2 m or higher than the surface of the slag bath in the smelting reduction furnace.

Being based on experiences of the actual operation of the smelting reduction furnace, the inventors have made it clear that, in a case of sending out the oil coke from the chute shown in FIG. 19 together with other charges by the carrier gas, unless the front end of the chute is separated 2 m or more from the slag surface, a problem arises about clogging of the front end of the chute by adherence of slag droplets. More desirably, it is separated 3 m or longer, and being more than 5 m, there is no problem.

(3) The oil coke is charged from the position in the atmosphere where the atmospheric gas is 1000° C. or higher within the smelting reduction furnace.

When the oil coke is charged into the smelting reduction furnace, it is divided into part to be dissolved and gasified, part to be liquefied and part being as solid. When the oil coke is charged with other charge by the carrier gas, unless the front end of the chute is higher than 2 m and at the atmospheric temperature of more than 1000° C., hydrocarbon in the oil coke is not fully decomposed, and tar and other substances harmful to the operation are generated. Because of environmental problems, desirably the oil coke is charged from the atmospheric range of higher than 1000° C.

(4) The oil coke is charged by sending out the carrier gas from the supply chute. With respect to the oil coke (P) to be charged per one chute, the carbonaceous materials (Q) other than the oil coke to be sent together with the oil coke, the raw materials (R) and the flux (S), the momentum directing downward of all solid substances (P+Q+R+S) is operated to be 100 kgm/s or more. If the vertical downward momentum of all solid substances is more than 100 kgm/s, the substances may be charged by the gravity dropping.

The grain size of the oil coke is, as above mentioned, is smaller than that of general coal. In general, the gas tower flowing rate within the smelting reduction furnace is around 2 to 3 m/s, and the oil coke easily runs away out of the furnace bearing thereon. The inventors sent out the oil coke on the carrier gas from the supply chute together with other charge in the vertical direction of the furnace, and took the flow of all charges as a mass motion. Paying attention to the downward momentum of all charges, the inventors tested the influence of the above momentum to fly loss of the oil coke.

Figure 21:
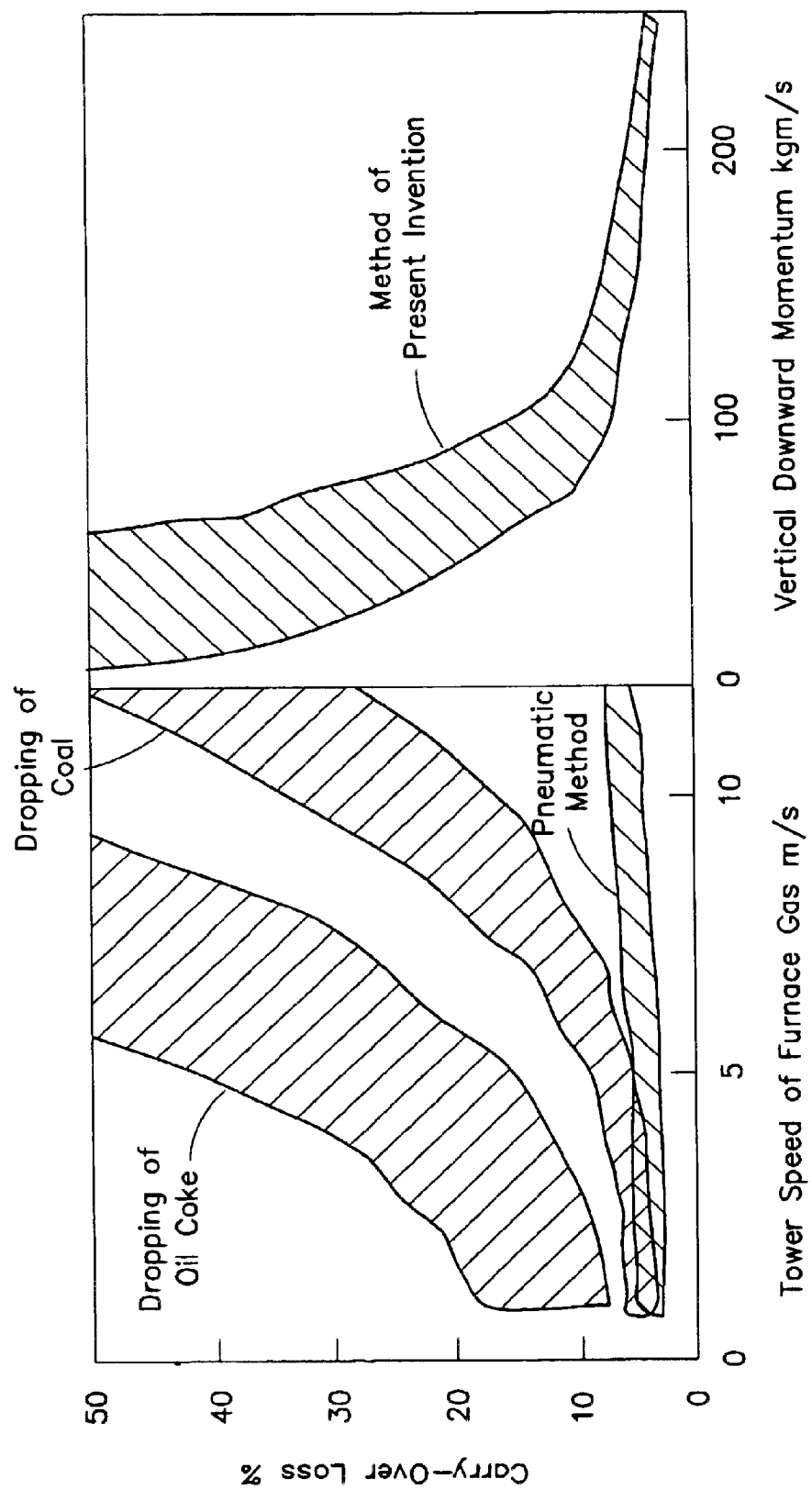
FIG. 21 is a graph showing the relation between influences of vertical momentum of all charged materials giving to carry-over loss of oil coke from the smelting reduction furnace of Embodiment 4, and the carry-over loss and tower speed of the furnace gas.

FIG. 21 shows the relation between influences of vertical momentum of all charged materials giving to carry-over loss of the oil coke and the carry-over loss and the tower speed of the furnace gas.

Seeing from the results, the fly loss of the oil coke is controlled to be 2 to 3% in a manner that the mass flow is, from the chute, made with the carrier gas together with other charges, and the downward momentum of all charges is adjusted to be 100 kgm/s or more.

EXAMPLE

The smelting reduction process of the invention will be explained in detail with reference to the examples.

The Examples 1 to 10 used the smelting reduction facilities of the molten iron production rate being 500 t/d shown in FIGS. 18 and 19, and produced the molten iron through the continuous operation by the process within the inventive range. The Comparative Examples 1 and 2 used the smelting reduction facilities of the same molten iron production rate being 500 t/d shown in FIG. 22 following the facilities used in the Examples, and produced the molten iron through the continuous operation by the process outside the inventive range.

Table 8 shows the analyzed results of the used iron ores, and Table 9 shows the analyzed results of the oil cokes.

Reference numerals in FIGS. 18 and 19 are as follows.

201: Smelting reduction furnace, 202: pre-reduction fluidized bed furnace, 203: ore preheating furnace, 206: flux burning furnace, 208: nitrogen gas (carrier gas), 211: raw ore, 212: pre-heated ore (coarse grain and fine grain), 213: pre-reduced ore (coarse grain and fine grain), 214: raw material, 220: high calorie fuel, 221: coal, 222: oil coke, 225: raw material of flux, 226: flux, 231: generated gas, 232: occurring gas: 233: occurring gas, 234: recovery gas, 235: recovery steam, 236: molten iron, 236a: molten iron bath, 237: slag, 237a: slag bath, 238: recovery dust, 246: oxygen, 247: air, 248: nitrogen gas (agitating gas), 249: fuel for adjusting gas calorie, 251: dust collector, 252: gas holder, 253: booster, 254: generator, 256: steam recovery boiler, 257: gas, 261: supply chute, 262: lance, and 263: charge.

TABLE 8

| | Components of ores (%) | | | | | | | | | | | | | |
|---|---|---|---|---|---|---|---|---|---|---|---|---|---|---|
| | T. Fe | $Fe_2O_3$ | FeO | CaO | $SiO_2$ | $AL_2O_3$ | MgO | Mn | P | S | $TiO_2$ | Ig Loss | Others (Gangue) | Water content |
| Iron ores | 66.0 | 94.0 | 0.30 | 0.00 | 1.90 | 1.60 | 0.00 | 0.10 | 0.04 | 0.01 | 0.10 | 1.00 | 1.0        5.7 | 6.00 |

TABLE 9

| Coal | Industrially analyzing values (%) | | | | Water content | Analysis of elements (%) | | | | Lower heating values (kcal/kg) | Ash composition (%) | | | |
|---|---|---|---|---|---|---|---|---|---|---|---|---|---|---|
| | Ash | VM | FC | TS | | C | H | N | O | | CaO | $SiO_2$ | $AL_2O_3$ | FeO |
| Coal | 9.4 | 25.8 | 64.8 | 0.50 | 9.1 | 78.50 | 4.60 | 1.80 | 5.30 | 7,450 | 2.5 | 56.5 | 27.4 | 6.6 |
| Oil coke | 0.6 | 11.4 | 88.0 | 2.00 | 7.8 | 89.00 | 3.85 | 2.54 | 2.49 | 8,440 | As coal | | | |
| Coal + Oil coke 50% | 5.0 | 18.6 | 76.4 | 1.25 | 8.5 | 83.75 | 4.23 | 2.17 | 3.90 | 7,945 | As coal | | | |

(1) Testing Conditions of Examples

The testing conditions of the Examples are roughly divided with the using ratio of the oil coke occupying the carbonaceous materials into 50% (Examples 1 to 4), 60% (Example 9), and 100% (Examples 5 to 8 and 10). The levels of the operating factors of (a) to (h) were determined as follows within the inventive range, and the test were operated when these factors were appropriately combined.

Tables 10 to 13 shows the testing conditions.

TABLE 10

| | | | Examples 1 | Examples 2 | Examples 3 | Examples 4 |
|---|---|---|---|---|---|---|
| Structure of carbonecous materials charged in the melting and reducing furnace | Coal (%) | | 50 | 50 | 50 | 50 |
| | Oil coke (%) | | 50 | 50 | 50 | 50 |
| Preheating furnace | Ore preheating temperature (° C.) | | 25 | 250 | 25 | 260 |
| Preheating and reducing furnace | Temperature of exhausted ore (Average temperature (° C.) of coarse grains and fine powders) | | 605 | 703 | 600 | 699 |
| | Pre-reducing percentage of ore (%) | | 10 | 20 | 9 | 19 |
| Smelting reduction furnace | Iron ores as raw materials (kg/t) | | 1475 | 1475 | 1475 | 1475 |
| | Carbonaceous materials | Coal (kg/t) | 444 | 389 | 407 | 358 |
| | | Oil coke (kg/t) | 444 | 389 | 407 | 358 |
| | | Total (kg/t) | 888 | 779 | 815 | 715 |
| | Grain diameter of Oil coke (mm) | | ave. 0.6 | ave. 0.6 | ave. 0.6 | ave. 0.6 |
| | Flux | Burnt lime (kg/t) | 13 | 12 | 13 | 12 |
| | | Light burnt dolomite (kg/t) | 68 | 65 | 66 | 63 |
| | Input all sulfur (kg/t) | | 12 | 11 | 10 | 9 |
| | Blown oxygen (in terms of pure oxygen) | | 624 | 539 | 588 | 508 |
| | Percentage of post combustion (%) | | 30 | 30 | 35 | 35 |
| | Temperature of molten iron (° C.) | | 1510 | 1515 | 1517 | 1532 |
| | Slag basicity ($CaO/SiO_2$) | | 1.15 | 1.12 | 1.13 | 1.14 |
| | In slag (MgO) (%) | | 10 | 6 | 7 | 9 |
| | Height of front end of charging chute (m) | | 4.5 | 5.1 | 4.2 | 4.9 |
| | Atmosphere temperature at front end of charging chute (° C.) | | 1200 | 1210 | 1240 | 1280 |
| | Momentum of charged materials from charging chute (kgm/s) | | 150 | 300 | 600 | 1000 |
| | Nitrogen for agitating bath and protecting furnace wall ($Nm^3/t$) | | 200 | 200 | 200 | 200 |

TABLE 11

| | | | Examples 5 | Examples 6 | Examples 7 | Examples 8 |
|---|---|---|---|---|---|---|
| Structure of carbonecous materials charged in the melting and reducing furnace | Coal (%) | | 0 | 0 | 0 | 0 |
| | Oil coke (%) | | 100 | 100 | 100 | 100 |
| Preheating furnace | Ore preheating temperature (° C.) | | 25 | 270 | 25 | 280 |
| Preheating and reducing furnace | Temperature of exhausted ore (Average temperature (° C.) of coarse grains and fine powders) | | 598 | 705 | 596 | 702 |
| | Pre-reducing percentage of ore (%) | | 9 | 21 | 8 | 20 |

TABLE 11-continued

|  |  |  | Examples 5 | Examples 6 | Examples 7 | Examples 8 |
|---|---|---|---|---|---|---|
| Smelting reduction furnace | Iron ores as raw materials (kg/t) |  | 1475 | 1475 | 1475 | 1475 |
|  | Carbonaceous materials | Coal (kg/t) | 0 | 0 | 0 | 0 |
|  |  | Oil coke (kg/t) | 739 | 647 | 688 | 604 |
|  |  | Total (kg/t) | 739 | 647 | 688 | 604 |
|  | Grain diameter of Oil coke (mm) |  | ave. 1.0 | ave. 1.0 | ave. 1.0 | ave. 1.0 |
|  | Flux | Burnt lime (kg/t) | 4 | 4 | 5 | 4 |
|  |  | Light burnt dolomite (kg/t) | 44 | 43 | 44 | 43 |
|  | Input all sulfur (kg/t) |  | 18 | 16 | 15 | 14 |
|  | Blown oxygen (in terms of pure oxygen) |  | 532 | 458 | 509 | 439 |
|  | Percentage of post combustion (%) |  | 31 | 31 | 36 | 36 |
|  | Temperature of molten iron (° C.) |  | 1525 | 1527 | 1519 | 1515 |
|  | Slag basicity ($CaO/SiO_2$) |  | 1.1 | 1.09 | 1.21 | 1.09 |
|  | In slag (MgO) (%) |  | 10 | 8 | 9 | 6 |
|  | Height of front end of charging chute (m) |  | 5.2 | 3.8 | 4.1 | 4.9 |
|  | Atmosphere temperature at front end of charging chute (° C.) |  | 1230 | 1250 | 1290 | 1330 |
|  | Momentum of charged materials from charging chute (kgm/s) |  | 200 | 500 | 1000 | 2000 |
|  | Nitrogen for agitating bath and protecting furnace wall ($Nm^3/t$) |  | 200 | 200 | 200 | 200 |

TABLE 12

|  |  |  | Example 9 | Example 10 |
|---|---|---|---|---|
| Structure of carbonceous materials charge in the melting and reducing furnace | Coal (%) |  | 40 | 0 |
|  | Oil coke (%) |  | 60 | 100 |
| Preheating furnace | Ore preheating temperature (° C.) |  | 25 | 25 |
| Preheating and reducing furnace | Temperature of exhausted ore (Average temperature (° C.) of coarse grains and fine powders) |  | 600 | 600 |
|  | Pre-reducing percentage of ore (%) |  | 10 | 10 |
| Smelting reduction furnace | Iron ores as raw materials (kg/t) |  | 1480 | 1480 |
|  | Carbonaceous materials | Coal (kg/t) | 381 | 0 |
|  |  | Oil coke (kg/t) | 571 | 970 |
|  |  | Total (kg/t) | 952 | 970 |
|  | Grain diameter of oil coke (mm) |  | ave. 1.0 | ave. 0.6 |
|  | Flux | Burnt lime (kg/t) | 24 | 22 |
|  |  | Light burnt dolomite (kg/t) | 93 | 86 |
|  | Input all sulfur (kg/t) |  | 22 | 25 |
|  | Blown oxygen (in terms of pure oxygen) |  | 710 | 789 |
|  | Percentage of post combustion (%) |  | 32 | 27 |
|  | Temperature of molten iron (° C.) |  | 1565 | 1535 |
|  | Slag basicity ($CaO/SiO_2$) |  | 1.11 | 1.12 |
|  | In slag (MgO) (%) |  | 9 | 7 |
|  | Height of front end of charging chute (m) |  | 2.3 | 3.6 |
|  | Atmosphere temperature at front end of charging chute (° C.) |  | 1160 | 1210 |
|  | Momentum of charged materials from charging chute (kgm/s) |  | 50 | 60 |
|  | Nitrogen for agitating bath and protecting furnace wall ($Nm^3/t$) |  | 200 | 200 |

TABLE 13

|  |  |  | Comparative examples 1 | Comparative examples 2 |
|---|---|---|---|---|
| Structure of carbonceous materials charge in the melting and reducing furnace | Coal (%) |  | 100 | 100 |
|  | Oil coke (%) |  | 0 | 0 |
| Preheating furnace | Ore preheating temperature (° C.) |  | 25 | 240 |
| Preheating and reducing furnace | Temperature of exhausted ore (Average temperature (° C.) of coarse grains and fine powders) |  | 600 | 700 |
|  | Pre-reducing percentage of ore (%) |  | 10 | 20 |
| Smelting reduction furnace | Iron ores as raw materials (kg/t) |  | 1481 | 1480 |
|  | Carbonaceous materials | Coal (kg/t) | 1052 | 922 |
|  |  | Oil coke (kg/t) | 0 | 0 |
|  |  | Total (kg/t) | 1052 | 922 |
|  | Grain diameter of oil coke (mm) |  | — | — |
|  | Flux | Burnt lime (kg/t) | 26 | 24 |
|  |  | Light burnt dolomite (kg/t) | 98 | 91 |
|  | Input all sulfur (kg/t) |  | 7 | 6 |
|  | Blown oxygen (in terms of pure oxygen) |  | 723 | 626 |

TABLE 13-continued

|  | Comparative examples 1 | Comparative examples 2 |
|---|---|---|
| Percentage of post combustion (%) | 29 | 29 |
| Temperature of molten iron (° C.) | 1505 | 1545 |
| Slag basicity (CaO/SiO$_2$) | 1.14 | 1.13 |
| In slag (MgO) (%) | 11 | 10 |
| Height of front end of charging chute (m) | 4.5 | 1.7 |
| Atmosphere temperature at front end of charging chute (° C.) | 1080 | 1120 |
| Momentum of charged materials from charging chute (kgm/s) | Drop by gravity | Drop by gravity |
| Nitrogen for agitating bath and protecting furnace wall (Nm$^3$/t) | 200 | 200 |

[Operating Factors and Levels Thereof]

(a) Pre-reduction Rate of Ore in the Pre-reduction Furnace

When ores pre-reduced and dried in the pre-reduction furnace were used, the reduction was around 20%. On the other hand, when ores were charged in the direct pre-reduction furnace, the reduction was up to around 10%.

(b) Grain Diameter of the Oil Coke

The grain diameter is controlling factors for governing the fly loss amount of the oil coke, and progressing degrees of decomposition, gasification and combustion of the oil coke. Tests were performed on average grain diameters of 0.6 mm and 1.0 mm.

(c) All Input Sulfur

The higher the level thereof, the higher the densities of [S] in of molten iron and [S] in slag, and it strengthens hindrance of carbonization into the molten iron and an ascending inclination of the density of (FeO) in the slag, and it directs the operation to delay of the reduction rate of iron ores and occurrence of slopping of the slag. Within the range of 9 to 25 kg/t, the tests were performed on the three levels of around 10 kg/t, around 15 kg/t and around 20 kg/t.

(d) Post Combustion Rate

The tests were performed by controlling the rates to be 30% and 35%.

(e) Height of the Supply Chute from the Slag Bath

The higher, the less the carry-over and adhering of the slag to the front end of the chute and the operational troubles by clogging. The tests were made by changing from 2 m to 5 m.

(f) Temperature in Atmosphere at the Front End of the Supply Chute

It is decided by the height of the supply chute from the slag bath and refining conditions, and if being too low, operational obstacle substances as tar occur. The tests were made within the range between 1160° C. and 1330° C.

(g) Momentum of Charge from the Supply Chute

This is a factor of governing the carry-over loss of the oil coke together with grain diameters of the oil coke. The tests were made in several levels wide over 50 to 2000 kgm/s.

(2) Testing Conditions of Comparative Examples

Testing conditions of Comparative Examples were cases of not using the ore pre-reduction furnace as the representative process of the conventional DIOS Process (Comparative Example 1) and of using it (Comparative Example 2), and cases of not using the oil coke as the carbonaceous material but 100% coal. In Comparative Example 1, the charging from the chute depended on gravity dropping. In Comparative Example 2, the charging from the chute similarly depended on the gravity dropping, and the height of the chute from the slug surface was low as 1.7 m.

(3) Tested Results

The tested results are shown in Tables 14 to 17.

TABLE 14

|  |  | Examples 1 | Examples 2 | Examples 3 | Examples 4 |
|---|---|---|---|---|---|
| Smelting reduction furnace | Velocity of gas at air tower of furnace belly (m/s) | 2.2 | 2.4 | 2.8 | 6.6 |
|  | Average carry-over rate of carbonaceous material (%) | 3.6 | 3.2 | 2.4 | 1.8 |
|  | Molten iron [C] (%) | 3.5 | 3.6 | 3.85 | 4.15 |
|  | Molten iron [S] (%) | 0.31 | 0.29 | 0.28 | 0.27 |
|  | Slag density (FeO) (%) | 5.1 | 3.3 | 4.2 | 3.6 |
|  | Slopping index | 0 | 0 | 0 | 0 |
| Related C consumption | Input C   In carbonaceous material (kg/t) | 744 | 652 | 682 | 599 |
|  | (A)   For producing oxygen (kg/t) | 82 | 71 | 78 | 67 |
|  |   Flux, utility and others (kg/t) | 72 | 71 | 71 | 70 |
|  |   Total (kg/t) | 898 | 794 | 831 | 736 |
|  | Deducted   Utilization of recovered gas for generating electric power (kg/t) | 382 | 313 | 321 | 260 |
|  | C amount   Utilization of recovered steam for generating electric power (kg/t) | 34 | 12 | 33 | 11 |
|  | (B)   Total (kg/t) | 416 | 325 | 354 | 271 |
|  | Deducted amount of used C (kg/t) (A) − (B) | 482 | 469 | 477 | 465 |
|  | Value in terms of carbon dioxide in deducted amount of used C (kg/t) | 1767 | 1720 | 1749 | 1705 |
| Heat loss | Preheating furnace (Mcal/t) | — | 50 | — | 50 |
|  | Preheating and reducing furnace (Mcal/t) | 100 | 100 | 100 | 100 |
|  | Food and duct part (Mcal/t) | 150 | 150 | 150 | 150 |
|  | Upper portion of Smelting reduction furnace (Mcal/t) | 150 | 150 | 150 | 150 |
|  | Bath portion of Smelting reduction furnace (Mcal/t) | 40 | 40 | 40 | 40 |
| Recovered | Gas amount (Nm$^3$/t) | 2390 | 2150 | 2230 | 2020 |

TABLE 14-continued

|  |  | Examples 1 | Examples 2 | Examples 3 | Examples 4 |
|---|---|---|---|---|---|
| gas | (Mcal/t) | 3450 | 2830 | 2900 | 2350 |
| Amount of | Gas latent heat (kcal/m$^3$) | 1440 | 1320 | 1300 | 1160 |
| recovered steam | (Mcal/t) | 130 | 45 | 124 | 40 |
| Amount of generated slag (kg/t) | | 230 | 220 | 220 | 210 |
| Net consumption energy (Gcal/t) | | 3.94 | 3.79 | 3.88 | 3.74 |
| Excessive energy (Gcal/t) | | 3.11 | 2.39 | 2.6 | 1.94 |

TABLE 15

|  |  |  | Examples 5 | Examples 6 | Examples 7 | Examples 8 |
|---|---|---|---|---|---|---|
| Smelting reduction furnace | Velocity of gas at air tower of furnace belly (m/s) | | 3.2 | 2.3 | 2.2 | 8.2 |
|  | Average carry-over rate of carbonaceous material (%) | | 3.3 | 2.4 | 1.7 | 1.9 |
|  | Molten iron [C] (%) | | 3.65 | 3.7 | 4.05 | 4.25 |
|  | Molten iron [S] (%) | | 0.49 | 0.51 | 0.52 | 0.53 |
|  | Slag density (FeO) (%) | | 4.5 | 5.3 | 2.9 | 5.8 |
|  | Slopping index | | 0 | 0 | 0 | 0 |
| Related C consumption | Input C (A) | In carbonaceous material (kg/t) | 657 | 576 | 612 | 537 |
|  |  | For producing oxygen (kg/t) | 70 | 60 | 67 | 58 |
|  |  | Flux, utility and others (kg/t) | 64 | 64 | 64 | 64 |
|  |  | Total (kg/t) | 791 | 700 | 743 | 659 |
|  | Deducted C amount | Utilization of recovered gas for generating electric power (kg/t) | 325 | 263 | 277 | 222 |
|  |  | Utilization of recovered steam for generating electric power (kg/t) | 22 | 0 | 22 | 0 |
|  | (B) | Total (kg/t) | 347 | 263 | 299 | 222 |
|  | Deducted amount of used C (kg/t) (A) − (B) | | 444 | 437 | 444 | 437 |
|  | Value in terms of carbon dioxide in deducted amount of used C (kg/t) | | 1628 | 1602 | 1628 | 1602 |
| Heat loss | Preheating furnace (Mcal/t) | | — | 50 | — | 50 |
|  | Preheating and reducing furnace (Mcal/t) | | 100 | 100 | 100 | 100 |
|  | Food and duct part (Mcal/t) | | 150 | 150 | 150 | 150 |
|  | Upper portion of Smelting reduction furnace (Mcal/t) | | 150 | 150 | 150 | 150 |
|  | Bath portion of Smelting reduction furnace (Mcal/t) | | 40 | 40 | 40 | 40 |
| Recovered gas | Gas amount (Nm$^3$/t) | | 2120 | 1910 | 2010 | 1820 |
|  | (Mcal/t) | | 2940 | 2380 | 2510 | 2010 |
|  | Gas latent heat (kcal/m$^3$) | | 1390 | 1240 | 1240 | 1100 |
| Amount of recovered steam | (Mcal/t) | | 83 | 13 | 82 | 12 |
| Amount of generated slag (kg/t) | | | 140 | 140 | 140 | 140 |
| Net consumption energy (Gcal/t) | | | 3.73 | 3.6 | 3.69 | 3.57 |
| Excessive energy (Gcal/t) | | | 2.6 | 1.95 | 2.2 | 1.6 |

TABLE 16

|  |  |  | Examples 9 | Examples 10 |
|---|---|---|---|---|
| Smelting reduction furnace | Velocity of gas at air tower of furnace belly (m/s) | | 3.1 | 2.4 |
|  | Average carry-over rate of carbonaceous material (%) | | 10.2 | 16.1 |
|  | Molten iron [C] (%) | | 3 | 2.5 |
|  | Molten iron [S] (%) | | 0.62 | 0.69 |
|  | Slag density (FeO) (%) | | 21 | 11 |
|  | Slopping index | | 3 | 2 |
| Related C consumption | Input C (A) | In carbonaceous material (kg/t) | 797 | 812 |
|  |  | For producing oxygen (kg/t) | 94 | 104 |
|  |  | Flux, utility and others (kg/t) | 80 | 82 |
|  |  | Total (kg/t) | 971 | 998 |
|  | Deducted C amount | Utilization of recovered gas for generating electric power (kg/t) | 439 | 532 |
|  |  | Utilization of recovered steam for generating electric power (kg/t) | 46 | 64 |
|  | (B) | Total (kg/t) | 485 | 596 |
|  |  | Deducted amount of used C (kg/t) (A)–(B) | 486 | 402 |
|  |  | Value in terms of carbon dioxide in deducted amount of used C (kg/t) | 1782 | 1474 |
| Heat loss | Preheating furnace (Mcal/t) | | — | 50 |
|  | Preheating and reducing furnace (Mcal/t) | | 100 | 100 |
|  | Food and duct part (Mcal/t) | | 150 | 150 |
|  | Upper portion of Smelting reduction furnace (Mcal/t) | | 150 | 150 |
|  | Bath portion of Smelting reduction furnace (Mcal/t) | | 40 | 40 |

TABLE 16-continued

|  |  | Examples 9 | Examples 10 |
|---|---|---|---|
| Recovered gas | Gas amount (Nm³/t) | 2650 | 2940 |
|  | (Mcal/t) | 3980 | 4810 |
|  | Gas latent heat (kcal/m³) | 1500 | 1640 |
| Amount of recovered steam | (Mcal/t) | 180 | 250 |
| Amount of generated slag (kg/t) |  | 270 | 250 |
| Net consumption energy (Gcal/t) |  | 4.2 | 4.6 |
| Excessive energy (Gcal/t) |  | 3.64 | 3.89 |

TABLE 17

|  |  |  | Comparative examples 1 | Comparative examples 2 |
|---|---|---|---|---|
| Smelting reduction furnace | Velocity of gas at air tower of furnace belly (m/s) |  | 2.4 | 2.7 |
|  | Average carry-over rate of carbonaceous material (%) |  | 3.3 | 4.2 |
|  | Molten iron [C] (%) |  | 3.6 | 3.7 |
|  | Molten iron [S] (%) |  | 0.29 | 0.31 |
|  | Slag density (FeO) (%) |  | 6.9 | 7.3 |
|  | Slopping index |  | 0 | 10 |
| Related C consumption | Input C (A) | In carbonaceous material (kg/t) | 826 | 724 |
|  |  | For producing oxygen (kg/t) | 95 | 83 |
|  |  | Flux, utility and others (kg/t) | 82 | 80 |
|  |  | Total (kg/t) | 1003 | 887 |
|  | Deducted C amount | Utilization of recovered gas for generating electric power (kg/t) | 443 | 367 |
|  |  | Utilization of recovered steam for generating electric power (kg/t) | 49 | 25 |
|  | (B) | Total (kg/t) | 492 | 392 |
|  | Deducted amount of used C (kg/t) (A) – (B) |  | 511 | 495 |
|  | Value in terms of carbon dioxide in deducted amount of used C (kg/t) |  | 1870 | 1815 |
| Heat loss | Preheating furnace (Mcal/t) |  | — | 50 |
|  | Preheating and reducing furnace (Mcal/t) |  | 100 | 100 |
|  | Food and duct part (Mcal/t) |  | 150 | 150 |
|  | Upper portion of Smelting reduction furnace (Mcal/t) |  | 150 | 150 |
|  | Bath portion of Smelting reduction furnace (Mcal/t) |  | 40 | 40 |
| Recovered gas | Gas amount (Nm³/t) |  | 2670 | 2410 |
|  | (Mcal/t) |  | 4010 | 3320 |
|  | Gas latent heat (kcal/m³) |  | 1500 | 1380 |
| Amount of recovered steam (Mcal/t) |  |  | 190 | 90 |
| Amount of generated slag (kg/t) |  |  | 330 | 300 |
| Net consumption energy (Gcal/t) |  |  | 4.17 | 3.99 |
| Excessive energy (Gcal/t) |  |  | 3.67 | 2.88 |

① Calculation of Exhausting Amount of Carbon Dioxide

For finding an input C amount (A), a value was found by deducting the C content in terms of consumption fuel for electric power generation consumed in the utility other than the top blowing $O_2$ gas producing apparatus from the sum of C content in the carbonaceous material, C content in the flux, and C content in terms of consumption fuel for electric power generation used for producing the top blowing $O_2$ gas into the smelting reduction furnace. The thus obtained value was defined as the input C amount (A). On the other hand, as the deducted C amount (B) from the input C amount (A), a sum was found of the respective C amounts in terms of the power generating amount by the recovery gas and the power generating amount by the recovery steam, and a value ((A)–(B)) subtracting the deducted C amount (B) from the input C amount (A) was expressed with the consumed C amount (C). The consumed C amount (C) was calculated in terms of carbon dioxide and shown in Tables 10 to 13.

When Example and Comparative Example are compared in the exhausting amount of carbon dioxide, if the oil coke is used as the carbonaceous material, the exhausting amount of carbon dioxide is largely decreased. From the comparison between Examples 1 to 4 (ratio of the oil coke: 50%) and Examples 5 to 8 (ratio of the oil coke: 100%), it is seen that the larger the substitution ratio of the oil coke in the carbonaceous materials, the less the exhausting amount of carbon dioxide outside the operating route.

② Carry-over Loss of the Oil Coke from the Smelting Reduction Furnace

With respect to the carry-over rate of the oil coke, when the ratio of the oil coke occupying the carbonaceous materials in the charged raw materials is the same, the carry-over ratios of the oil coke can be compared from the average carry-over ratio of the carbonaceous materials. In general, the larger the grain diameter of the oil coke, the less the carry-over loss of the oil coke. If the grain diameters of the oil coke are at the same level, the carry-over loss at that time is mainly governed by the momentum of the charge from the supply chute, and the larger the momentum, the less the carry-over loss of the oil coke from the furnace (Examples from 1 to 4 in case of the average grain diameter: 0.6 mm, and Examples from 5 to 8 in case of the average grain diameter: 1.0 mm).

If the carry-over ratios of the oil coke of Examples 9 and 10 are compared with those of the oil coke of Examples 1 to 4 and 5 to 8, the former is fairly smaller than the latter. This is why the momentum of the charges including the oil coke is small (50 to 60 kgm/s) in Examples 9 and 10. On the other hand, in Comparative Examples 1 and 2, charging was made by the gravity dropping as flowing of the purge gas, and the carry-over loss of coal was preferably less. Calculating the momentum of the whole charges at the front end of the supply chute in this case, it is around 200 kgm/s per one chute.

Therefore, with respect to the carry-over of the carbonaceous materials, if the momentum of the whole charge at the front end of the chute is around 100 kgm/s or more per one chute, favorably it is very small, irrespective of an air sending or the gravity dropping.

The oil coke carry-over from the furnace is caught by the dust collector equipped at the furnace, recovered and re-used. Even if the carry-over loss of the oil coke goes up, carbon dioxide to be exhausted out of the iron making process does not go up. But, the net unit of consuming the oil coke in the carbonaceous materials within the input C amount (A) becomes larger as the carry-over amount is more, as seen from the comparison with the net unit of consumption of the carbonaceous materials in the input C amount (A) between the ratios of the oil coke being at the same level.

③ Influences of All Input Sulfur into the Furnace and the Height of the Chute to the Operation As increasing of all input sulfur, the [S] density in the molten iron increases while the [C] density in the same decreases. This tendency meets the relation shown in FIG. 20. Further, as increasing of all input sulfur, the (FeO) density in slag increases, and the slopping occurs. When all input sulfur exceeds 40 kg/t-the degree of the molten iron, the operation goes into the range anxious about the slopping. When the slopping occurs, the front end of the chute might be clogged. The clogging must be avoided. A desirable amount of all input sulfur without occurrence of the slopping is around 20 kg/t-molten iron. In each of Examples 1 to 8, the amount of all input sulfur was below 20 kg/t-molten iron, and the height of the chute from the slag surface was above 4 m, and the chute was not clogged at its front end.

In Examples 9 and 10, the amounts of all input sulfur were heightened as 22 and 25 kg/t-molten iron, and as the momentum of the charges from the supply chute was lowered as 50 to 60 kgm/s, the [S] density in the molten iron was high, and the carry-over loss of the oil coke was large. Therefore, the [C] density in the molten iron was low (less than 3%), and the (FeO) density in slag was high (around 10 to 20%). As a result, a slopping index was more or less large. But in this case, since the height of the front end of the chute from the slag surface was secured to be 2 m or higher, no trouble occurred by clogging it.

④ Influences of Temperature in the Atmosphere at the Front End of the Supply Chute to the Operation With respect to all Examples and Comparative Examples, as the temperature in the atmosphere at the front end of the supply chute was secured to be 1000° C. or higher, substances as tar due to insufficient decomposition of the oil coke were avoided and there arose no operational trouble by clogging of the piping system.

In all of Examples 1 to 10, since the height of the front end of the chute from the slag surface was secured to be 2 m or higher, no trouble occurred by clogging it.

⑤ Amount of Generated Slag and Net Consumption Energy

It is desirable that the amount of generated slag of Example is lower than that of Comparative Example, and the net consumption energy of Examples 1 to 8 is desirably lower than that of Comparative Example. The net consumption energy of Examples 9 and 10 is at the same level as or larger than Comparative Examples, but if comparisons are made to Example and Comparative Example in the sum of the net consumption energy and the excess energy, no difference is seen in both.

⑥ Productivity

The [C] densities in the molten iron in Examples 1 to 8 were secured to be 3.5% or more, and maintained at the same level as Comparative Example, and the (FeO) densities in slag were maintained to be equivalent to or smaller than those of Comparative Example. As a result, in Examples 1 to 8, similarly to Comparative Examples, the iron ore reduction rate was maintained at high levels, and also in Examples, the continuous operation was maintained without any problem, and the objective level of 500 t/d of the molten iron production rate could be accomplished.

⑦ Prevention of Occurrence of $SO_x$

S of higher density contained in the oil coke than in coal or coke was transferred into the molten iron and slag and fixed there in spite of passing through the dust recovery and the pre-heated and pre-reduced ores, and hardly exhausted outside of the smelting reduction process.

Above Examples relate to the smelting reduction process, and the invention is also similarly available to the smelting in the furnace of metals and metallic oxides of Ni, Cr or Mn, or dusts containing their metallic elements, otherwise to the pre-reduction treatment in the fluidized bed typed apparatus.

Embodiment 5

Thus, the smelting reduction process represented by the DIOS Process is the excellent process in the regard that the degree of freedom of the raw material and fuel is large. However, the amount of carbon dioxide generated in this process is not by far decreased in comparison with the blast furnace. Thereupon, an investigation was made to develop the smelting reduction process which would be economical in the cost of equipment and operation, and enabled to more decrease the amount of carbon dioxide.

A viewpoint of the investigation was that indispensable conditions were to have higher calorific power than coal, and low cost. As the carbonaceous material in the smelting reduction process, those were selected which could be substituted for al least parts of coal. As a result, waste plastic met the developing object of the inventors. That is, the waste plastic has higher heating value than coal, and the ratio of carbon:hydrogen of the composition is small. Therefore, if it could be usefully used as the carbonaceous materials in the smelting reduction process, it would be advantageous as a resource utilization process and largely contribute to decreasing of the generating amount of carbon dioxide. For much using the waste plastic as the carbonaceous material for substitution of coal in this process, it was more desirable to solve the under mentioned problems.

① The waste plastics as social or domestic waste matters come out from domestic electrical products, various kinds of parts of vehicles, domestic containers, vessels for drink or food, wrapping materials and other many kinds, and forms of plastics are solid, film shaped and others, sizes, shapes, weights and others are various. In addition, metals, ceramics, chemicals, food residues and others are mixed. Costs are taken for classifying works after recovery, and hygienic problems exist. Thus, preferable is an applicable technique which has solved these problems.

② Within the smelting reduction furnace, gas at high temperature of flowing rate being around 2 t 3 m/s is generally formed, and when the waste plastics are charged into the furnace, it is confirmed that the carrier gas be used to add into the slag bath. Therefore, though the ascending flow of the gas exists, the waste plastics must descend and enter the slag bath at good yield.

③ If the front end of the supply chute is brought too nearly to the slag surface for sending out the waste plastics by the carrier gas, it is clogged by splashing and piling of adherence of splash, and the operation cannot be continued.

④ The waste plastic is substance of hydrocarbon group, but unless it heated at high temperature, decomposition is in sufficient and tar and other substances harmful to the operation are generated. The tar closes, for example, piping or drains.

From the above mentioned viewpoints, the inventors made investigations to develop a smelting reduction process of an environmetal harmony type using the waste plastics as the carbonaceous material, and the following findings were obtained.

When the waste plastic is charged into the smelting reduction furnace, the carrier gas is used, and if raw materials of powder ores or valuable metallic components as dusts containing metallic components produced in steel works or other smelting works are continuously charged into the smelting reduction together with fluxes such as lime from a determined chute, it is possible to supply the waste plastic into the slag in the furnace. Of course, the waste plastic may be mixed and formed with the above raw fuel or the flux. If the pre-heating and pre-reducing treatment is performed thereto, the net unit of the fuel is more decreased. The raw fuel or the flux may be charged from the chute in a massive flowing mode. For example, it is possible to charge them in mixed states with fabric, network shaped substances, adhesive or pasting substances.

The present invention has been established on the above mentioned findings, and the subjects thereof are as follows.

The first smelting reduction process comprises charging raw materials containing metallic oxides and/or metallic hydroxide as well as the flux into the smelting reduction furnace, using the carbonaceous materials containing coal and/or coke as fuel and reducing agents, and heating and smelting the above raw materials and the above flux with heat burning the carbonaceous materials with the oxygen containing gas, so that the smelting reduction is carried out in the above mentioned smelting reduction furnace, and is characterized in that the waste plastic is substituted for at least parts of the above coal and/or coke for operation.

The second smelting reduction process, in the above first process, is characterized in that a method of charging the waste plastic into the smelting reduction furnace satisfies the following (a), (b) and (c) conditions. The (a), (b) and (c) conditions are:

(a) the waste plastic is charged from the height in 2 m or higher than the surface of the slag bath in the smelting reduction furnace, (b) the waste plastic is charged from the position in the atmosphere where the atmospheric gas is 1000° C. or higher in the smelting reduction furnace, and (c) the waste plastic is charged by sending out the carrier gas from the supply chute, wherein, with respect to the waste plastic (P) to be charged per one chute, the carbonaceous materials (Q), other than the waste plastic, to be sent together with the waste plastic, the raw materials (R) and the flux (S), the momentum directing downward of all solid substances (P+Q+R+S) is operated to be 100 kgm/s or more.

In the above mentioned, as the raw materials containing metallic oxide and/or metallic hydroxide, any of the following substances are available of ores, dusts containing metallic components generated in steel works or other smelting works, directly reduced iron (DRI), hot briquette iron (HBI), reduced, half-reduced and non-reduced pellets of various kinds of metals, and iron, and also refuses containing metallic elements. These materials exhibit similar services or effects as raw materials.

Figure 22:
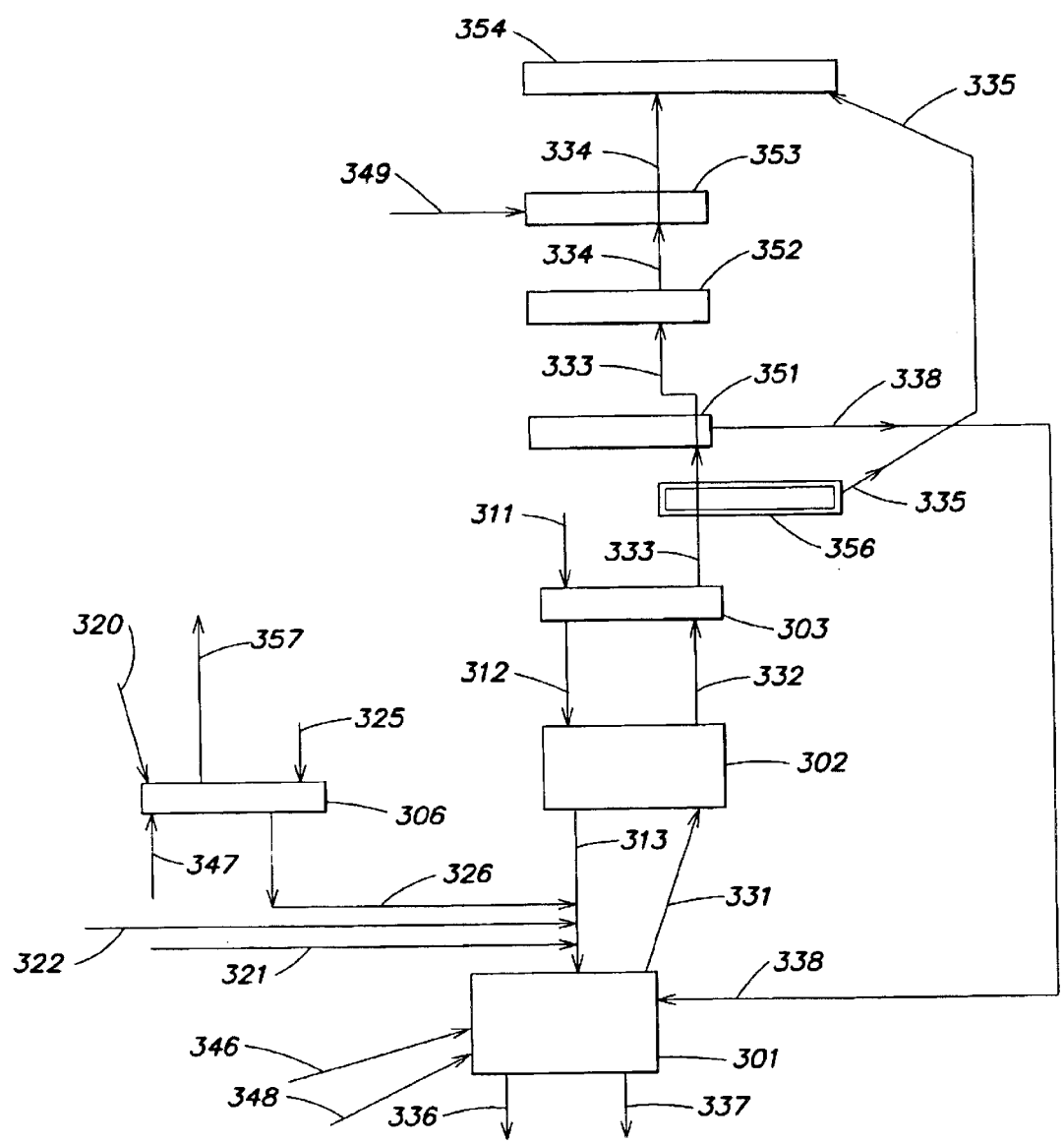
FIG. 22 is a schematic equipment flow chart used to Embodiment 5.

The invention will be explained, referring to the attached drawings. The invention is especially characterized by the smelting process in the smelting reduction furnace of the molten iron bath type in the direct pulverized ores smelting reduction process. FIG. 22 is a schematically explaining view showing one of the practicing embodiments. The pre-reduced ore 313a of coarse grain exhausted from the pre-reduction furnace 302 of the fluidized bed type, the pre-reduced ore 313b of fine grain generated in the pre-reduction furnace 302 and the smelting reduction furnace 301 and recovered in a cyclone (not shown), part of the waste plastic 322 as the carbonaceous materials and the remainder being the coal 321 or the 100% waste plastic, and the flux 326, are charged from the supply chute provided at the upper part of the smelting reduction furnace 301.

Figure 23:
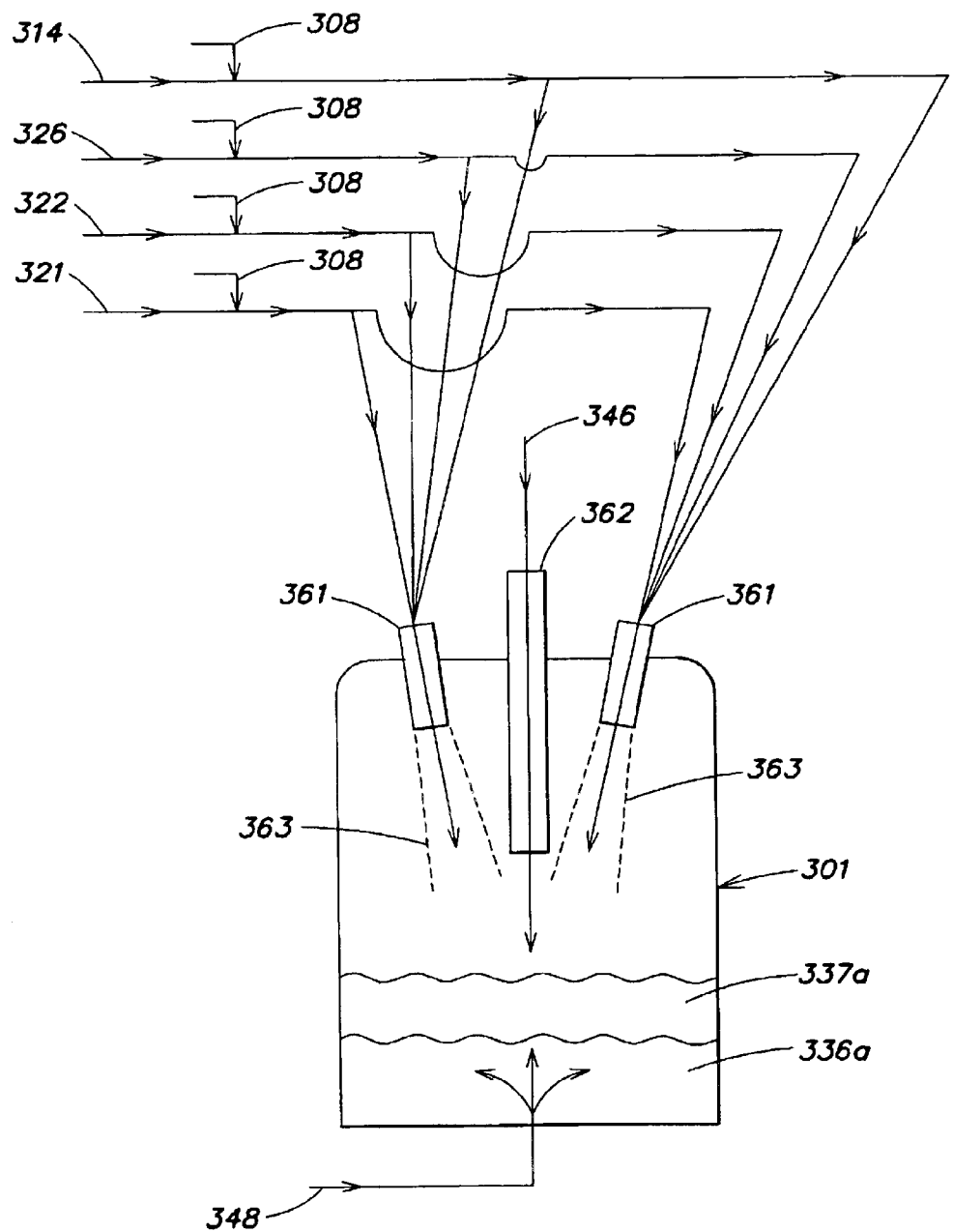
FIG. 23 is a schematic view of elemental parts of the smelting reduction furnace used in Embodiment 5.

FIG. 23 shows the schematic view of the elemental parts of the smelting reduction furnace in FIG. 22. As the raw materials, other than the pre-reduced ore of coarse grain and the pre-reduced ore of fine grain (313a and 313b), substances containing metals such as metallic dusts generated in steel works or other smelting works may be mixed appropriately and charged. As the carbonaceous material metal, oil coke and other carbon containing substances are available. The raw materials, the carbonaceous materials and the fluxs are charged, directing downward from the front end of the chute 361 by the carrier gas, for example, the nitrogen gas 308. The periodical mode of the charging is continuous. By conditions of the facility, the charging may depend on dropping by gravity from the chute 361. In this case, a purge gas is made flow for preventing the clogging of the chute. On the other hand, an oxygen gas 346 is blown into the furnace from the top lance 362, and a bath agitating gas, for example, the nitrogen gas 348 is blown from the bottom. The ore charged in the smelting reduction furnace 301 is molten by combustion heat of the carbonaceous materials and enters the slag bath 337a, and is reduced by carbon and is transferred to the molten iron bath 336a.

If the waste plastic is used in substitution for part or all of coal as the carbonaceous materials or coal and coke, the following effects are exhibited.

301: Smelting reduction furnace, 302: pre-reduction fluidized bed furnace, 303: ore preheating furnace, 306: flux burning furnace, 308: nitrogen gas (carrier gas), 311: raw ore, 312: pre-heated ore (coarse grain and fine grain), 313: pre-reduced ore (coarse grain and fine grain), 314: raw material, 320: high calorie fuel, 321: coal, 322: waste plastic, 325: raw material of flux, 326: flux, 331: generated gas, 332: occurring gas: 333: occurring gas, 334: recovery gas, 335: recovery steam, 336: molten iron, 336a: molten iron bath, 337: slag, 337a: slag bath, 338: recovery dust, 346: oxygen, 347: air, 348: nitrogen gas (agitating gas), 349: fuel for adjusting gas calorie, 351: dust collector, 352: gas holder, 353: booster, 354: generator, 356: steam recovery boiler, 357: gas, 361: supply chute, 362: lance, and 363: charge.

The heating value of the waste plastic is around 8440 kcal/kg, being fairly larger than 7000 to 7700 kcal/kg of coal and around 7000 kcal/kg of coke, and so the net units of carbonaceous materials and oxygen required to the smelting are decreased, and the amount of carbon dioxide generated in the smelting reduction processing system is largely lowered. Accordingly, the use of the waste plastic as the substitution for the coal or coke is desirable to distribution to the environmental protection and the improvement of the yielding and heating efficiencies of the process.

It is necessary to fully demonstrate the above mentioned effects and satisfactorily realize actual operation as the smelting reduction process. From such viewpoints, it is important to add the waste plastic into the slag bath, not causing to fly high up with the hot blast in the furnace and escape outside of the reducing reaction system, and prevent the supply chute and the piping circuit from troubles as closing for continuously operating all the closed systems of the smelting reduction process.

From the above regards, in the invention, the desirable charging manners of the waste plastic are delimited as follows. Further reference will be made to the grounds therefor and the effects thereby.

(1) The waste plastic is charged from the height in 2 m or higher than the surface of the slag bath in the smelting reduction furnace.

Being based on experiences of the actual operation of the smelting reduction furnace, the inventors have made it clear that, in a case of sending out the waste plastic from the chute shown in FIG. 2 together with other charges by the carrier gas, unless the front end of the chute is separated 2 m or more from the slag surface, a problem arises about clogging of the front end of the chute by adherence of slag droplets. More desirably, it is separated 3 m or longer, and being more than 5 m, there is no problem.

(2) The waste plastic is charged from the position in the atmosphere where the atmospheric gas is 1000° C. or higher within the smelting reduction furnace.

When the waste plastic is charged into the smelting reduction furnace, it is divided into part to be dissolved and gasified, part to be liquefied and part being as solid. When the waste plastic is charged with other charge by the carrier gas, unless the front end of the chute is higher than 2 m and is at the atmospheric temperature of more than 1000° C., hydrocarbon in the waste plastic is not fully decomposed, and tar and other substances harmful to the operation are generated. Because of environmental problems, desirably the waste plastic is charged from the atmospheric range of higher than 1000° C.

(3) The waste plastic is charged by sending out the carrier gas from the supply chute. With respect to the waste plastic (P) to be charged per one chute, the carbonaceous materials (Q) other than the waste plastic to be sent together with the waste plastic, the raw materials (R) and the flux (S), the momentum directing downward of all solid substances (P+Q+R+S) is operated to be 100 kgm/s or more. If the vertical downward momentum of all solid substances is more than 100 kgm/s, the substances may be charged by the gravity dropping.

The forms of the waste plastic are, as above mentioned, solid or film shapes, size and weight are various as large or small, and metals, ceramics, food residues and other are mixed as impurities. The waste plastic is largely different from general coal in grain shapes. In general, the gas tower flowing rate within the smelting reduction furnace is around 2 to 3 m/s, and the waste plastic easily runs away out of the furnace bearing thereon. The inventors sent out the waste plastic on the carrier gas from the supply chute together with other charge in the vertical direction of the furnace, and took the flow of all charges as a mass motion. Paying attention to the downward momentum of all charges, the inventors tested the influence of the above momentum to fly loss of the waste plastic.

Figure 24:
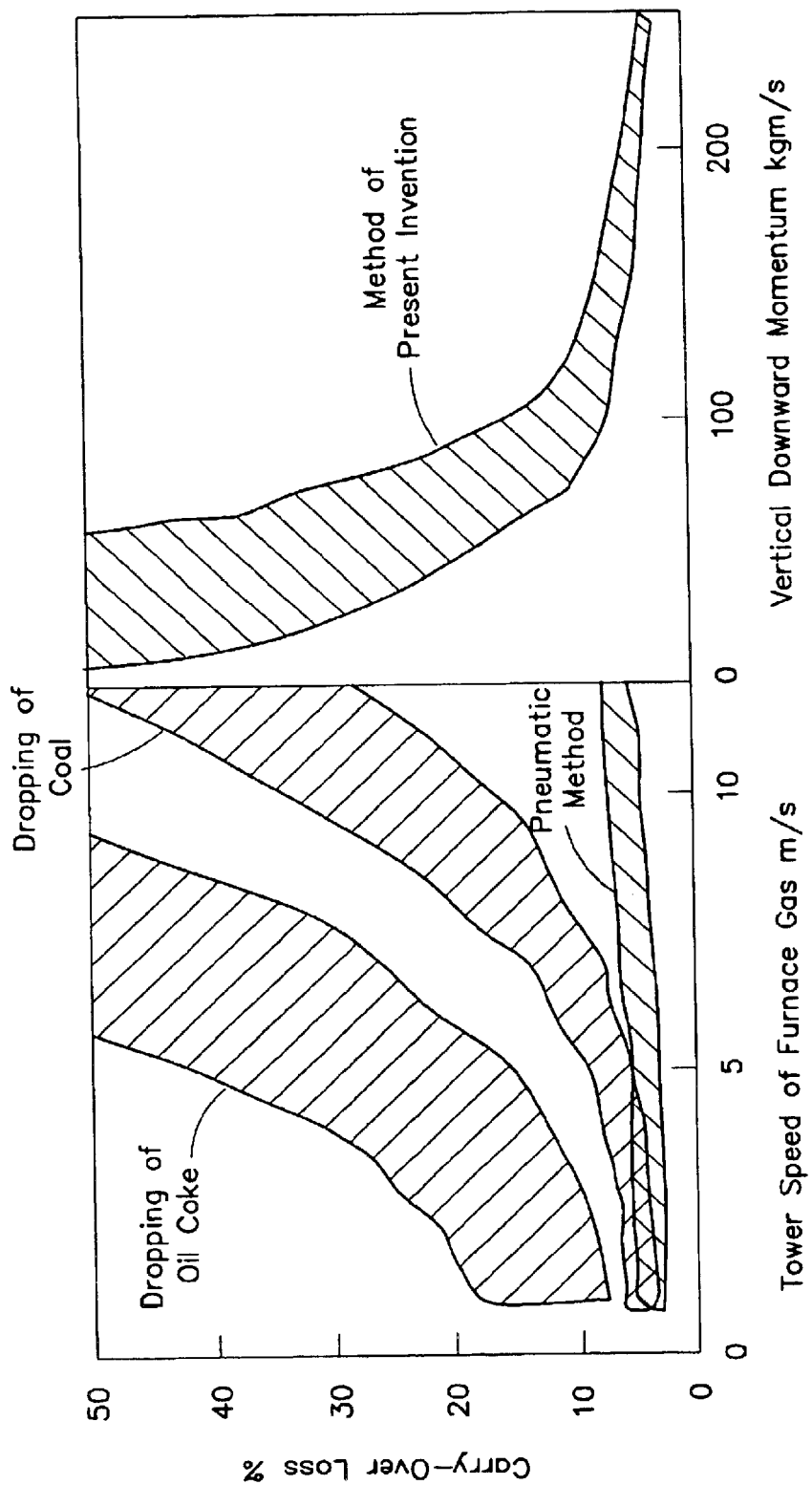
FIG. 24 is a graph showing the relation between the influences of the vertical downward momentum of all charged materials giving rise to the carry-over loss of waste plastic from the smelting reduction furnace of Embodiment 5, and the carry-over loss and the tower speed of the furnace gas.

FIG. 24 shows the relation between influences of vertical momentum of all charged materials giving to carry-over loss of the oil coke and the carry-over loss and the tower speed of the furnace gas.

Seeing from the results, the fly loss of the waste plastic is controlled to be 2 to 3% in a manner that the mass flow is, from the chute, made with the carrier gas together with other charges, and the downward momentum of all charges is adjusted to be 100 kgm/s or more.

Still further reference will be made to the case of using the waste plastic as the substitution of coal as the carbonaceous materials in the direct ore smelting reduction furnace.

The waste plastic may not be especially limited with respect to shapes, as far as sizes can be cut out through a middle hopper from a hopper without any problems. Fe is useful since it is used as raw materials of the iron source. Metals high in steam pressure such as Zn or Sn are not mixed during smelting but removed into dusts. Metals easy to be oxidized as Cr transfer to a slag of high oxygen potential and ceramics also transfer to the slag, not causing problems. Since metals less to be oxidized as Cu exist in the molten iron, such metals much mixed be selected. Advantageously, a majority of the waste plastics hardly require the pre-treatment.

Figure 25:
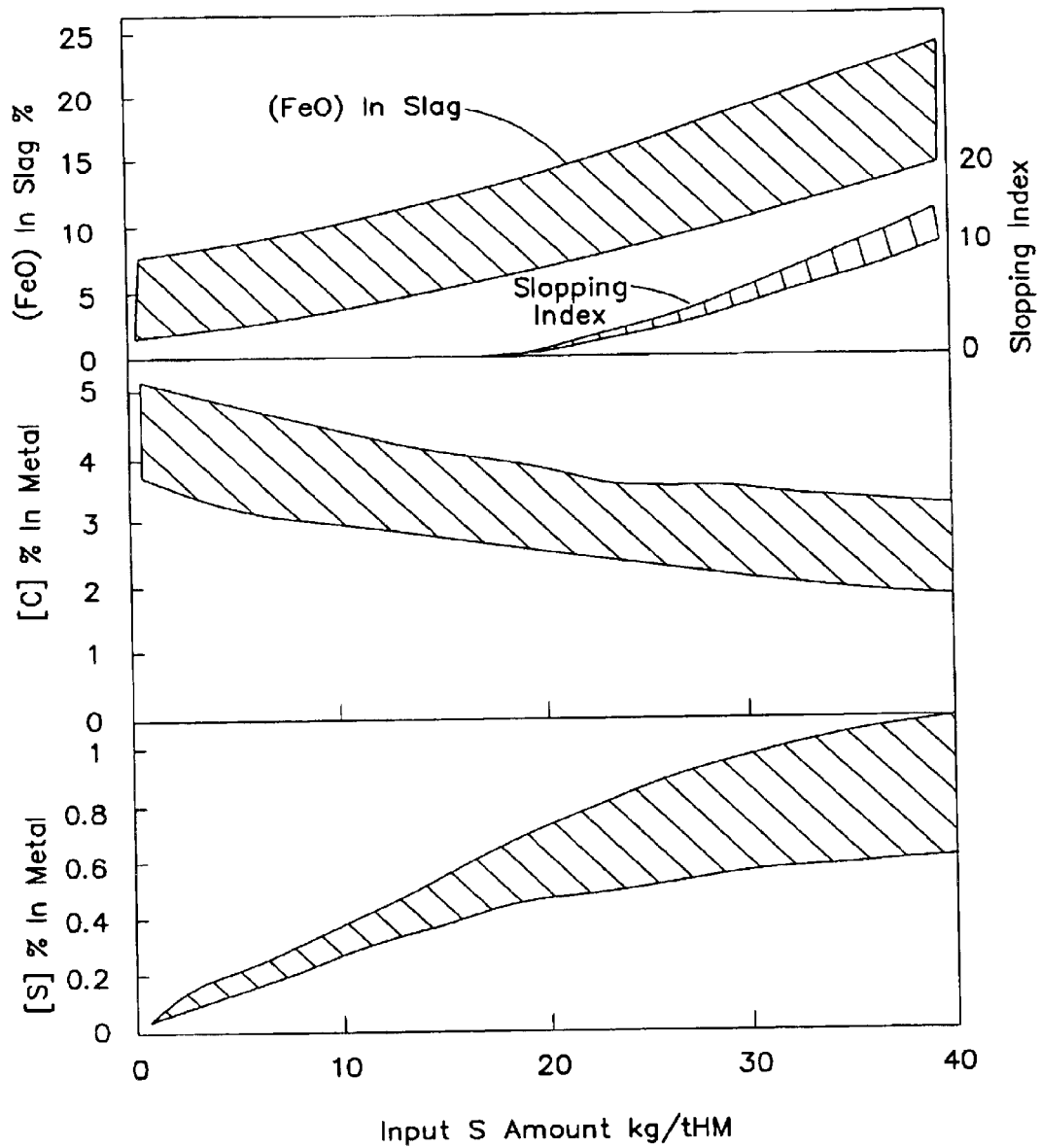
FIG. 25 is a graph showing the influences of all the input sulfur into the smelting reduction furnace of Embodiment 5, giving rise to densities and slopping degree of [S] in the molten iron, [C] in the same and (FeO) in slag.

S content in the waste plastic is about 0.1 wt % and is lower than 0.5 wt % of coal. Therefore the more the substitution amount of the waste plastic, the more advantageous the less is the load of the de-sulfurization of the molten iron. FIG. 25 shows the relation between all sulfur amount (called as "all input sulfur" hereafter) to be brought into the furnace from the whole of the carbonaceous materials, raw materials and fluxes as well as the (FeO) density in slag including the waste plastic, the slopping condition (defined as "index"), the [C] in metal and the [S] density in slag. As shown in the same, when all input sulfur increases, the [S] density in metal becomes high, and therefore, the carburizing action into metal by addition of the carbonaceous materials is hindered, and the carbon density in metal does not fully increase. As a result, valuable metallic oxides ($M_xO_y$) increases in slag due to reduction delay of ores, or the slopping occurs, so that the operation is made unstable. However, since S content of the waste plastic is far lower than that of coal, if the waste plastic is much charged, there does not occur the operational unstability, and the operation is stable.

Further, the water content in the waste plastic is about 2 wt % being considerably lower than about 10 wt % of coal, the drying of the water content is not required.

As S content is low, $SO_x$ little appears if the waste plastic is used as mere fuel or burnt, and almost all transfer to the slag and the molten iron and are fixed, and favorably it is prevented from exhausting into the atmospheric air.

EXAMPLE

The smelting reduction process of the invention will be explained in detail with reference to the examples.

The Examples 1 to 10 used the smelting reduction facilities of the molten iron production rate being 500 t/d shown in FIGS. 22 and 23, and produced the molten iron through the continuous operation by the process within the inventive range. The Comparative Examples 1 and 2 used the smelting reduction facilities of the same molten iron production rate being 500 t/d shown in FIG. 25 following the facilities used in the Examples, and produced the molten iron through the continuous operation by the process outside the inventive range.

Table 18 shows the analyzed results of the used iron ores, and Table 19 shows the analyzed results of the waste plastic. In the waste plastics, there is polyethylene called as so-called virgin pellet of high calorie exceeding 10000 kcal/kg and high quality of low ash, but there are broken products, dropped ones by wind selection, thin materials as magnetic cards including resin substances of low calorie being around 1000 kcal/kg, and others. Variations in grain degree or components are inevitable. Seeing average values of available ones, they are almost as shown in Table 19. The heating values are not so high comparing with that of coal, but sulfur content is very low.

The waste plastic does not necessarily depend on any means as an air sending or blowing for transferring within the smelting reduction process system and charging into the furnace. In the piping circuit until chuting the charges in the smelting reduction furnace, if piping diameter not clogging is around ⅓ or shorter of 100 mm diameter, there is no problem in serving. If foreigners as metals or ceramics are mixed or adhered, no problems happen prominently.

The testing conditions of the Examples are roughly divided with the using ratio of the waste plastic occupying the carbonaceous materials into 50% (Examples 1 to 4), 60% (Example 9), and 100% (Examples 5 to 8 and 10). The levels of the operating factors of (a) to (f) were determined as follows within the inventive range, and the test were operated when these factors were appropriately combined.

Tables 20 to 23 shows the testing conditions.

TABLE 18

| | Components of ores (%) | | | | | | | | | | | | | |
|---|---|---|---|---|---|---|---|---|---|---|---|---|---|---|
| | T.Fe | $Fe_2O_3$ | FeO | CaO | $SiO_2$ | $AL_2O_3$ | MgO | Mn | P | S | $TiO_2$ | Ig Loss | Others | (Gangue) | Water content |
| Iron ores | 66.0 | 94.0 | 0.30 | 0.00 | 1.90 | 1.60 | 0.00 | 0.10 | 0.04 | 0.01 | 0.10 | 1.00 | 1.0 | 5.7 | 6.00 |

TABLE 19

| Coal | Analyzed values | | | Analysis of elements (%) | | | | C/H ratio | Lower heating values (kcal/kg) | Ash composition (%) | | | | Specific gravity |
|---|---|---|---|---|---|---|---|---|---|---|---|---|---|---|
| | Ash | TS | Water content | C | H | N | O | | | CaO | $SiO_2$ | $AL_2O_3$ | $Fe_2O_3$ | |
| Coal | 9.4 | 0.50 | 9.1 | 78.5 | 4.6 | 1.8 | 5.3 | 17 | 7450 | 2.5 | 56.5 | 27.4 | 6.6 | 0.7 |
| Waste plastics | 7.0 | <0.1 | 1.1 | 70 | 10 | 2 | 10 | 7 | 7900 | 7.3 | 16.7 | 29.4 | 2.0 | 0.4 |
| Coal + Waste plastics 50% | 8.2 | 0.25 | 5.1 | 74.3 | 7.3 | 1.9 | 7.7 | 12 | 7675 | 4.9 | 36.6 | 28.4 | 4.3 | 0.6 |

(1) Testing Conditions of Examples

TABLE 20

| | | Examples 1 | Examples 2 | Examples 3 | Examples 4 |
|---|---|---|---|---|---|
| Structure of carbonecous materials charged in the melting and reducing furnace | Coal (%) | 50 | 50 | 50 | 50 |
| | Oil coke (%) | 50 | 50 | 50 | 50 |
| Preheating furnace | Ore preheating temperature (° C.) | 25 | 250 | 25 | 260 |
| Preheating and reducing furnace | Temperature of exhausted ore (Average temperature (° C.) of coarse grains and fine powders) | 605 | 703 | 600 | 699 |
| | Pre-reducing percentage of ore (%) | 10 | 20 | 9 | 19 |
| Smelting reduction furnace | Iron ores as raw materials (kg/t) | 1475 | 1475 | 1475 | 1475 |
| | Carbonaceous materials    Coal (kg/t) | 452 | 393 | 410 | 363 |
| | Oil coke (kg/t) | 452 | 393 | 410 | 363 |
| | Total (kg/t) | 894 | 786 | 820 | 726 |
| | Grain diameter of Oil coke (mm) | ave. 1 | ave. 2 | ave. 3 | ave. 5 |
| | Flux    Calcined lime (kg/t) | 13 | 12 | 13 | 12 |
| | Light burnt dolomite (kg/t) | 68 | 65 | 66 | 63 |
| | Input all sulfur (kg/t) | 3 | 3 | 3 | 3 |
| | Blown oxygen (in terms of pure oxygen) | 628 | 541 | 592 | 513 |
| | Percentage of post combustion (%) | 30 | 30 | 35 | 35 |
| | Temperature of molten iron (° C.) | 1510 | 1515 | 1517 | 1532 |
| | Slag basicity ($CaO/SiO_2$) | 1.15 | 1.12 | 1.13 | 1.14 |
| | In slag (MgO) (%) | 10 | 6 | 7 | 9 |
| | Height of front end of charging chute (m) | 4.5 | 5.1 | 4.2 | 4.9 |
| | Atmosphere temperature at front end of charging chute (° C.) | 1200 | 1210 | 1240 | 1280 |
| | Momentum of charged materials from charging chute (kgm/s) | 150 | 300 | 600 | 1000 |
| | Nitrogen for agitating bath and protecting furnace wall ($Nm^3/t$) | 200 | 200 | 200 | 200 |

TABLE 21

|  |  | Examples 5 | Examples 6 | Examples 7 | Examples 8 |
|---|---|---|---|---|---|
| Structure of carbonecous materials charged in the melting and reducing furnace | Coal (%) | 0 | 0 | 0 | 0 |
|  | Oil coke (%) | 100 | 100 | 100 | 100 |
| Preheating furnace | Ore preheating temperature (° C.) | 25 | 270 | 25 | 280 |
| Preheating and reducing furnace | Temperature of exhausted ore (Average temperature (° C.) of coarse grains and fine powders) | 598 | 705 | 596 | 702 |
|  | Pre-reducing percentage of ore (%) | 9 | 21 | 8 | 20 |
| Smelting reduction furnace | Iron ores as raw materials (kg/t) | 1475 | 1475 | 1475 | 1475 |
|  | Carbonaceous materials   Coal (kg/t) | 0 | 0 | 0 | 0 |
|  |   Oil coke (kg/t) | 750 | 670 | 700 | 630 |
|  |   Total (kg/t) | 750 | 670 | 700 | 630 |
|  | Grain diameter of Oil coke (mm) | ave. 5 | ave. 5 | ave. 10 | ave. 15 |
|  | Flux   Calcined lime (kg/t) | 4 | 4 | 5 | 4 |
|  |   Light burnt dolomite (kg/t) | 44 | 43 | 44 | 43 |
|  | Input all sulfur (kg/t) | 1 | 1 | 1 | 1 |
|  | Blown oxygen (in terms of pure oxygen) | 536 | 463 | 515 | 440 |
|  | Percentage of post combustion (%) | 31 | 31 | 36 | 36 |
|  | Temperature of molten iron (° C.) | 1525 | 1527 | 1519 | 1515 |
|  | Slag basicity (CaO/SiO$_2$) | 1.1 | 1.09 | 1.21 | 1.09 |
|  | In slag (MgO) (%) | 10 | 8 | 9 | 6 |
|  | Height of front end of charging chute (m) | 5.2 | 3.8 | 4.1 | 4.9 |
|  | Atmosphere temperature at front end of charging chute (° C.) | 1230 | 1250 | 1290 | 1330 |
|  | Momentum of charged materials from charging chute (kgm/s) | 200 | 500 | 1000 | 2000 |
|  | Nitrogen for agitating bath and protecting furnace wall (Nm$^3$/t) | 200 | 200 | 200 | 200 |

TABLE 22

|  |  | Examples 9 | Examples 10 |
|---|---|---|---|
| Structure of carbonecous materials charged in the melting and reducing furnace | Coal (%) | 40 | 0 |
|  | Oil coke (%) | 60 | 100 |
| Preheating furnace | Ore preneating temperature (° C.) | 25 | 25 |
| Preheating and reducing furnace | Temperature of exhausted ore (Average temperature (° C.) of coarse grains and fine powders) | 600 | 600 |
|  | Pre-reducing percentage of ore (%) | 10 | 10 |
|  | Iron ores as raw materials (kg/t) | 1480 | 1480 |
|  | Carbonaceous materials   Coal (kg/t) | 385 | 0 |
|  |   Oil coke (kg/t) | 577 | 1,000 |
|  |   Total (kg/t) | 962 | 1,000 |
|  | Grain (diameter of Oil coke (mm) | ave. 20 | ave. 30 |
|  | Flux   Calcined lime (kg/t) | 14 | 16 |
|  |   Light burnt dolomite (kg/t) | 73 | 75 |
| Smelting reduction furnace | Input all sulfur (kg/t) | 3 | 3 |
|  | Blown oxygen (in terms of pure oxygen) | 720 | 800 |
|  | Percentage of post combustion (%) | 32 | 27 |
|  | Temperature of molten iron (° C.) | 1565 | 1535 |
|  | Slag basicity (CaO/SiO$_2$) | 1.11 | 1.12 |
|  | In slag (MgO) (%) | 9 | 7 |
|  | Height of front end of charging chute (m) | 2.3 | 3.6 |
|  | Atmosphere temperature at front end of charging chute (° C.) | 1160 | 1210 |
|  | Momentum of charged materials from charging chute (kgm/s) | 50 | 60 |
|  | Nitrogen for agitating bath and protecting furnace wall (Nm$^3$/t) | 200 | 200 |

TABLE 23

|  |  | Comparative examples 1 | Comparative examples 2 |
|---|---|---|---|
| Structure of carbonecous materials charged in the melting and reducing furnace | Coal (%) | 100 | 100 |
|  | Oil coke (%) | 0 | 0 |
| Preheating furnace | Ore preheating temperature (° C.) | 25 | 240 |
| Preheating and reducing furnace | Temperature of exhausted ore (Average temperature (° C.) of course grains and fine powders) | 601 | 702 |
|  | Pre-reducing percentage of ore (%) | 10 | 20 |

TABLE 23-continued

|  |  |  | Comparative examples 1 | Comparative examples 2 |
|---|---|---|---|---|
| Smelting reduction furnace | Iron ores as raw materials (kg/t) |  | 1481 | 1480 |
|  | Carbonaceous materials | Coal (kg/t) | 1052 | 922 |
|  |  | Oil coke (kg/t) | 0 | 0 |
|  |  | Total (kg/t) | 1052 | 922 |
|  | Grain diameter of Oil coke (mm) |  | — | — |
|  | Flux | Calcined lime (kg/t) | 26 | 24 |
|  |  | Light burnt dolomite (kg/t) | 98 | 91 |
|  | Input all sulfur (kg/t) |  | 7 | 6 |
|  | Blown oxygen (in terms of pure oxygen) |  | 725 | 626 |
|  | Percentage of post combustion (%) |  | 29 | 31 |
|  | Temperature of molten iron (° C.) |  | 1506 | 1546 |
|  | Slag basicity (CaO/SiO$_2$) |  | 1.14 | 1.13 |
|  | In slag (MgO) (%) |  | 11 | 10 |
|  | Height of front end of charging chute (m) |  | 4.5 | 1.7 |
|  | Atmosphere temperature at front end of charging chute (° C.) |  | 1090 | 1110 |
|  | Momentum of charged materials from charging chute (kgm/s) |  | Drop by gravity | Drop by gravity |
|  | Nitrogen for agitating bath and protecting furnace wall (Nm$^3$/t) |  | 200 | 200 |

[Operating Factors and Levels Thereof]

(a) Pre-reduction Rate of Ore in the Pre-reduction Furnace

When ores pre-reduced and dried in the pre-reduction furnace were used, the reduction was around 20%. On the other hand, when ores were charged in the direct pre-reduction furnace, the reduction was up to around 10%.

(b) Grain Diameter of the Waste Plastic

From the viewpoint of decreasing the carry-over loss of the waste plastic from the smelting reduction furnace, the larger, the better, necessarily around ⅓ of the piping diameter for preventing the clogging. The smaller grain diameter, the better in the progressing degrees of decomposition, gasification and combustion of the waste plastic. Herein, various levels of 1 to 15 mm are taken up.

(c) Post Combustion Rate

The tests were performed by controlling the rates to be 30% and 35%.

(d) Height of the Supply Chute from the Slag Bath

The higher, the less the carry-over and adhering of the slag to the front end of the chute and the operational troubles by clogging. The tests were made by changing from 2 m to 5 m.

(e) Temperature in Atmosphere at the Front End of the Supply Chute

It is decided by the height of the supply chute from the slag bath and refining conditions, and if being too low, operation obstacle substances as tar occur. The tests were made within the range between 1160° C. and 1330° C.

(f) Momentum of Charge from the Supply Chute

This is a factor of governing the carry-over loss of the waste plastic together with grain diameters of the oil coke. The tests were made in several levels wide over 50 to 2000 kgm/s.

(2) Testing Conditions of Comparative Examples

Testing conditions of Comparative Examples were cases of not using the ore pre-reduction furnace as the representative process of the conventional DIOS Process (Comparative Example 1) and of using it (Comparative Example 2), and cases of not using the waste plastic as the carbonaceous material but 100% coal. In Comparative Example 1, the charging from the chute depended on gravity dropping. In Comparative Example 2, the charging from the chute similarly depended on the gravity dropping, and the height of the chute from the slag surface was 1.7 m.

(3) Tested Results

The tested results are shown in Tables 24 to 27.

TABLES 24

|  |  |  | Examples 1 | Examples 2 | Examples 3 | Examples 4 |
|---|---|---|---|---|---|---|
| Smelting reduction furnace | Velocity of gas at air tower of furnace belly (m/s) |  | 2.3 | 2.5 | 2.7 | 6.5 |
|  | Average carry-over rate of carbonaceous material (%) |  | 3.7 | 3.3 | 2.2 | 1.7 |
|  | Molten iron [C] (%) |  | 3.9 | 4.1 | 4.15 | 4.05 |
|  | Molten iron [S] (%) |  | 0.15 | 0.14 | 0.16 | 0.15 |
|  | Slag density (FeO) (%) |  | 2.9 | 3.3 | 4.2 | 3.6 |
|  | Slopping index |  | 0 | 0 | 0 | 0 |
| Related C consumption | Input C (A) | In carbonaceous material (kg/t) | 671 | 583 | 609 | 539 |
|  |  | For oxygen production (kg/t) | 82 | 71 | 78 | 67 |
|  |  | Slag maker, utility and others (kg/t) | 72 | 71 | 71 | 70 |
|  |  | Total (kg/t) | 825 | 725 | 758 | 676 |
|  | Deducted C amount | Utilization of recovered gas for generating electric power (kg/t) | 382 | 313 | 321 | 260 |
|  |  | Utilization of recovered steam for generating electric power (kg/t) | 34 | 12 | 33 | 11 |
|  | (B) | Total (kg/t) | 416 | 325 | 354 | 271 |
|  | Deducted amount of used C (kg/t) |  | 482 | 400 | 404 | 405 |
|  | (A) − (B) |  |  |  |  |  |
|  | Value in terms of carbon dioxide in deducted amount of used C (kg/t) |  | 1767 | 1467 | 1481 | 1485 |

TABLES 24-continued

|  |  | Examples 1 | Examples 2 | Examples 3 | Examples 4 |
|---|---|---|---|---|---|
| Heat loss | Preheating furnace (Mcal/t) | — | 50 | — | 50 |
|  | Preheating and reducing furnace (Mcal/t) | 100 | 100 | 100 | 100 |
|  | Food and duct part (Mcal/t) | 150 | 150 | 150 | 150 |
|  | Upper portion of melting and reducing furnace (Mcal/t) | 150 | 150 | 150 | 150 |
|  | Bath portion of Smelting reduction furnace (Mcal/t) | 40 | 40 | 40 | 40 |
| Recovered gas | Gas amount ($Nm^3/t$) | 2390 | 2150 | 2230 | 2020 |
|  | (Mcal/t) | 3450 | 2830 | 2900 | 2350 |
|  | Gas latent heat ($kcal/m^3$) | 1440 | 1320 | 1300 | 1160 |
| Amount of recovered steam | (Mcal/t) | 130 | 45 | 124 | 40 |
| Amount of generated slag (kg/t) |  | 231 | 222 | 221 | 212 |
| Net consumption energy (Gcal/t) |  | 3.96 | 3.81 | 3.9 | 3.76 |
| Excessive energy (Gcal/t) |  | 3.12 | 2.4 | 2.61 | 1.95 |

TABLE 25

|  |  |  |  | Examples 5 | Examples 6 | Examples 7 | Examples 8 |
|---|---|---|---|---|---|---|---|
| Smelting reduction furnace | Velocity of gas at air tower of furnace belly (m/s) |  |  | 3.3 | 2.4 | 2.5 | 8.3 |
|  | Average carry-over rate of carbonaceous material (%) |  |  | 3.2 | 2.5 | 1.8 | 2.1 |
|  | Molten iron [C] (%) |  |  | 4.05 | 4.1 | 4.25 | 4.3 |
|  | Molten iron [S] (%) |  |  | 0.07 | 0.06 | 0.07 | 0.06 |
|  | Slag density (FeO) (%) |  |  | 4.4 | 3.6 | 2.2 | 1.8 |
|  | Slopping index |  |  | 0 | 0 | 0 | 0 |
| Related C consumption | Input C (A) | In carbonaceous material (kg/t) |  | 525 | 469 | 490 | 441 |
|  |  | For oxygen production (kg/t) |  | 70 | 60 | 67 | 58 |
|  |  | Slag maker, utility and others (kg/t) |  | 64 | 64 | 64 | 64 |
|  |  | Total (kg/t) |  | 659 | 593 | 621 | 563 |
|  | Deducted C amount | Utilization of recovered gas for generating electric power (kg/t) |  | 325 | 263 | 277 | 222 |
|  |  | Utilization of recovered steam for generating electric power (kg/t) |  | 22 | 0 | 22 | 0 |
|  | (B) | Total (kg/t) |  | 347 | 263 | 299 | 222 |
|  | Deducted amount of used C (kg/t) (A) − (B) |  |  | 312 | 330 | 322 | 341 |
|  | Value in terms of carbon dioxide in deducted amount of used C (kg/t) |  |  | 1144 | 1210 | 1181 | 1250 |
| Heat loss | Preheating furnace (Mcal/t) |  |  | — | 50 | — | 50 |
|  | Preheating and reducing furnace (Mcal/t) |  |  | 100 | 100 | 100 | 100 |
|  | Food and duct part (Mcal/t) |  |  | 150 | 150 | 150 | 150 |
|  | Upper portion of Smelting reduction furnace (Mcal/t) |  |  | 150 | 150 | 150 | 150 |
|  | Bath portion of Smelting reduction furnace (Mcal/t) |  |  | 40 | 40 | 40 | 40 |
| Recovered gas | Gas amount ($Nm^3/t$) |  |  | 2120 | 1910 | 2010 | 1820 |
|  | (Mcal/t) |  |  | 2940 | 2380 | 2510 | 2010 |
|  | Gas latent heat ($kcal/m^3$) |  |  | 1390 | 1240 | 1240 | 1100 |
| Amount of recovered steam | (Mcal/t) |  |  | 83 | 13 | 82 | 12 |
| Amount of generated slag (kg/t) |  |  |  | 220 | 213 | 232 | 224 |
| Net consumption energy (Gcal/t) |  |  |  | 3.75 | 3.62 | 3.7 | 3.59 |
| Excessive energy (Gcal/t) |  |  |  | 2.61 | 1.96 | 2.21 | 1.61 |

TABLE 26

|  |  |  | Examples 9 | Examples 10 |
|---|---|---|---|---|
| Smelting reduction furnace | Velocity of gas at air tower of furnace belly (m/s) |  | 3.2 | 2.3 |
|  | Average carry-over rate of carbonaceous material (%) |  | 12.2 | 17.8 |
|  | Molten iron [C] (%) |  | 4.3 | 4.35 |
|  | Molten iron [S] (%) |  | 0.16 | 0.17 |
|  | Slag density (FeO) (%) |  | 2.1 | 1.5 |
|  | Slopping index |  | 0 | 0 |
| Related C consumption | Input C (A) | In carbonaceous material (kg/t) | 706 | 700 |
|  |  | For oxygen production (kg/t) | 94 | 104 |
|  |  | Slag maker, utility and others (kg/t) | 80 | 82 |
|  |  | Total (kg/t) | 880 | 886 |
|  | Deducted C amount | Utilization of recovered gas for generating electric power (kg/t) | 439 | 532 |
|  |  | Utilization of recovered steam for generating electric power (kg/t) | 46 | 64 |
|  | (B) | Total (kg/t) | 485 | 596 |
|  | Deducted amount of used C (kg/t) |  | 395 | 290 |

TABLE 26-continued

|  |  | Examples 9 | Examples 10 |
|---|---|---|---|
|  | (A) − (B) |  |  |
|  | Value in terms of carbon dioxide in deducted amount of used C (kg/t) | 1448 | 1063 |
| Heat loss | Preheating furnace (Mcal/t) | — | 50 |
|  | Preheating and reducing furnace (Mcal/t) | 100 | 100 |
|  | Food and duct part (Mcal/t) | 150 | 150 |
|  | Upper portion of Smelting reduction furnace (Mcal/t) | 150 | 150 |
|  | Bath portion of Smelting reduction furnace (Mcal/t) | 40 | 40 |
| Recovered gas | Gas amount (Nm$^3$/t) | 2650 | 2940 |
|  | (Mcal/t) | 3980 | 4810 |
|  | Gas latent heat (kcal/m$^3$) | 1500 | 1640 |
| Amount of recovered steam (Mcal/t) |  | 180 | 250 |
| Amount of generated slag (kg/t) |  | 250 | 260 |
| Net consumption energy (Gcal/t) |  | 4.22 | 4.62 |
| Excessive energy (Gcal/t) |  | 3.65 | 3.9 |

TABLE 27

|  |  |  | Comparative examples 1 | Comparative examples 2 |
|---|---|---|---|---|
| Smelting reduction furnace | Velocity of gas at air tower of furnace belly (m/s) |  | 2.3 | 2.8 |
|  | Average carry-over rate of carbonaceous material (%) |  | 3.2 | 4.3 |
|  | Molten iron [C] (%) |  | 3.5 | 3.6 |
|  | Molten iron [S] (%) |  | 0.31 | 0.32 |
|  | Slag density (FeO) (%) |  | 7.1 | 7.4 |
|  | Slopping index |  | 0 | 10 |
| Related C consumption | Input C (A) | In carbonaceous material (kg/t) | 826 | 724 |
|  |  | For oxygen production (kg/t) | 95 | 83 |
|  |  | Slag maker, utility and others (kg/t) | 82 | 80 |
|  |  | Total (kg/t) | 1003 | 887 |
|  | Deducted C amount | Utilization of recovered gas for generating electric power (kg/t) | 443 | 367 |
|  |  | Utilization of recovered steam for generating electric power (kg/t) | 49 | 25 |
|  | (B) | Total (kg/t) | 492 | 392 |
|  | Deducted amount of used C (kg/t) |  | 511 | 495 |
|  | (A) − (B) |  |  |  |
|  | Value in terms of carbon dioxide in deducted amount of used C (kg/t) |  | 1874 | 1815 |
| Heat loss | Preheating furnace (Mcal/t) |  | — | 50 |
|  | Preheating and reducing furnace (Mcal/t) |  | 100 | 100 |
|  | Food and duct part (Mcal/t) |  | 150 | 150 |
|  | Upper portion of Smelting reduction furnace (Mcal/t) |  | 150 | 150 |
|  | Bath portion of Smelting reduction furnace (Mcal/t) |  | 40 | 40 |
| Recovered gas | Gas amount (Nm$^3$/t) |  | 2670 | 2410 |
|  | (Mcal/t) |  | 4010 | 3320 |
|  | Gas latent heat (kcal/m$^3$) |  | 1500 | 1380 |
| Amount of recovered steam (Mcal/t) |  |  | 190 | 90 |
| Amount of generated slag (kg/t) |  |  | 330 | 300 |
| Net consumption energy (Gcal/t) |  |  | 4.2 | 4.02 |
| Excessive energy (Gcal/t) |  |  | 3.68 | 2.9 |

① Calculation of Exhausting Amount of Carbon Dioxide

For finding an input C amount (A), a value was found by deducting the C content in terms of consumption fuel for electric power generation consumed in the utility other than the top blowing $O_2$ gas producing apparatus from the sum of C content in the carbonaceous material, C content in the flux, and C content in terms of consumption fuel for electric power generation used for producing the top blowing $O_2$ gas into the smelting reduction furnace. The thus obtained value was defined as the input C amount (A). On the other hand, as the deducted C amount (B) from the input C amount (A), a sum was found of the respective C amounts in terms of the power generating amount by the recovery gas and the power generating amount by the recovery steam, and a value ((A)−(B)) subtracting the deducted C amount (B) from the input C amount (A) was expressed with the consumed C amount (C). The consumed C amount (C) was calculated in terms of carbon dioxide and shown in Tables 24 to 27.

When Example and Comparative Example are compared in the exhausting amount of carbon dioxide, if the waste plastic is used as the carbonaceous material, the exhausting amount of carbon dioxide is largely decreased. From the comparison between Examples 1 to 4 (ratio of the waste plastic: 50%) and Examples 5 to 8 (ratio of the waste plastic: 100%), it is seen that the larger the substitution ratio of the waste plastic in the carbonaceous materials, the less the exhausting amount of carbon dioxide outside the operating route.

② Carry-over Loss of the Waste Plastic from the Smelting Reduction Furnace

With respect to the carry-over rate of the waste plastic, when the ratio of the waste plastic occupying the carbonaceous materials in the charged raw materials is the same, the carry-over ratios of the waste plastic can be compared from the average carry-over ratio of the carbonaceous materials. In general, the larger the grain diameter of the waste plastic, the less the carry-over loss of the waste plastic. The waste plastic is sent downward together with other charges in the form of mass flow by the carrier gas from the front end of the supply chute. The larger the momentum, the less the carry-over loss of the waste plastic from the smelting reduction furnace. In Examples 1 to 4, the average grain diameters were made large in order of 1 to 5 mm, and at the same time, the momentum was increased from 150 to 1000 kgm/s. In Examples 5 to 8, the average grain diameters were made large in order of 5 to 15 mm, and at the same time, the momentum was increased from 200 to 2000 kgm/s. The larger the average grain diameter and the momentum, the less the carry-over loss of the waste plastic.

When comparing the carry-over loss ratios of the waste plastic of Examples 9 and 10 with those of Examples 1 to 4 and 5 to 8, the former is considerably smaller than the latter. This is why the momentum of the charges including the waste plastic was small in Examples 9 and 10 (50 to 60 kgm/s). On the other hand, in Comparative Examples 1 and 2, the coal was charged by the gravity dropping as the purge gas was caused to flow, and the carry-over loss ratio of the coal was favorably small. Calculating the momentum of the whole charges at the front end of the supply chute; it is around 200 kgm/s per one chute.

Accordingly, it is seen that if the momentum of the whole charges at the front end of the supply chute is around 100 kgm/s per one chute, the carry-over ratio of the carbonaceous material is considerably small and favorable, irrespective of the air sending or he gravity dropping.

The waste plastic carry-over from the furnace is caught by the dust collector equipped at the furnace, recovered and re-used. Therefore, if the carry-over loss of the waste plastic increases, carbon dioxide to be exhausted out of the smelting reduction processing system does not increase. However, the net unit of consuming the waste plastic in the carbonaceous materials within the input C amount (A) becomes larger as the carry-over amount is more, as seen from the comparison with the net unit of consumption of the carbonaceous materials in the input C amount (A) between the ratios of the waste plastic being at the same level.

③ Influences of the Height of the Chute to the Operation

The higher the distance of the supply chute from the slag surface, the less the adherence and piling of the slag at the front end of the chute. In Examples 1 to 8, the height was secured to be 4 m or more, and in Examples 9 and 10, it was maintained to be 2 m or more, and there occurred no troubles as closing of the supply chute. However, in Comparative Example 2, the height of the chute is more or less small, and the charging was the gravity dropping, so that, due to the adherence and piling of the slag at the front end of the chute and the delay in addition speed of the charges into the slag bath thereby, the (FeO) density in slag was slightly high, and the slopping index was large.

④ Influences of Temperature in the Atmosphere at the Front End of the Supply Chute to the Operation With respect to all Examples and Comparative Examples, as the temperature in the atmosphere at the front end of the supply chute was secured to be 1000° C. or higher, substances as tar due to insufficient decomposition of the waste plastic were avoided and there arose no operational trouble by clogging of the piping system.

⑤ Amount of Generated Slag and Net Consumption Energy

It is desirable that the amount of generated slag of Example is lower than that of Comparative Example, and the net consumption energy of Examples 1 to 8 is desirably lower than that of Comparative Example. The net consumption energy of Examples 9 and 10 is at the same level as or larger than Comparative Examples, but if comparisons are made to Example and Comparative Example in the sum of the net consumption energy and the excess energy, no difference is seen in both.

⑥ Productivity

The [C] densities in the molten iron in Examples 1 to 8 were secured to be 4% or more, and the (FeO) densities in slag were also low, the iron ore reduction rate was maintained at high levels. The productivity was equivalent to or more than Comparative Examples, and the continuous operation was maintained without any problem, and the objective level of 500 t/d of the molten iron production rate could be accomplished.

⑦ Prevention of Occurrence of $SO_x$

S contained in the waste plastic is at very low level as shown in Table 2 than coal. When used in the inventive process, S was transferred into the molten iron and the slag, and fixed there, though passing through the dust recovery, the pre-heating an pre-reducing ores, and hardly exhausted into the atmospheric air.

Above Examples relate to the smelting reduction process, and the invention is also similarly available to the smelting in the furnace of metals and metallic oxides of Ni, Cr or Mn, or dusts containing their metallic elements, otherwise to the pre-reduction treatment in the fluidized bed typed apparatus.

Embodiment 6

The smelting reduction process of iron bath type has one of the most advantageous merits in that the pre-treatment is no longer required to the carbonaceous materials as conventionally seen in the blast furnace process, and because of this merit, the instant process has recently been paid attention as the prospective smelting process substituting for the blast furnace process. The inventors have noticed that the instant process has no limitation to grain sizes of raw materials as in the blast furnace process, differently from merits as generally assumed with respect to the smelting reduction process of iron bath type, and considered to utilize the smelting reduction process of iron bath type in an embodiment to compensate the blast furnace in that sintered ores of small grain sizes being impossible or operationally difficult to employed in the blast furnace process (sintered ores of grain sizes as becoming returned ores) would be used as raw materials for the smelting reduction process of iron bath type.

In such smelting process, since the smelting reduction furnace of iron bath type is caused to bear partial responsibility of the smelting process rendering the sintered ores of fine grain to be the raw materials, it is possible to use, as the raw material, all the amount of the sintered ores perse, that is, without generating returned ores, and to more increase amounts or producing molten iron than the operation of the conventional single blast furnace process. On the other hand, such an operation is available of controlling the productivity coefficient of the molten iron from the blast furnace to be low, thereby to reduce the heat loss of the blast furnace and largely lengthen the life thereof. Besides, in case the sintered ores are used, as the smelting reduction process of iron bath type can be practiced very usefully, any drying process of ores is not necessary. Since the ratio of $CaO/SiO_2$ of the sintered ore is adjusted around 2, if they are used as the iron source in the smelting reduction process of iron bath type, the flux is not required for adjusting the slag components as burnt lime or dolomite.

Also with respect to coke for making iron, the inventors paid attention to that the smelting reduction process of iron bath type has no limitation to grain sizes of raw materials as in the blast furnace process, and considered that the sintered ores of small grain sizes being impossible or operationally difficult to be employed in the blast furnace process would be used as raw materials for the smelting reduction process of iron bath type. According to such coke using embodiment, it is possible not only to usefully use powder coke less to be consumed in the process of producing the sintered ore, but also to very usefully practice the smelting reduction process of iron bath type because of requiring no drying process of the carbonaceous material coke when using the coke in the smelting reduction process of iron bath type. Comparing with the case of using coal as the carbonaceous material, the post combustion rate can be largely heightened and the heat load of the furnace can be reduced, thereby enabling to lower the net unit of fuel and heighten the productivity in the smelting reduction process of iron bath type.

In the smelting process which supplies, as mentioned above, the sintered ores of small grain size as raw materials into the smelting reduction furnace, since basically the returned ores are absent, the amount of using powder coke is decreased in the sintering process in comparison with the case of operating the single blast furnace, and the powder coke has a room by such an amount. Therefore, if using part of the powder coke of the iron making coke as the carbonaceous material for the smelting reduction process, the coke including the powder coke may be usefully used in good balance in the iron making facility equipped with the smelting reduction furnace and the sintering machine.

The present invention has been realized on the above mentioned concept and the found fact, and has the following characteristics.

[1] The smelting process is characterized in that the sintered ores of large grain diameter of the sintered ores produced in the sintering machine are charged into the blast furnace, and the sintered ores of small grain diameter are charged into the smelting reduction furnace of iron bath type in the iron making facility equipped with the blast furnace, the smelting reduction furnace and the sintering machine.

[2] The smelting process is characterized in that the coke of large grain diameter of the iron-making coke is charged into the blast furnace, and the coke of small grain diameter is charged into the smelting reduction furnace of iron bath type in the iron making facility equipped with the blast furnace, the smelting reduction furnace and the sintering machine.

[3] The smelting process is characterized in that the sintered ores of large grain diameter of the sintered ores produced in the sintering machine are charged into the blast furnace, and the sintered ores of small grain diameter are charged into the smelting reduction furnace of iron bath type, while the coke of large grain diameter of the iron-making coke is charged into the blast furnace, and the coke of small grain diameter is charged into the smelting reduction furnace of iron bath type in the iron making facility equipped with the blast furnace, the smelting reduction furnace and the sintering machine.

The first embodiment of the invention is the smelting process based on the premise of the iron making facility equipped with the blast furnace, the smelting reduction furnace and the sintering machine, in which the sintered ores of large grain diameter (mainly massive sintered ore) of the sintered ores produced in the sintering process (the sintering machine) are charged into the blast furnace, and the sintered ores of small grain diameter (mainly powder sintered ore) are charged into the smelting reduction furnace of iron bath type, so that the molten iron is produced in the respective furnaces.

Generally, in the smelting process as above mentioned, sintered ores produced in the sintering machine are sieved through appropriate sieve opening and classified into the sintered ores of large grain diameter containing massive sintered ores and those of smaller grain diameter, and charged into the blast furnace and the smelting reduction furnace of iron bath type.

The grain dividing point of charging sintered ores into the blast furnace and the smelting reduction furnace of iron bath type may be ordinarily around a sieving degree when selecting returned ores, otherwise may be lager than it. In the blast furnace, if using sintered ores of large size to the utmost, the operation is easy in the permeability and advantageous in economy and productivity.

For the blast furnace, the sieving grain size is 3 mm or larger, and so the grain dividing point of charging into the blast furnace and the smelting reduction furnace of iron bath type is 3 mm or larger of the sieving degree, that is, it is preferable that sintered ores produced in the sintering machine are screened through the sieve opening of 3 mm or larger, and the ores stay on the screen are for the blast furnace and those under the screen are for the smelting reduction furnace of iron bath type. Further, the dividing point (the screening degree) of grain size of sintered ores is more preferable in 5 mm or larger, especially preferable in 8 mm or larger, whereby it is possible to supply the sintered ores of suited grain size to the side of the blast furnace.

Only, all the sintered ores of available grain sizes to the side of the blast furnace are not necessarily supplied, and it is not inhibited that the sintered ores applicable to the blast furnace are included in the sintered ores of the sizes under the screen. In short, it is sufficient that such sintered ores of unsuited size to charging into the blast furnace as corresponding to the returned ores are not to supplied to the side of the blast furnace. As far as satisfying such conditions, the dividing point can be arbitrarily determined, considering the charging into both furnaces.

Sintered ores on the screen inevitably contain those of grain sizes less than the screening grain size, and in the inventive process, of course, the sintered ores to be supplied to the side of the blast furnace includes such grain distribution.

Figure 26:
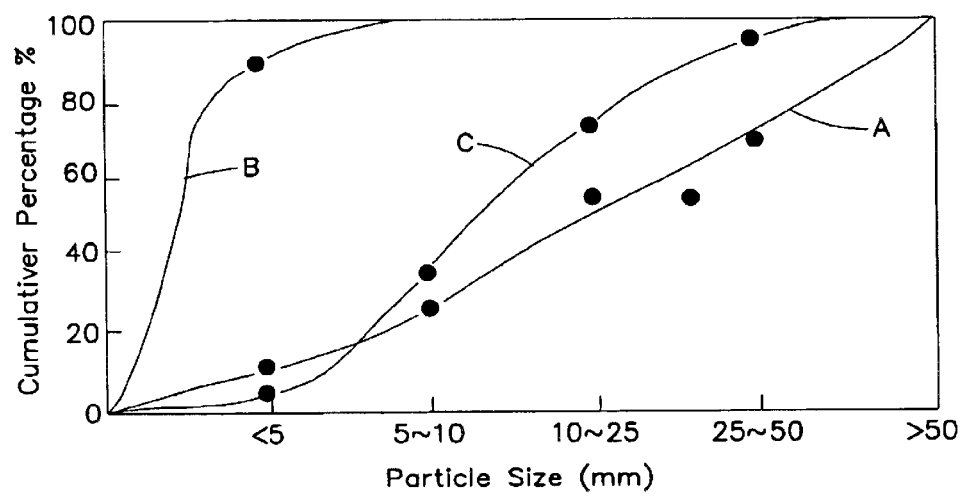
FIG. 26 is a view showing grain dispersion of sintered ores in Embodiment 6.

FIG. 26 shows the distribution of grain sizes in supplied ores of raw ores (sinter feed) and one example of grain distribution of sintered ores from the raw ores remaining on and under the screen. In this example, the screening degree (sieve opening) of the sintered ores was set to be 6 mm, and "A" in the same shows the distribution in grain size of the supplied ores, "B" shows the distribution in grain size of the supplied ores under the screen, and "C" shows the distribution in grain size of the supplied ores remaining on the screen. In the inventive process, the sintered ores having the distribution in grain size of the supplied ores under the screen are charged into the smelting reduction furnace, while the sintered ores having the distribution in grain size of the supplied ores under the screen are charged into the blast furnace.

In the smelting reduction furnace, the iron source charged in the furnace is rapidly melted by the combustion of the carbonaceous materials due to oxygen, while at the same time, the carbonaceous materials and C therein are rapidly reduced by the carbonized molten.iron and grain molten iron, and CO gas generated there rapidly makes post combustion by oxygen gas, thereby to bring about the production of molten iron at high heat efficiency and low net units of fuel and energy.

In general, the smelting reduction furnace is equipped with the pre-reduction furnace (the fluidized beded prereduction furnace) for pre-reducing ores, and the ores are pre-heated and pre-reduced (the pre-reduction: 10 to 30%) in this pre-reduction, followed by charging into the smelting reduction furnace, so that the net units of coal and oxygen are decreased, and the productivity is heightened 10 to 50% in comparison with the case of not performing the pre-reduction. Therefore, also in the inventive process, it is preferable to pre-reduce the sintered ores in the pre-reduction furnace and thereafter to charge into the smelting reduction furnace. If carrying out the pre-heating of ores prior to the pre-reduction, the productivity is more heightened.

In this smelting reduction process, both of the smelting reduction furnace and the pre-reduction furnace do not make limitations to the grain diameters of the ores as the iron source as the blast furnace, and accordingly, if charging the sintered ores of small grain diameter as the present invention, the smelting and reduction can be carried out without any problems.

Further, if employing the sintered ores as the iron source in the smelting reduction furnace process as later mentioned, the drying of ores are not longer necessary as the conventional smelting reduction furnace process, but it is necessary not to much absorb moisture (for example, water absorption: 1% or lower) until the sintered ores are charged into the smelting reduction furnace. Therefore, with respect to the sintered ores to be supplied into the smelting reduction furnace, attention should be paid not to absorb the moisture to the utmost on the way of handling until charging the smelting reduction furnace, for example, a rain prevention ceiling is furnished for storing them.

The inventive smelting process of the above mentioned embodiment has the following merits in comparison with the operation of the single furnace.

At first, since the smelting reduction furnace of iron bath type is caused to bear partial responsibility of the smelting process rendering the sintered ores of fine grain of the sintered ores in the sintering machine to be the raw materials, it is possible to use, as the raw material, all the amount of the sintered ores per se, that is, without generating returned ores. Thus, if the productive ability of the sintering machine is equivalent to the case of the operation of the conventional single blast furnace process, the amount of supplying raw ores is increased by the amount of the returned ores produced conventionally, thereby to more increase amounts or producing molten iron.

If the amount of producing the molten iron is equivalent to that of the operation of the conventional single blast furnace process, it is possible to operate controlling of the productivity coefficient of the blast furnace to be low, thereby to decrease the heat load of the blast furnace and effectively suppress injures within the furnace and as a result to lengthen the furnace life. In this case, it is preferable to operate the blast furnace at the productivity coefficient of around 1.0 to 1.7 t/m$^3$/day (especially preferably around 1.4 t/m$^3$/day). In the conventional blast furnace of exceeding 2000 m$^3$, the operation is carried out at the productivity coefficient of 2.0 t/m$^3$/day or higher by enriched oxygen, but if applying the inventive process, it is possible to secure the amount of producing the molten iron equivalent to that of the operation of the conventional single blast furnace process, even if the productivity coefficient is 1.7 t/m$^3$/day or lower, and if operating 1.7 t/m$^3$/day or less, it is possible to decrease the heat load of the blast furnace and effectively suppress injures within the furnace and as a result to lengthen the furnace life. But if the productivity coefficient of the blast furnace is less than 1.0 t/m$^3$/day, the lengthening effect of the furnace life is saturated, the operation is uneconomical in the productivity. The optimum value of the productivity coefficient is assumed to be around 1.4 t/m$^3$/day from the above viewpoint.

If the sintered ores are charged into the smelting reduction furnace in a manner that the sintered ores do not absorb the moisture, the inventive smelting process of the above mentioned embodiment does not need the ore drying process necessary in the conventional smelting reduction process, so that this process can be practiced at low cost.

If the sintered ores are employed as the iron source in the smelting reduction process, since the ratio of $CaO/SiO_2$ of the sintered ore is adjusted around 2, the basicity of the slag can be easily adjusted without charging the fluxing agents such as burnt lime or dolomite as the auxiliary raw materials, and comparing with the case of employing ores as the iron source, costs for raw materials and net unit of fuel can be lowered, and the productivity is improved in this aspect.

The present process can of course use iron sources such as ores, craps, directly reduced ores, iron carbide and others in addition to the sintered ores.

The second embodiment of the invention is to employ, as the carbonaceous materials, the coke of large grain diameter (mainly massive coke) to be charged into the blast furnace, and the coke of small grain diameter (mainly power coke) to be charged into the smelting reduction furnace of iron bath type in the iron making facility equipped with the blast furnace, the smelting reduction furnace and the sintering machine. The iron making coke to be used are sufficient with any of coke produced in the coke furnaces in or out of the iron-making facility.

Generally, in the smelting process as above mentioned, the iron-making coke is sieved through appropriate sieve opening and classified into the coke of large grain diameter containing massive coke and those of smaller grain diameter, and charged into the blast furnace and the smelting reduction furnace of iron bath type.

The grain dividing point of charging coke into the blast furnace and the smelting reduction furnace of iron bath type may be, similarly as above mentioned, ordinarily around a sieving degree to select unsuitable grain sizes for charging, otherwise may be lager than it.

For the blast furnace, the sieving grain size is 20 mm or larger, and so the grain dividing point of charging into the blast furnace and the smelting reduction furnace of iron bath type is 20 mm or larger of the sieving degree, that is, it is preferable that the iron-making coke is screened through the sieve opening of 20 mm or larger, and the coke stay on the screen are for the blast furnace and those under the screen are for the smelting reduction furnace of iron bath type. Further, the dividing point (the screening degree) of grain size of sintered ores is more preferable in 25 mm or larger, especially preferable in 30 mm or larger, whereby it is possible to supply the coke of suited grain size to the side of the blast furnace.

Only, all the coke of available grain sizes to the side of the blast furnace are not necessarily supplied, and it is not inhibited that the coke applicable to the blast furnace are included in the coke of the sizes under the screen. In short, it is sufficient that such coke of unsuited size to charging into the blast furnace are not to supplied to the side of the blast furnace. As far as satisfying such conditions, the dividing point can be arbitrarily determined, considering the charging into both furnaces.

Sintered coke on the screen inevitably contains those of grain sizes less than the screening grain size, and in the inventive process, of course, the coke to be supplied to the side of the blast furnace includes such grain distribution.

Further, if employing the coke as the carbonaceous material in the smelting reduction furnace process as later mentioned, the drying of carbonaceous material (coal) are not longer necessary as the conventional smelting reduction furnace process, but it is necessary not to much absorb moisture (for example, water absorption: 1% or lower) until the coke is charged into the smelting reduction furnace. Therefore, with respect to the coke to be supplied into the smelting reduction furnace, attention should be paid not to absorb the moisture to the utmost on the way of handling until charging the smelting reduction furnace, for example, a rain-prevention ceiling is furnished for storing them.

The inventive smelting process of the above mentioned embodiment has the following merits in comparison with the operation of the single furnace.

Namely, there is much contained such coke of fine grain produced in the coke oven within the iron-making facility or supplied from the outside of the iron-making facility, which coke could not be used in the blast furnace, and the inventive smelting process can make use of the coke of fine grain which could not be consumed in the production process of the sintered ores.

If the coke after production is charged into the smelting reduction furnace so that it does not absorb moisture, the inventive smelting process of the above mentioned embodiment does not need the carbonaceous material drying process necessary in the conventional smelting reduction process, so that this process can be practiced at low cost.

In addition, if the coke is used as the carbonaceous material in the smelting reduction process, the post combustion rate of the gas generated in the furnace can be largely heightened in comparison with the case of using coal as the carbonaceous material. That is, when the coal is used as the carbonaceous material in the smelting reduction process, the post combustion rate is around 30 to 40% at the utmost, while when the coke is used as the carbonaceous material, the post combustion rate is can be increased up to 50 to 80%, thereby enabling to decrease the net unit of the fuel in the smelting reduction and heighten the productivity. Further, since the solid carbon of coke is far higher than that of coal, heat cracking is less to happen, and the coke is difficult to fly out from the furnace, it is useful to accelerate the carbonization in the smelting reduction and effective to stabilize high productivity and operation. As the coke is lower in hydrogen content than coal, $H_2O$ density in waste gas is several to around 10% vs. 10 to 25% when using coal, and as the $H_2O$ density having largest influence among CO, $CO_2$ and $H_2O$ giving influences to the gas radiation is very lower than the case of using coal, if the post combustion rate is equivalent, the heat load of the furnace can be made low, so that the heat loss is small and the net unit of the fuel can be also decreased in this aspect.

The third embodiment of the invention is, in the iron making facility equipped with the blast furnace, to concurrently practice the first and second embodied operations, wherein the sintered ores of large grain diameter (mainly massive sintered ore) of the sintered ores produced in the sintering process (the sintering machine) are charged into the blast furnace, and the sintered ores of small grain diameter (mainly powder sintered ore) are charged into the smelting reduction furnace of iron, bath type, the coke of large grain diameter (mainly massive coke) to be charged into the blast furnace, and the coke of small grain diameter (mainly power coke) to be charged into the smelting reduction furnace of iron bath type in the iron making facility equipped with the blast furnace, so that the molten iron is produced in the respective furnaces.

The selecting and operating conditions of the sintered ores and coke in the above mentioned smelting process are similar to those of the first and second embodiments. In the smelting process of charging the sintered ores of small grain diameter as the iron source into the smelting reduction furnace, since the returned ores are basically absent in the sintering machine, the amount of using powder coke in the sintering process is decreased in comparison with the operation of the single furnace, so that there will be a room in the powder coke by the decreasing amount. Therefore, in such an exemplified smelting process, if using part of the powder coke among the iron-making coke as the carbonaceous material for the smelting reduction process, the coke, especially such coke in the small grain side of the fine powder being main part can be usefully utilized in good balance in the iron making facility equipped with the blast furnace, the smelting reduction furnace and the sintering machine.

The smelting reduction process to which the practicing mode 6 is applicable is a smelting reduction process of iron bath type where the gas generated gas in a closed furnace is generated with a second combustion, and since the smelting reduction process requires, as the COREX Process, that the massive raw material is reduced in the shaft furnace, and thereafter charged into the gasification smelting furnace, the practicing mode 6 cannot be applied.

Table 28 shows the operating examples in the smelting reduction furnace of iron bath type. Of the examples, the inventive example 1 used, as the iron source, the sintered powder (sintered ore less than the 5 mm sieve opening) corresponding to the returned ore, and used the coal as the carbonaceous material for producing the molten iron; the inventive example 2 used, as the iron source, the iron ore and used the coal as the carbonaceous material (coke less than the 20 mm sieve opening) for producing the molten iron; and the inventive example 3 used, as iron source, the sintered powder (sintered ore less than the 4 mm sieve opening) corresponding to the returned ore, and used the coal as the carbonaceous material (coke less than the 20 mm sieve opening) for producing the molten iron. Comparative Example used the iron ore as the iron source, and used the coal as the carbonaceous material for producing the molten iron.

According to Table 28, in the inventive example 1 using used, as the iron source, the sintered powder corresponding to the returned ore, the ore drying process (steam for drying ores) is not required at all, and as the burnt lime or light dolomite are not necessary, either, the economical effect is large. Further, comparing with Comparative Example, the net unit of the fuel can be lowered, and the productivity can be heightened by such an amount. In the inventive example 2 using the powder coke as the carbonaceous material, the coal drying process (steam for drying coal) is not required at all, and as the net unit of the fuel can be more lowered than the inventive example 1, the economical effect can be made large.

Further, in the inventive example 3 using the sintered powder corresponding to the returned ore as the iron source, and using the powder coke as the carbonaceous material, the drying process for ores and coal is not required at all, and as the net unit of the fuel can be more lowered than the inventive example 1, the productivity can be increased.

TABLE 28

| No. | | | Comparative example | Examples of the invention 1 |
|---|---|---|---|---|
| Operating conditions | Percentage of post combustion | (%) | 30 | 30 |
| | RD pre-reduction rate | (%) | 21 | 21 |
| | Preheating temperature of PRF ores | (° C.) | 700 | 700 |
| | Temperature of PRF charged ores | (° C.) | 25 | 25 |
| | Amount of agitating gas ($N_2$) | ($Nm^3$/T) | 200 | 200 |
| Raw fuel and gas | Amount of charged ores   Sinter feed ores | | 1585 | — |
| | (kg/T)   Returned sintered ores | | — | 1734 |
| | Amount of charging   Coal | | 1024 | 1005 |
| | carbonaceous materials   Coke | | — | — |
| | (kg/T) | | | |
| | Amount of charging baked lime | (kg/T) | 57 | — |
| | Amount of charging light mud | (kg/T) | 64 | — |
| | Amount of supplying oxygen | ($Nm^3$/T) | 741 | 722 |
| | (purity: 95%) | | | |
| | Amount of using steam for   For ores | | 80 | — |
| | drying raw materials (kg/T)   For coal | | 109 | 107 |
| Waste gas | Amount of recovered gas | ($Nm^3$/T) | 2606 | 2453 |
| | Latent heat | (Mcal/T) | 3570 | 3542 |
| | Latent heat | (kcal/$Nm^3$) | 1370 | 1444 |
| Slag amount | | (kg/T) | 403 | 440 |
| Steam | Recovering amount of steam at high temperature *1 | (kg/T) | 373 | 384 |
| | Recovering amount of steam at low temperature *2 | (kg/T) | 538 | 501 |
| Production amount | | (t/day) | 3000 | 3100 |

*1: 689 kcal/kg
*2: 658 kcal/kg

TABLE 29

| No. | | | Examples of the invention 2 | Examples of the invention 3 |
|---|---|---|---|---|
| Operating conditions | Percentage of post combustion | (%) | 60 | 50 |
| | RD pre-reduction rate | (%) | 21 | 21 |
| | Preheating temperature of PRF ores | (° C.) | 700 | 700 |
| | Temperature of PRF charged ores | (° C.) | 25 | 25 |
| | Amount of agitating gas ($N_2$) | ($Nm^3$/T) | 200 | 200 |
| Raw fuel and gas | Amount of charged ores   Sinter feed ores | | 1584 | — |
| | (kg/T)   Returned sintered ores | | — | 1739 |
| | Amount of charging   Coal | | — | — |
| | carbonaceous materials   Coke | | 610 | 730 |
| | (kg/T) | | | |
| | Amount of charging baked lime | (kg/T) | 50 | — |
| | Amount of charging light mud | (kg/T) | 54 | — |
| | Amount of supplying oxygen | ($Nm^3$/T) | 500 | 630 |
| | (purity: 95%) | | | |
| | Amount of using steam for   For ores | | — | — |
| | drying raw materials (kg/T)   For coal | | — | — |
| Waste gas | Amount of recovered gas | ($Nm^3$/T) | 1300 | 1619 |
| | Latent heat | (Mcal/T) | 1150 | 1452 |
| | Latent heat | (kcal/$Nm^3$) | 1100 | 1271 |
| Slag amount | | (kg/T) | 400 | 465 |
| Steam | Recovering amount of steam at high temperature *1 | (kg/T) | 270 | 349 |
| | Recovering amount of steam at low temperature *2 | (kg/T) | 290 | 361 |
| Production amount | | (t/day) | 4400 | 3500 |

*1: 689 kcal/kg
*2: 658 kcal/kg

What is claimed is:

1. A smelting reduction method comprising:
(a) charging a carbonaceous material and an ore containing iron into a reacting furnace to directly contact the carbonaceous material and the ore;
(b) reducing the ore until at least a part of the ore is metallized, the resultant reduced ore containing at least a part of the metallized metal being produced, and devolatilizing the carbonaceous material until a devolatilized carbonaceous material having a volatile content of the carbonaceous material is less than 10% is obtained under the condition that the carbonaceous material and the ore are in direct contact with each other;
the step (b) of reducing the ore and devolatilizing the carbonaceous material comprising reducing the ore and devolatilizing the carbonaceous material at a temperature of at least 950° C. in the reacting furnace;
(c) charging the devolatilized carbonaceous material and the ore containing at least a part of the metallized metal from step (b) into a smelting reduction furnace having a metal bath;

(d) blowing a gas containing 20% or more of oxygen into the metal bath in the smelting reduction furnace to produce molten iron; and (e) controlling a heat load of the furnace wall by using a relationship among a de-volatilizing degree of the carbonaceous material, a post combustion rate in the smelting reduction furnace and the heat load of the furnace wall, the post combustion rate being a gas oxidation degree measured at the throat of the smelting reduction furnace, the gas oxidation degree being defined as follows: gas oxidation degree in %={($CO_2$+$H_2O$)/(CO+$CO_2$+$H_2$+$H_2O$)}×100.

2. The method of claim 1, further comprising charging carbonaceous material and pre-reduced ore into the metal bath of the smelting reduction furnace.

3. The method of claim 1, wherein the carbonaceous material charged into the reacting furnace is in an amount which is stoichiometrically sufficient for reducing and metallizing all of the ore charged into the reacting furnace.

4. The method of claim 1, wherein the reacting furnace is a rotary kiln furnace or a rotary hearth furnace.

5. The method claim 2, wherein the carbonaceous material charged into the smelting reduction furnace is in an amount which is stoichiometrically sufficient for reducing and metallizing all of the ore charged into the smelting reduction furnace.

6. The method of claim 5, wherein the reacting furnace is a rotary kiln furnace.

7. The method claim 5, wherein the reacting furnace is a rotary hearth furnace.

8. The method claim 1, wherein the carbonaceous material comprises char generated by devolatilizing coal.

9. The method of claim 1, wherein the temperature is 950° C.

10. The method of claim 1, wherein the temperature is 1,000° C.

11. The method of claim 1, wherein the temperature is 1,200° C.

12. The method of claim 1, wherein the temperature is 1,250° C.

13. The method of claim 1, wherein the step (b) of reducing the ore comprises reducing the ore until the ore has a metallization of 60% or more.

14. The method of claim 1, further comprising controlling a post combustion in the smelting reduction furnace to achieve a post combustion rate of 30 to 95%, the post combustion rate being a gas oxidizing degree measured at the throat of the smelting reduction furnace, the gas oxidation degree being defined as follows:

$$\text{gas oxidizing degree in \%} = \{(CO_2+H_2O)/(CO+CO_2+H_2+H_2O)\} \times 100.$$

15. The method of claim 14, wherein the post combustion rate is 40 to 80%.

* * * * *